(12) United States Patent
Takakuwa et al.

(10) Patent No.: US 7,681,113 B2
(45) Date of Patent: Mar. 16, 2010

(54) INFORMATION RECORDING MEDIUM, INFORMATION RECORDING DEVICE AND METHOD FOR REPRODUCING AUDIO INFORMATION AND STILL PICTURE INFORMATION SIMULTANEOUSLY

(75) Inventors: Nobuyuki Takakuwa, Saitama (JP); Takao Sawabe, Saitama (JP); Masanori Nakahara, Saitama (JP); Takeshi Koda, Saitama (JP); Tohru Kanegae, Saitama (JP); Yasuko Fukuda, Saitama (JP)

(73) Assignee: Pioneer Corporation, Tokyo (JP)

( * ) Notice: Subject to any disclaimer, the term of this patent is extended or adjusted under 35 U.S.C. 154(b) by 789 days.

(21) Appl. No.: 10/561,184

(22) PCT Filed: Jun. 2, 2004

(86) PCT No.: PCT/JP2004/008012

§ 371 (c)(1),
(2), (4) Date: Apr. 17, 2006

(87) PCT Pub. No.: WO2004/114657

PCT Pub. Date: Dec. 29, 2004

(65) Prior Publication Data

US 2006/0245805 A1    Nov. 2, 2006

(30) Foreign Application Priority Data

Jun. 17, 2003    (JP) .............................. 2003-171971

(51) Int. Cl.
G06F 17/00    (2006.01)
(52) U.S. Cl. .......................... 715/201; 715/732; 725/41
(58) Field of Classification Search ................ 715/201, 715/732; 725/41
See application file for complete search history.

(56) References Cited

U.S. PATENT DOCUMENTS

| | | | |
|---|---|---|---|
| 4,680,647 A | * | 7/1987 | Moriyama .................. 386/112 |
| 5,812,736 A | | 9/1998 | Anderson et al. |
| 6,084,582 A | | 7/2000 | Qureshi et al. |
| 6,085,185 A | * | 7/2000 | Matsuzawa et al. ............ 707/2 |
| 6,594,442 B1 | * | 7/2003 | Kageyama et al. ............ 386/96 |

(Continued)

FOREIGN PATENT DOCUMENTS

| | | |
|---|---|---|
| EP | 1 041 566 | 10/2000 |
| EP | 1 096 489 | 5/2001 |
| JP | 64-023689 | 1/1989 |
| JP | 11-146330 | 5/1999 |
| JP | 11-331780 | 11/1999 |

(Continued)

OTHER PUBLICATIONS

Christel, et al., "Information Visualization Within a Digital Video Library", Journal of Intelligent Information Systems, vol. 11, Issue 3, Nov./Dec. 1998, p. 235-257.*

Furht, "Multimedia systems: an overview", Multimedia, IEEE, vol. 1, Issue 1, Spring 1994, p. 47-59.*

(Continued)

*Primary Examiner*—Amelia Rutledge
(74) *Attorney, Agent, or Firm*—Young & Thompson

(57) ABSTRACT

An information recording medium has recorded thereon a plurality of sets of still image information to be continuously played back in the form called a slide show audio information to be played back in synchronization with the still image information. Also recorded on the information recording medium is playback control information for playing back the audio information in synchronization with the sets of still image information. When the still image information sets are sequentially played back, the audio information is played back in synchronization with the still image information according to the playback control information. The playback control information includes audio repeat information for controlling the repetition of the audio information. The repeated playback of the audio information is controlled according to the audio repeat information.

6 Claims, 36 Drawing Sheets

U.S. PATENT DOCUMENTS

| | | | |
|---|---|---|---|
| 6,915,012 B2 * | 7/2005 | Osborne et al. | 382/232 |
| 2004/0109676 A1 * | 6/2004 | Seo et al. | 386/95 |
| 2004/0252978 A1 * | 12/2004 | Jung et al. | 386/96 |

FOREIGN PATENT DOCUMENTS

| | | |
|---|---|---|
| JP | 2000-3561 | 1/2000 |
| JP | 2001-126455 | 5/2001 |
| JP | 2001-243721 | 9/2001 |
| JP | 2002-305705 | 10/2002 |
| RU | 2073913 | 2/1997 |

OTHER PUBLICATIONS

Meyer, et al., "A Taxonomy on Multimedia Synchronization", copyright 1993, IEEE, p. 97-103.*

* cited by examiner

FIG. 24

| FILE NAME | | | DESCRIBED CONTENTS |
|---|---|---|---|
| P LIST GENERAL INFORMATION | | | P LIST SIZE, TOTAL NUMBER OF P LISTS |
| P LIST POINTER TABLE | P LIST #1 POINTER | | P LIST #1 INFORMATION STORAGE ADDRESS |
| P LIST #1 INFORMATION TABLE | P LIST #1 GENERAL INFORMATION | | TOTAL NUMBER OF ITEMS INCLUDED IN P LIST #1 = 2<br>TOTAL NUMBER OF SUB-ITEM = 1<br>OTHER INFORMATION |
| | P LIST #1 ITEM INFORMATION TABLE | ITEM #1 INFORMATION | ITEM TYPE = BROWSEABLE SLIDE SHOW<br>STILL PICTURE REPEAT FLAG = CONTINUE<br>OBJECT NUMBER IN OBJECT INFORMATION FILE = 1<br>APPLICABLE AU NUMBER IN AU TABLE<br>OTHERS |
| | | ITEM #2 INFORMATION | ITEM TYPE = BROWSEABLE SLIDE SHOW<br>STILL PICTURE REPEAT FLAG = ON<br>OBJECT NUMBER IN OBJECT INFORMATION FILE = 3<br>APPLICABLE AU NUMBER IN AU TABLE<br>OTHERS |
| | P LIST #1 SUB-ITEM INFORMATION TABLE | SUB-ITEM #1 INFORMATION | SUB-ITEM TYPE = AUDIO FOR BROWSEABLE SLIDE SHOW<br>AUDIO REPEAT FLAG = ON<br>REPRODUCTION STARTING POSITION INFORMATION<br>OBJECT NUMBER IN OBJECT INFORMATION FILE = 2<br>APPLICABLE AU NUMBER IN AU TABLE<br>AUDIO REPRODUCTION RANGE INFORMATION<br>OTHERS |
| | OTHER INFORMATION | | COMMAND CONTENTS etc. |

FIG. 25

| OBJECT | STILL PICTURE #1 | STILL PICTURE #2 | STILL PICTURE #3 | STILL PICTURE #4 | STILL PICTURE #5 |
|---|---|---|---|---|---|

| PU | INDEX #1 = STILL PICTURE #2 |
|---|---|
|  | INDEX #2 = STILL PICTURE #1 |
|  | INDEX #3 = STILL PICTURE #5 |

FIG. 26

| OBJECT (PID=100) | STILL PICTURE #1 PTS=aaa | STILL PICTURE #2 PTS=bbb | STILL PICTURE #3 PTS=ccc | STILL PICTURE #4 PTS=ddd | STILL PICTURE #5 PTS=eee |
|---|---|---|---|---|---|

| PU | INDICATE "INDEX #1 = STREAM (PID=100)" |
|---|---|

FIG. 37

OBJECT INFORMATION TABLE 131

AU TABLE

| FILE NAME | | | | CONTENTS |
|---|---|---|---|---|
| AU TABLE GENERAL INFORMATION | | | | NUMBER OF AUS, POINTER TO EACH AU |
| AU#1 132I | PU#1 | | ES_TABLE INDEX #1 | INDEX NUMBER OF ES_MAP TABLE = 1 |
| | | | ES_TABLE INDEX #2 | 3 |
| | PU#2 | | ES_TABLE INDEX #1 | 4 |
| | | | ES_TABLE INDEX #2 | 5 |
| AU#2 | PU#1 | | ES_TABLE INDEX #1 | 9 |
| | | | ES_TABLE INDEX #2 | 10 |
| | PU#2 | | ES_TABLE INDEX #1 | 12 |
| | | | ES_TABLE INDEX #2 | 13 |
| 302I AU#3 | PU#1 | | ES_TABLE INDEX #1 | 14 |
| | | | ES_TABLE INDEX #2 | 15 |
| | | | ES_TABLE INDEX #3 | 16 |
| | | | ES_TABLE INDEX #4 | 17 |
| | | | ES_TABLE INDEX #5 | 18 |
| OTHER INFORMATION | | | | POSITION OF ES_MAP TABLE |

ES_MAP TABLE 134

| FILE NAME | CONTENTS |
|---|---|
| ES_MAP TABLE GENERAL INFORMATION | NUMBER OF INDEXES |
| INDEX #1 | VALUE OF ES_PID = 101 |
| | ADDRESS INFORMATION |
| INDEX #2 | ES_PID = 102 |
| | ADDRESS INFORMATION |
| INDEX #3 | ES_PID = 103 |
| | ADDRESS INFORMATION |
| INDEX #4 | ES_PID = 201 |
| | ADDRESS INFORMATION |
| INDEX #5 | ES_PID = 202 |
| | ADDRESS INFORMATION |
| INDEX #6 | ES_PID = 301 |
| | ADDRESS INFORMATION |
| INDEX #7 | ES_PID = 302 |
| | ADDRESS INFORMATION |
| INDEX #8 | ES_PID = 303 |
| | ADDRESS INFORMATION |
| INDEX #9 | ES_PID = 201 |
| | ADDRESS INFORMATION |
| INDEX #10 | ES_PID = 202 |
| | ADDRESS INFORMATION |
| INDEX #11 | ES_PID = 203 |
| | ADDRESS INFORMATION |
| INDEX #12 | ES_PID = 101 |
| | ADDRESS INFORMATION |
| INDEX #13 | ES_PID = 102 |
| | ADDRESS INFORMATION |
| INDEX #14 | ES_PID = 101 |
| | ADDRESS INFORMATION |
| INDEX #15 | ES_PID = 102 |
| | ADDRESS INFORMATION |
| INDEX #16 134d | ES_PID = 103 |
| | ADDRESS INFORMATION |
| INDEX #17 134e | ES_PID = 104 |
| | ADDRESS INFORMATION |
| | INDEX NUMBER OF ES_MAP TABLE OF OPERATING SP DATA STREAM = 16 |
| INDEX #18 | ES_PID = 105 |
| | ADDRESS INFORMATION 134d |
| | INDEX NUMBER OF ES_MAP TABLE OF OPERATING SP DATA STREAM = 16 |
| OTHER INFORMATION | OTHER INFORMATION |

FIG. 38

AU Table

| FILE NAME | | | | CONTENTS |
|---|---|---|---|---|
| OBJECT GENERAL INFORMATION | | | | NUMBER OF OBJECTS, TYPE OF EACH OBJECT, POINTER TO EACH OBJECT |
| OBJECT #1 | AU TABLE GENERAL INFORMATION | | | NUMBER OF AUS, POINTER TO EACH AU |
| | AU TABLE | AU #1 | PU #1 | ES_Table Index #1 | INDEX NUMBER OF ES_map table = 1 |
| | | | | ES_Table Index #2 | 2 |
| | PACKET NUMBER DISCONTINUOUS INFORMATION | | | PACKET LENGTH, PACKET NUMBER DISCONTINUOUS STARTING POINT, OFFSET VALUE |
| | OTHER INFORMATION | | | POSITION OF ES_Map table #1 |
| OBJECT #2 | AU TABLE GENERATE INFORMATION | | | NUMBER OF AUS, POINTER TO EACH AU |
| | AU TABLE | AU #1 | PU #1 | ES_Table Index #1 | INDEX NUMBER OF ES_map table = 1 |
| | PACKET NUMBER DISCONTINUOUS INFORMATION | | | PACKET LENGTH, PACKET NUMBER DISCONTINUOUS STARTING POINT, OFFSET VALUE |
| | OTHER INFORMATION | | | POSITION OF ES_Map table #2 |
| OBJECT #3 | AU table GENERATE INFORMATION | | | NUMBER OF AUS, POINTER TO EACH AU |
| | AU Table | AU #1 | PU #1 | ES_Table Index #1 | INDEX NUMBER OF ES_map table = 1 |
| | PACKET NUMBER DISCONTINUOUS INFORMATION | | | PACKET LENGTH, PACKET NUMBER DISCONTINUOUS STARTING POINT, OFFSET VALUE |
| | OTHER INFORAMTION | | | POSITION OF ES_Map table #3 |
| OTHER INFORMATION | | | | |

ES_Map Table #1

| FIELD NAME | | CONTENTS |
|---|---|---|
| ES_Map Table #3 | ES_map table GENERAL INFORMATION | NUMBER OF INDEXES |
| | Index #1 | ADDRESS INFORMATION, DATA LENGTH, DATA FORM AND OTHERS |
| | Index #2 | ADDRESS INFORMATION, DATA LENGTH, DATA FORM AND OTHERS |
| | OTHER INFORMATION | |

ES_Map Table #2

| FIELD NAME | | CONTENTS |
|---|---|---|
| ES_Map Table #1 | ES_map table GENERAL INFORMATION | NUMBER OF INDEXES |
| | Index #1 | VALUE OF ES_PID |
| | | ADDRESS INFORMATION |
| | OTHER INFORMATION | |

ES_Map Table #3

| FIELD NAME | | CONTENTS |
|---|---|---|
| ES_Map | ES_map table GENERAL INFORMATION | NUMBER OF INDEXES |
| | Index #1 | ADDRESS INFORMATION, DATA LENGTH, DATA FORM AND OTHERS |
| | OTHER INFORMATION | |

INFORMATION RECORDING MEDIUM, INFORMATION RECORDING DEVICE AND METHOD FOR REPRODUCING AUDIO INFORMATION AND STILL PICTURE INFORMATION SIMULATANEOUSLY

TECHNICAL FIELD

The present invention relates to a technical field of an information record medium such as an a high density optical disc, capable of recording various kinds of information (e.g., main video, audio, sub-picture and reproduction control information) with high density, an information record apparatus and a method thereof for recording the information onto the information record medium, an information reproduction apparatus and a method thereof for reproducing the information from the information record medium, an information record reproduction apparatus and a method thereof capable of recording and reproducing the information, a computer program for record or reproduction control and a data structure including a control signal for the reproduction control.

BACKGROUND TECHNIQUE

In a so-called "DVD audio standard", a "browseable slide show" is used. The browseable slide show can output and display still pictures prepared in advance during reproduction of a piece of music, and can change the displayed still pictures in order by operation of a reproduction apparatus by a user.

The browseable slide show treats an audio as main contents, and can display the still pictures by using the reproduction clock of the audio as reference, only within a time period in which the audio exists. Namely, when no audio exists, the still pictures cannot be displayed.

DISCLOSURE OF INVENTION

The present invention has been achieved in order to solve the above problems. It is an object of this invention to provide an information record medium, an information record apparatus and a method thereof, an information reproduction apparatus and a method thereof, an information record reproduction apparatus and a method thereof, an information record program, an information reproduction program, an information record reproduction program, and a data structure including a control signal for reproduction control, capable of reproducing an audio in various kinds of manners together with the reproduction of still pictures by using the information record medium including the still pictures and the audio.

According to one aspect of the present invention, there is provided an information record medium including: still picture information which includes at least one still picture; audio information; reproduction control information which reproduces the audio information in synchronization with reproduction of the still picture information, wherein the reproduction control information includes audio repeat information for controlling repeat reproduction of the audio information synchronized with the still picture information.

Onto the above information record medium, the still picture information successively reproduced in a manner called "slide show" and the audio information synchronized with the still picture information to be reproduced are recorded, for example. The reproduction control information reproducing the audio information in synchronization with the still picture information is further recorded thereon, too. When the still picture information is reproduced, the audio information synchronized with the still picture information is reproduced in accordance with the reproduction control information. The reproduction control information includes the audio repeat information controlling the repeat of the audio information, and the repeat reproduction of the audio information is accordingly controlled.

The reproduction control information may include still picture repeat information for controlling the repeat reproduction of the still picture information having at least one still picture. Thereby, the repeat reproduction of the still picture information can be controlled.

The reproduction control information may define reproduction timing of the audio information with respect to a reproduction time axis of the still picture. Specifically, the reproduction control information may be defined such that the audio information is reproduced only during reproduction of the still picture. Thereby, the still picture can be repeatedly reproduced in the so-called slide show, and the audio information corresponding to BGM can be reproduced.

The audio repeat information may indicate whether or not the audio information is repeatedly reproduced. The still picture repeat information may indicate whether or not the still picture information is repeatedly reproduced. Moreover, each piece of the still picture information may be constructed by an item unit defining a reproduction sequence of still picture contents, and the still picture repeat information may include continuous information indicating whether or not subsequent still picture information is to be reproduced as one reproduction sequence.

According to another aspect of the present invention, there is provided an information record apparatus including: a first record unit which records still picture information including at least one still picture and audio information; and a second record unit which records reproduction control information for reproducing the audio information in synchronization with reproduction of the still picture information, wherein the second record unit records the reproduction control information so that the reproduction control information includes audio repeat information for controlling repeat reproduction of the audio information synchronized with the still picture information.

In addition, from the similar viewpoint, there is provided an information record method including: a first record process which records still picture information including at least one still picture and audio information; and a second record process which records reproduction control information for reproducing the audio information in synchronization with reproduction of the still picture information, wherein the second record process records the reproduction control information so that the reproduction control information includes audio repeat information for controlling repeat reproduction of the audio information synchronized with the still picture information.

Further, from the similar viewpoint, there is provided an information record program executed on a computer, making the computer function as: a first record unit which records still picture information including at least one still picture and audio information; and a second record unit which records reproduction control information for reproducing the audio information in synchronization with reproduction of the still picture information, wherein the second record unit records the reproduction control information so that the reproduction control information includes audio repeat information for controlling repeat reproduction of the audio information synchronized with the still picture information.

In accordance with the above information record apparatus, the information record method and the information record program, the still picture information successively reproduced in the manner called "slide show", the audio information synchronized with the still picture information to be reproduced and the reproduction control information reproducing the audio information in synchronization with the still picture information are recorded onto the information record medium, for example. Therefore, when the still picture information is reproduced, the audio information synchronized with the still picture information is reproduced in accordance with the reproduction control information. The reproduction control information includes the audio repeat information controlling the repeat of the audio information, and the repeat reproduction of the audio information is accordingly controlled.

According to still another aspect of the present invention, there is provided an information reproduction apparatus which reproduces an information record medium including: still picture information which includes at least one still picture; audio information; reproduction control information which reproduces the audio information in synchronization with reproduction of the still picture information, the reproduction control information including audio repeat information for controlling repeat reproduction of the audio information synchronized with the still picture information, the apparatus comprising: a reading unit which reads the still picture information, the audio information and the reproduction control information from the information record medium; a still picture reproduction unit which reproduces the still picture information; and an audio reproduction unit which reproduces the audio information in synchronization with reproduction of the still picture information in accordance with the audio repeat information in the reproduction control information.

In addition, from the similar viewpoint, there is provided an information reproduction method which reproduces an information record medium including: still picture information which includes at least one still picture; audio information; reproduction control information which reproduces the audio information in synchronization with reproduction of the still picture information, the reproduction control information including audio repeat information for controlling repeat reproduction of the audio information synchronized with the still picture information, the method comprising: a reading process which reads the still picture information, the audio information and the reproduction control information from the information record medium; a still picture reproduction process which reproduces the still picture information; and an audio reproduction process which reproduces the audio information in synchronization with reproduction of the still picture information in accordance with the audio repeat information in the reproduction control information.

Further, from the similar viewpoint, there is provided a computer program product executed on a computer to reproduce an information record medium including: still picture information including at least one still picture; audio information; and reproduction control information which reproduces the audio information in synchronization with reproduction of the still picture information, the reproduction control information including audio repeat information for controlling repeat reproduction of the audio information synchronized with the still picture information, the program makes the computer function as: a reading unit which reads the still picture information, the audio information and the reproduction control information from the information record medium; a still picture reproduction unit which reproduces the still picture information; and an audio reproduction unit which reproduces the audio information in synchronization with reproduction of the still picture information in accordance with the audio repeat information in the reproduction control information.

In accordance with the above information reproduction apparatus, the above information reproduction method and the above information reproduction program, the still picture information including at least one still picture successively reproduced in the manner called "slide show", the audio information synchronized with the still picture information to be reproduced and the reproduction control information for reproducing the audio information in synchronization with the still picture information are recorded onto the information record medium when the still picture information is reproduced, the still picture information, the audio information and the reproduction control information are read from the information record medium, and the audio information synchronized with the still picture information is reproduced in accordance with the reproduction control information. The reproduction control information includes the audio repeat information controlling the repeat of the audio information, and the repeat reproduction of the audio information is accordingly controlled.

According to still another aspect of the present invention, there is provided an information record reproduction apparatus including an information record unit and an information reproduction unit, wherein the information record unit includes a first record unit which records still picture information including at least one still picture and audio information and a second record unit which records reproduction control information for reproducing the audio information in synchronization with reproduction of the still picture information, wherein the second record unit records the reproduction control information so that the reproduction control information includes audio repeat information for controlling repeat reproduction of the audio information synchronized with the still picture information, and wherein the information reproduction unit includes: a reading unit which reads the still picture information, the audio information and the reproduction control information from the information record medium; a still picture reproduction unit which reproduces the still picture information; and an audio reproduction unit which reproduces the audio information in synchronization with reproduction of the still picture information in accordance with the audio repeat information in the reproduction control information.

Additionally, from the similar viewpoint, an information record reproduction method may include an information record process and an information reproduction process, wherein the information record process includes a first record process which records still picture information including at least one still picture and audio information and a second record process which records reproduction control information for reproducing the audio information in synchronization with reproduction of the still picture information, wherein the second record process records the reproduction control information so that the reproduction control information includes audio repeat information for controlling repeat reproduction of the audio information synchronized with the still picture information, and wherein the information reproduction process includes: a reading process which reads the still picture information, the audio information and the reproduction control information from the information record medium; a still picture reproduction process which reproduces the still picture information; and an audio reproduction process which reproduces the audio information in synchronization with reproduction of the still picture information in accordance with the audio repeat information in the reproduction control information.

Further, from the similar viewpoint, there is provided an information record reproduction program executed on a computer, making the computer function as an information record reproduction apparatus including an information record unit and an information reproduction unit, wherein the information record unit includes a first record unit which records still picture information including at least one still picture and audio information and a second record unit which records reproduction control information for reproducing the audio information in synchronization with reproduction of the still picture information, wherein the second record unit records the reproduction control information so that the reproduction control information includes audio repeat information for controlling repeat reproduction of the audio information synchronized with the still picture information, and wherein the information reproduction unit includes: a reading unit which reads the still picture information, the audio information and the reproduction control information from the information record medium; a still picture reproduction unit which reproduces the still picture information; and an audio reproduction unit which reproduces the audio information in synchronization with reproduction of the still picture information in accordance with the audio repeat information in the reproduction control information.

In accordance with the above information record reproduction apparatus, the above information record reproduction method and the above information record reproduction program, the still picture information successively reproduced in the manner called "slide show", the audio information synchronized with the still picture information to be reproduced and the reproduction control information for reproducing the audio information in synchronization with the still picture information are recorded onto the record medium. In addition, when the still picture information is reproduced, the still picture information, the audio information and the reproduction control information are read from the information record medium, and the audio information synchronized with the still picture information is reproduced in accordance with the reproduction control information. The reproduction control information includes the audio repeat information controlling the repeat of the audio information, and the repeat reproduction of the audio information is accordingly controlled.

According to still another aspect of the present invention, there is provided a data structure including still picture information including at least one still picture, audio information and reproduction control information for reproducing the audio information in synchronization with reproduction of the still picture information, wherein the reproduction control information includes audio repeat information for controlling repeat reproduction of the audio information synchronized with the still picture information.

In accordance with the data structure including the above control signal, when the still picture is reproduced in order in the manner called "slide show" and the audio information is reproduced in synchronization with it, it can be controlled whether or not to repeat the audio information.

BRIEF DESCRIPTION OF THE DRAWINGS

FIG. 24 is a view showing an example of a playlist information table for executing the browseable slide show according to the embodiment.

FIG. 25 shows a definitive example of the still picture to be reproduced in a case that time information is added to an object itself.

FIG. 26 shows a definitive example of the still picture to be reproduced in the case that the time information is added to the object itself.

FIG. 37 is a view schematically showing a specific example of a data structure in an AU table constructed in an object information file and an ES map table related to the AU table in a specific example according to the embodiment.

FIG. 38 is a view schematically showing a specific example of the data structure in the AU table constructed in the object information file and the ES map table related to the AU table in specific example according to the embodiment.

DETAILED DESCRIPTION OF THE PREFERRED EMBODIMENTS (Information Record Medium)

The information record medium of the present invention is discussed, with reference to its embodiments, as well as FIG. 1 to FIG. 13. In these embodiments, the information record medium of the present invention is applied to an optical disc capable of recording (writing) and reproducing (reading).

Figure 1:
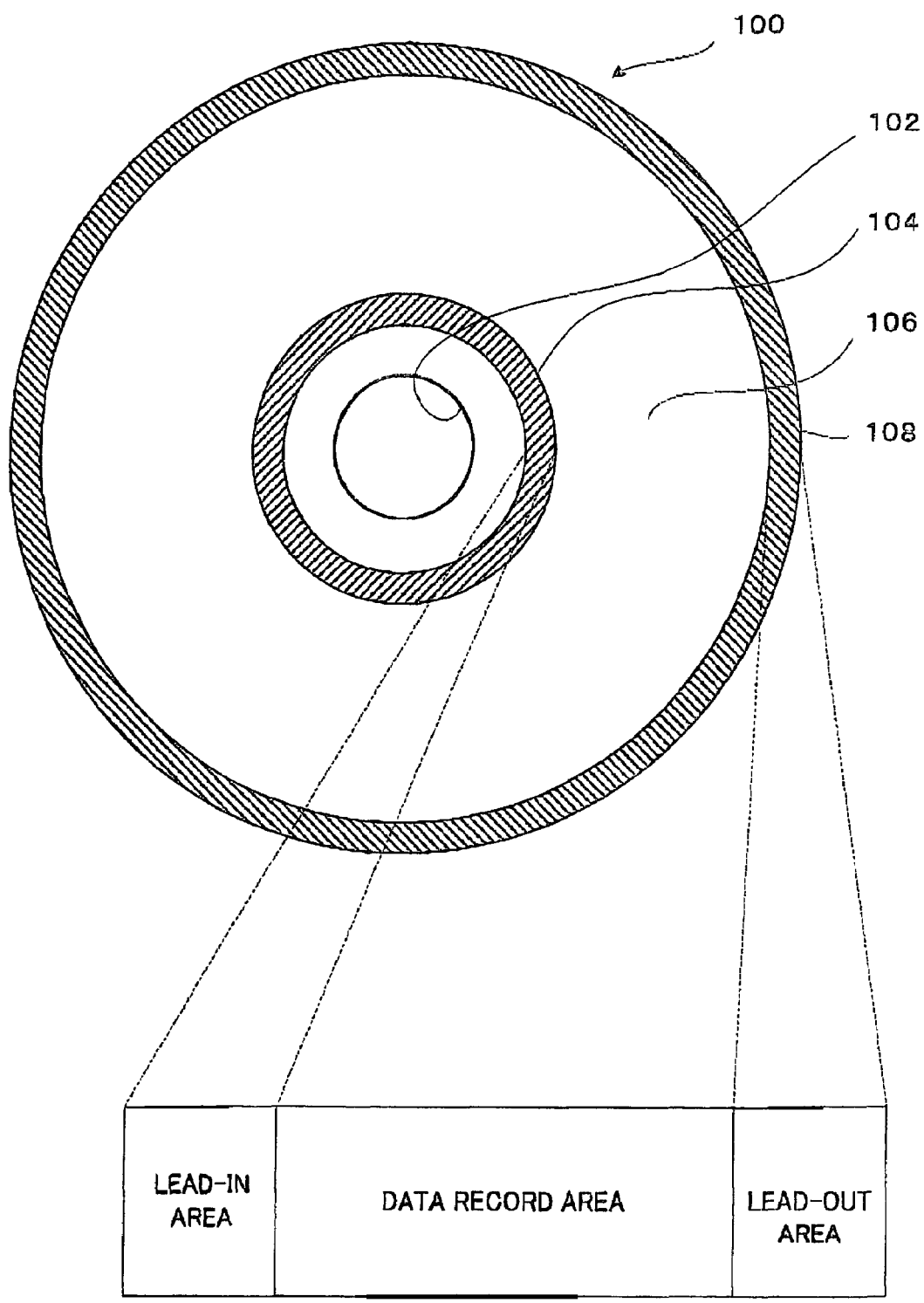
FIG. 1 illustrates a basic structure of an optical disc according to an embodiment of an information record medium according to the present invention, wherein its upper part illustrates a general plan view of the optical disc having plural areas and its lower part illustrates a schematic conceptual diagram of an area structure in a radius direction corresponding to the general plan view in the upper part.

Firstly, with reference to FIG. 1, a fundamental structure of the optical disc in an embodiment is discussed. FIG. 1 illustrates, in its upper part, a general plan view of the optical disc structure having a plurality of areas, and illustrates conceptually, in its lower part, an area structure in the radius direction corresponding to the upper part.

As shown in FIG. 1, the optical disc 100 may be recorded by various record methods, such as a magneto-optical method, a phase change method, capable of recording (writing) only once or a plurality of times. Similarly to DVDs, the optical disc 100 has a lead-in area 104, a data area 106 and a lead-out area 108, from the inner circumference around a center hole 102 to the outer circumference, on the record surface of the disc body measuring about 12 cm in diameter. In each area, groove tracks and land tracks may be alternately arranged, concentrically or spirally around the center hole 102. The groove tracks may be wobbled. Furthermore, pre-pits may be formed on one or both of these tracks. Incidentally, the present invention is not exclusively limited to the optical disc having three areas mentioned above.

Figure 2A:
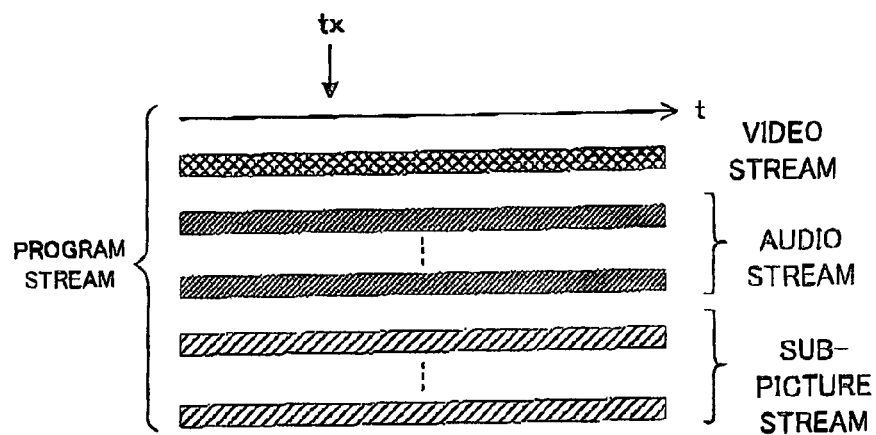
FIG. 2A illustrates a schematic conceptual diagram of a conventional program stream of MPEG2.
Figure 2B:
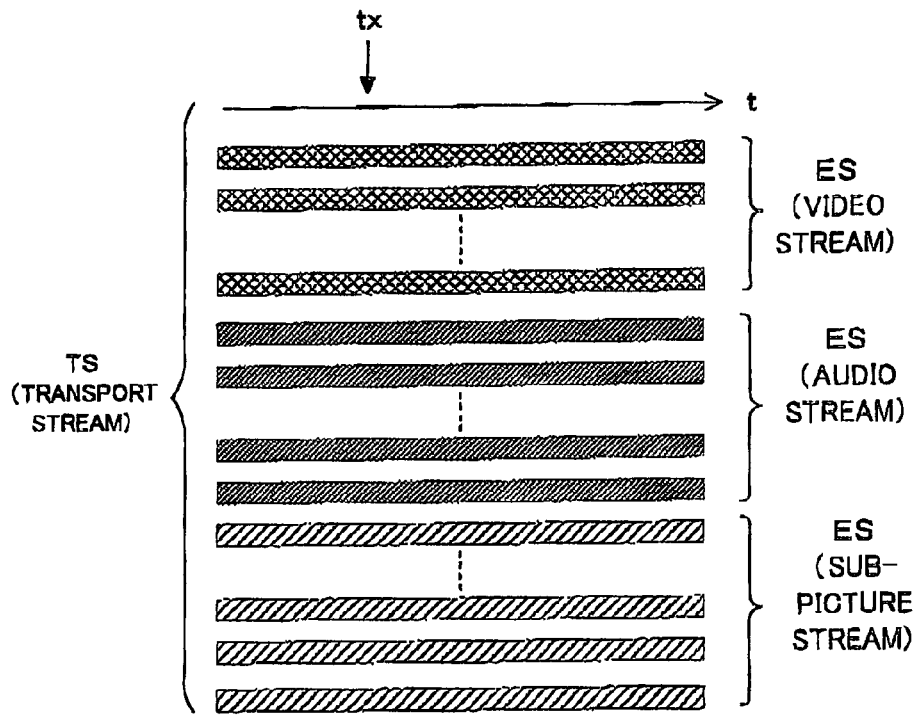
FIG. 2B illustrates a schematic conceptual diagram of a transport stream of MPEG2 used in the embodiment.
Figure 2C:
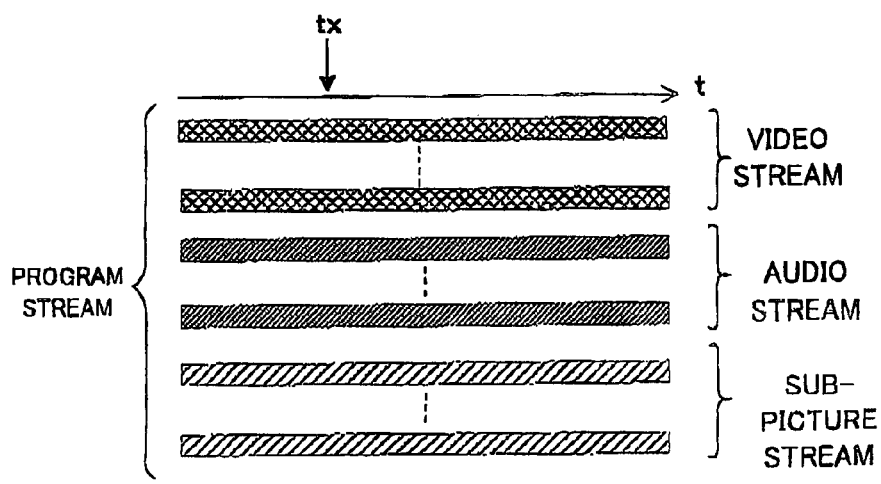
FIG. 2C illustrates a schematic conceptual diagram of a program stream of MPEG2 used in the embodiment.

Next, with reference to FIGS. 2A to 2C, the structures of the transport stream (TS) and the program stream (PS) to be recorded onto the optical disc in the embodiment are discussed. FIG. 2A schematically illustrates a MPEG2 program stream structure of a conventional DVD for comparison, FIG. 2B schematically illustrates a MPEG2 transport stream (TS) structure. Furthermore, FIG. 2C schematically illustrates a MPEG2 program stream structure in the present invention.

In FIG. 2A, one program stream to be recorded in the conventional DVD includes only one video stream for video data as main picture information, along the time axis t, and further includes up to 8 audio streams for audio data as audio information and up to 32 sub-picture streams for sub-picture data as sub-picture information. That is, the video data to be multiplexed at an arbitrary time point tx relates to only one video stream. For example, a plurality of video streams corresponding to a plurality of TV programs or a plurality of movies cannot be included at the same time in the program stream. It is not possible to multiplex a plurality of TV programs and transfer or record them, in a program stream format of a DVD having only one video stream, because at least one video stream is required for each TV program, in order to transfer or record the multiplexed TV program or the like involving a video image.

In FIG. 2B, one transport stream (TS) to be recorded in the optical disc 100 of the present invention includes a plurality of video streams as elementary streams (ES) for video data as main picture information, and further includes a plurality of audio streams as elementary streams (ES) for audio data as audio information and a plurality of sub-picture streams as elementary streams (ES) for sub-picture as sub-picture information. That is, the video data to be multiplexed at an arbitrary time point tx relates to a plurality of video streams. For example, a plurality of video streams that may correspond to a plurality of TV programs or a plurality of movies can be included at the same time in the transport stream. Thus, it is possible to multiplex a plurality of TV programs and transfer or record them, in the transport stream format having a plurality of video streams. However, the sub-picture stream is not transferred in a digital broadcasting employing the existing transport stream.

In FIG. 2C, one program stream (PS) to be recorded onto the optical disc 100 of the present invention includes a plurality of video streams for video data as main picture information, and further includes a plurality of audio streams for audio data as audio information and a plurality of sub-picture streams for sub-picture data as sub-picture information. That is, the video data to be multiplexed at an arbitrary time point tx relates to a plurality of video streams. For example, a plurality of video streams that may correspond to a plurality of TV programs or a plurality of movies can be included at the same time in the program stream.

Incidentally, for convenience of explanation, the video stream, the audio stream and the sub-picture stream are arranged in this order from the top in FIG. 2A to FIG. 2C. Nevertheless, this order or sequence does not correspond to an order or sequence for multiplexing packet by packet as mentioned below. In the transport stream, conceptually, a set of one video stream, two audio streams and two sub-picture streams corresponds to one program for example.

The optical disc 100 in the aforementioned embodiment is adapted to multi-record the transport stream (TS) as shown in FIG. 2B, i.e. to record a plurality of programs at the same time, within the restriction of the record rate. Furthermore, instead of or in addition to this transport stream, the program stream (PS) as shown in FIG. 2C can be multi-recorded onto the same optical disc 100.

Figure 3:
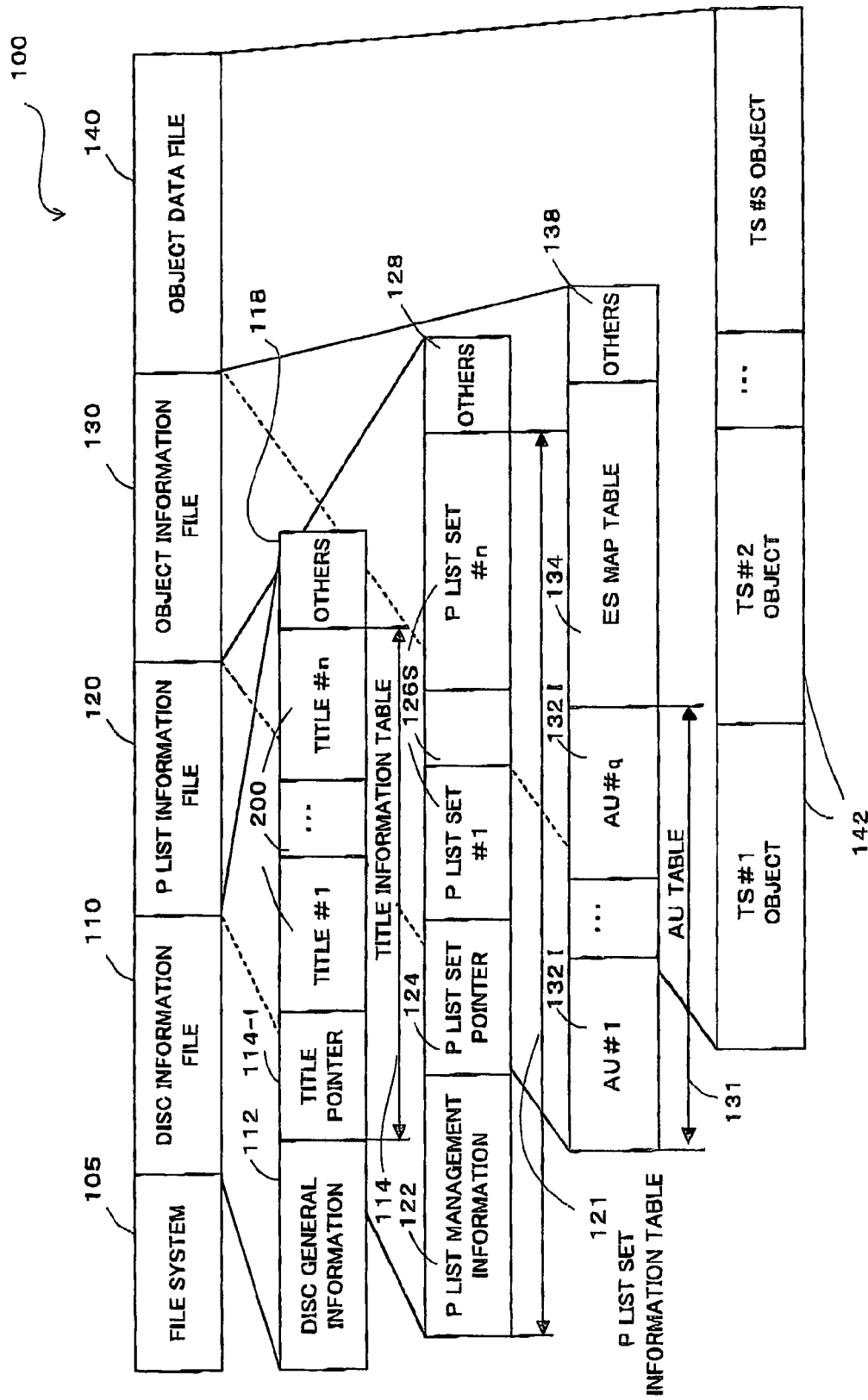
FIG. 3 is a diagram schematically illustrating a data structure recorded onto the optical disc in the embodiment.
Figure 4:
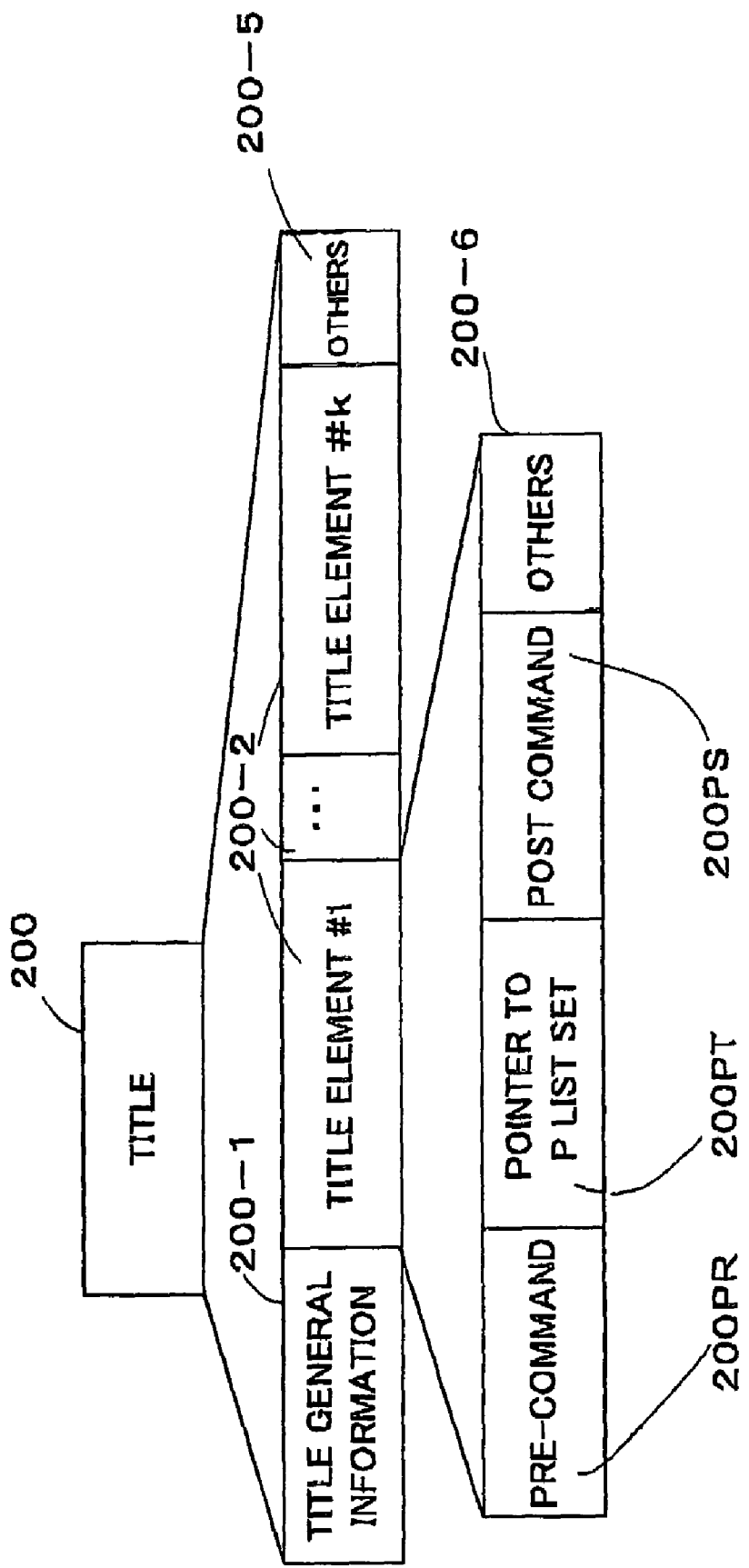
FIG. 4 is a conceptual view hierarchically illustrating a detailed data structure in each title shown in FIG. 3.
Figure 5:
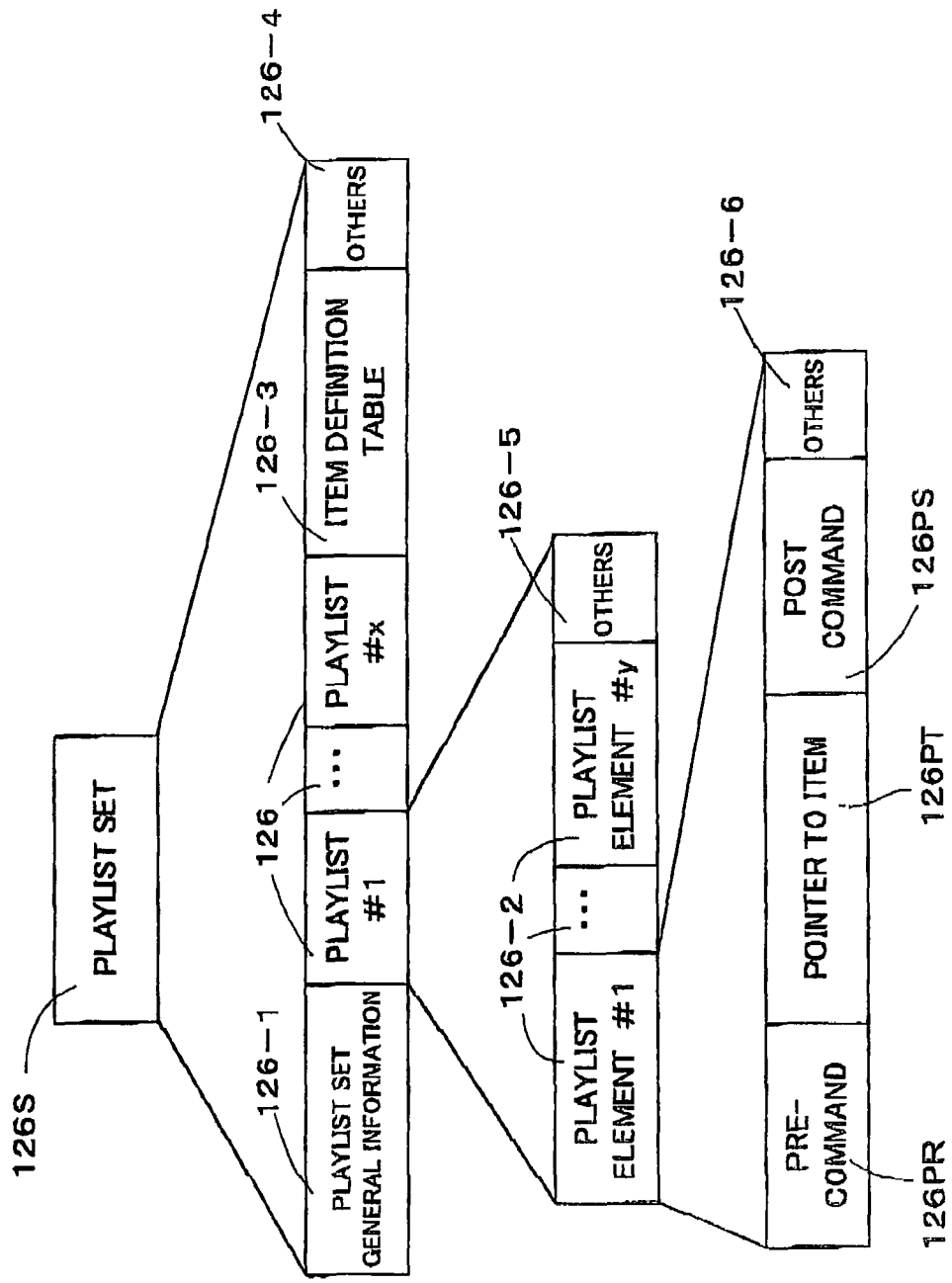
FIG. 5 is a conceptual view hierarchically illustrating a detailed data structure in each playlist set shown in FIG. 3.
Figure 6:
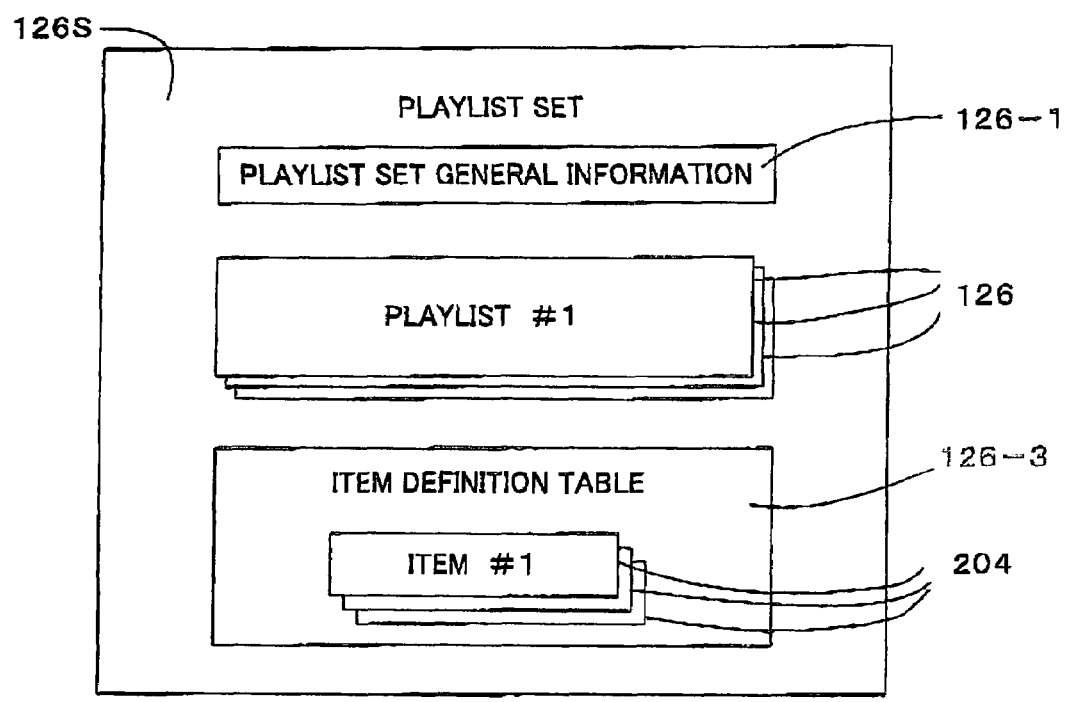
FIG. 6 is a conceptual view schematically illustrating a detailed data structure in each playlist set shown in FIG. 3.
Figure 7:
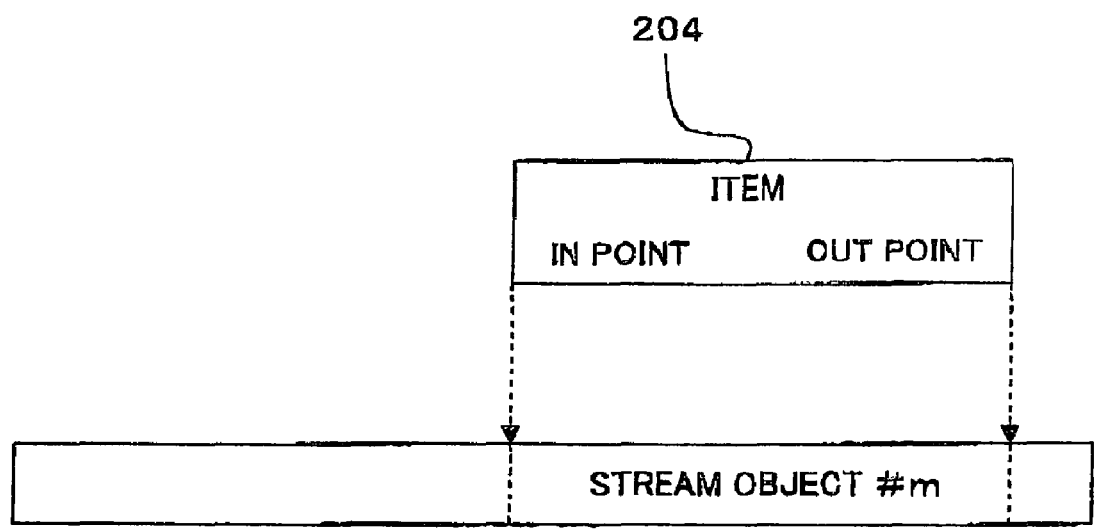
FIG. 7 is a conceptual diaphragm schematically illustrating a detailed data structure in each item shown in FIG. 6.
Figure 8:
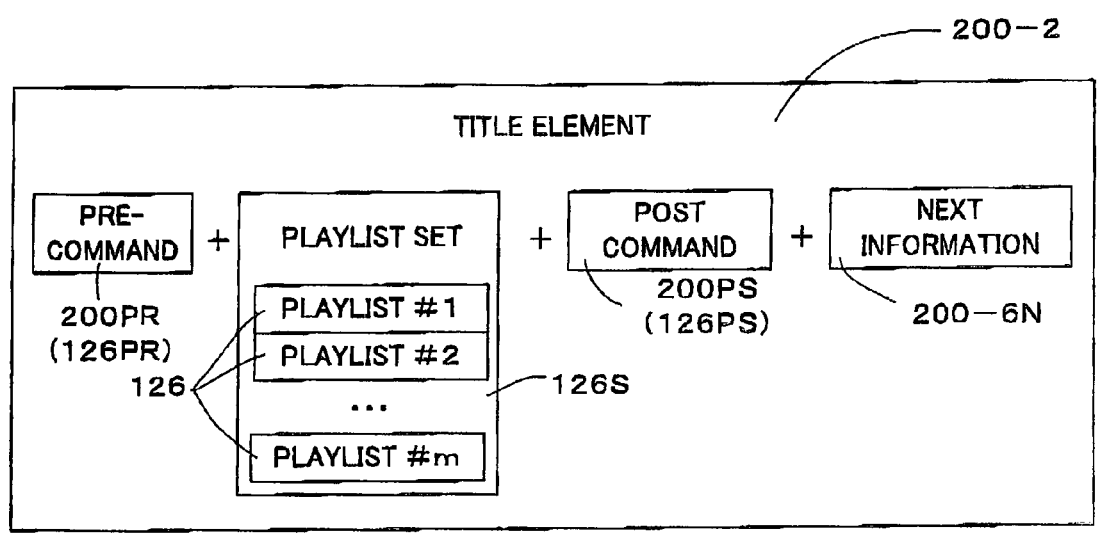
FIG. 8 is a conceptual diaphragm schematically illustrating a data logical structure in each title element shown in FIG. 4.
Figure 9:
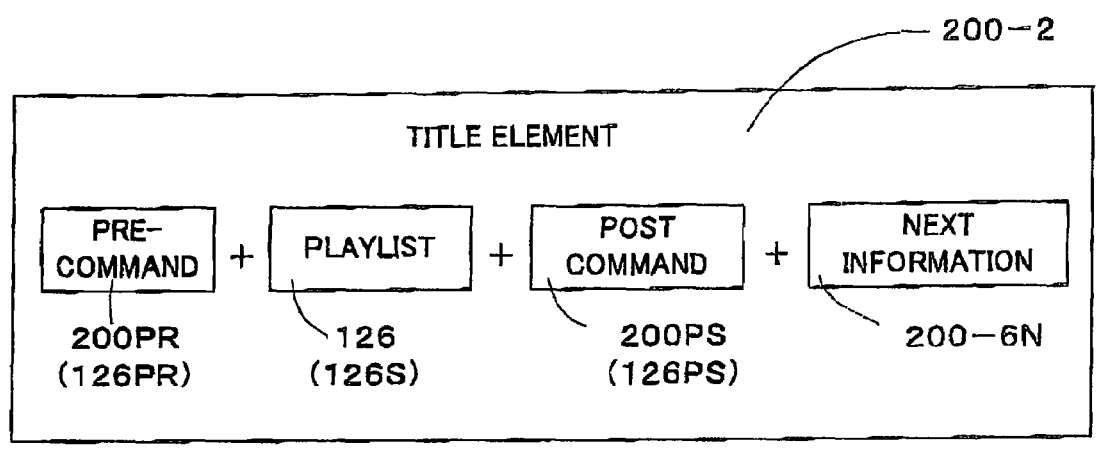
FIG. 9 is a conceptual diaphragm schematically illustrating a data logical structure in each title element shown in FIG. 4 in a case that each playlist set is constructed by one playlist in this embodiment.
Figure 10:
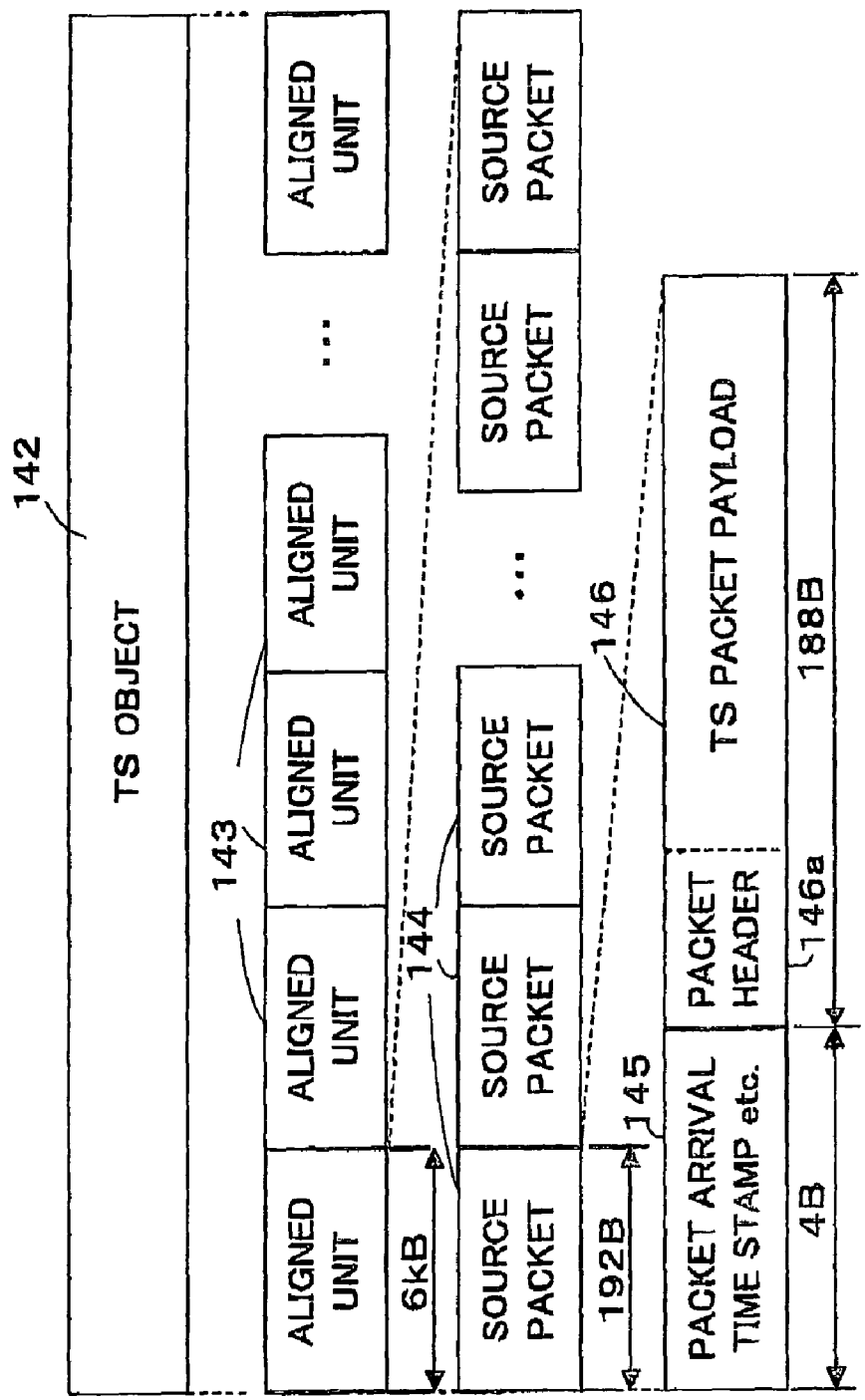
FIG. 10 is a conceptual view schematically illustrating a detailed data structure in each object shown in FIG. 3.

Next, with reference to FIG. 3 and FIG. 10, a structure of data to be recorded onto the optical disc 100 is discussed. FIG. 3 schematically illustrates the data structure to be recorded onto the optical disc 100. FIG. 4 schematically illustrates in detail the data structure in each object shown in FIG. 3. FIG. 5 and FIG. 6 schematically show a data structure in detail respectively in each playlist (P list) set shown in FIG. 3. FIG. 7 schematically shows detail of the data structure of each item shown in FIG. 6. FIG. 8 schematically shows a logical structure of data in each title element shown in FIG. 4. FIG. 9 schematically shows a logical structure of data in each title element shown in FIG. 4, in a case that each playlist set is composed of one playlist. FIG. 10 schematically shows a detail of a data structure in each object shown in FIG. 3.

In the following explanation, the "title" means a reproduction unit, on the basis of which a plurality of "playlists" is executed successively or sequentially, and which is a logically large grouped unit, such as one movie or one TV program. The "playlist set" means a bundle of "playlists". For example, it may be a bundle of playlists to reproduce a plurality of contents information having a special relationship switchable to each other in an angle reproduction or a parental reproduction, or may be a bundle of playlists to reproduce contents information relating to a plurality of programs broadcasted in the same time zone and collectively recorded. Alternatively, it may be a bundle of playlists to reproduce various contents information, in one title, prepared on the basis of required function, for example on the basis of video performance or audio performance required for the information reproduction system, such as a high vision compatibility, a display resolution, a surround speaker compatibility, a speaker layout and so on. The "playlist" is information for storing the information required to reproduce the "object" and consists of a plurality of "items" each storing the information about a reproduction range of the object to access the object. The "object" is the entity information of contents constructing the aforementioned MPEG2 transport stream.

In FIG. 3, the optical disc 100 is provided with four files as a logical structure; a disc information file 110; a playlist (P list) information file 120; an object information file 130; and an object data file 140. The disc 100 is further provided with a file system 105 for managing these files. Incidentally, although FIG. 3 does not show directly the physical data arrangement on the optical disc 100, it is possible to perform the recording in such a manner that the arrangement shown in FIG. 3 corresponds to another arrangement shown in FIG. 1. That is, it is possible to record the file system 105 or the like in the data record area 106 following the lead-in area 104 and further record the object data file 140 or the like in the data record area 106. The file structure shown in FIG. 3 can be constructed, even without the lead-in area 104 or the lead-out area 108 shown in FIG. 1.

The disc information file 110 is a file for storing general information about the entire optical disc 100, and stores the disc general information 112, the title information table 114 and other information 118. The disc general information 112 may store the total numbers of titles or the like in the optical disc 100. The title information table 114 includes a title pointer 114-1 and a plurality of titles 200 (title #1-#m) whose ID (identification) number or record address is indicated by the title pointer. In each title 200, each title type (e.g. sequential reproduction type, branch type and so on), or the playlist (P list) number constructing each title is stored for each title, as the logical information.

More specifically, for example, as shown in FIG. 4, each title 200 is made of a title general information 200-1, a plurality of title elements 200-2 and other information 200-5. Furthermore, each title element 200-2 is made of a pre-command 200PR, a pointer 200PT to a playlist set, a post command 200PS and other information 200-6.

The pointer 200PT as an example of the first pointer information according to the present invention indicates an ID number of the playlist set 126S stored in the playlist information file 120 corresponding to contents information to be reproduced on the basis of the title element 200-2 including the pointer 200PT. Incidentally, the pointer 200PT may be information to indicate a record position of the playlist set 126S corresponding to the contents information to be reproduced on the basis of the title element 200-2. The pre-command 200PR as an example of the first pre-command according to the present invention indicates a command to be executed before reproducing the contents information whose reproduction sequence is defined by one playlist set 126S designated by the pointer 200PT. The post command 200PS as an example of the first post command according to the present invention is a command to be executed after reproducing the contents information whose reproduction sequence is defined by said one playlist set. Other information 200-5 included in the title element 200-2 may include next information to designate a title element for a next reproduction after the present reproduction of the present title element, for example.

Therefore, when the information reproduction apparatus which will be described later reproduces the information record medium, the desired contents information can be reproduced as a title element 200-2, by making access to the playlist set 126S in accordance with the pointer 200PT and performing a control to select playlist corresponding to the desired program or the like from among a plurality of playlists 126 in the playlist set 126S. Furthermore, reproducing such a title element 200-2 solely or sequentially makes it possible to reproduce one title 200. Furthermore, it is possible to execute commands to be executed before reproduction, in the contents information whose reproduction sequence is defined by one playlist set 126S designated by the pointer 200PT, according to the pre-command 200PR. Furthermore, it is possible to execute commands to be executed after the reproduction, in the contents information whose reproduction sequence is defined by one playlist set 126S designated by the pointer 200FT, according to the post command 200PS. The post command 200PS may be a command to branch the contents information, a command to select a next title and so on. Additionally, it is possible to reproduce a next title element 200-2 to be reproduced after the presently reproduced title element 200-2, according to the "next information" included in other information 200-5.

Again in FIG. 3, the playlist information file 120 stores the playlist (P list) information table 121 indicating the logical structure of each playlist. This table 121 is divided into the playlist (P list) management information 122, the playlist (P list) set pointer 124, a plurality of playlist (P list) sets 126S (P list set #1-#n), and other information 128. In this playlist information table 121, the logical information of each playlist set 126S is stored in the order of the playlist set number. In other words, the order for storing the each playlist set 126S is the playlist set numbers. Furthermore, in the a forementioned title information table 114, the same playlist set 126S can be referred from a plurality of titles 200. That is, the playlist set #p in the playlist set information table 121 may be pointed on the title information table 114, even in the case that title #q and title #r use the same playlist set #p.

As shown in FIG. 5, the playlist set 126S includes playlist set general information 126-1, a plurality of playlists 126 (playlist #1-#x), an item definition table 126-3, and other information 126-4. Each playlist 126 includes a plurality of playlist elements 126-2 (playlist element #1-#y), and other information 126-5. Furthermore, each playlist element 126-2 includes a pre-command 126PR, a pointer 126PT to item, a post command 126PS and other information 126-6.

The pointer 126PT as an example of the second pointer information according to the present invention indicates an item identification number defined by the item definition table 126-3 corresponding to the contents information to be reproduced on the basis of the playlist element 126-2 including the pointer 126PT. Incidentally, the pointer 126PT may be an item record position defined by the item definition table 126-3.

As shown in FIG. 6, in the playlist set 126S, a plurality of items 204 is defined in the item definition table 126-3. They commonly belong to a plurality of playlists 126. Furthermore, as the playlist set general information 126-1, a name of each playlist 126 included in the playlist set 126S, UI (user interface information) such as a reproduction time, address information to each item definition table 126-3 and so on are recorded.

Again in FIG. 5, the pre-command 126PR as an example of the second pre-command according to the present invention indicates a command to be executed before reproduction of one item 204 designated by the pointer 126PT. The post command 126PS as an example of the second post command according to the present invention indicates a command to be executed after the reproduction of said one item 204. Other information 126-6 included in the playlist element 126-2 may include the next information to designate the playlist element 126-2 relating to the next reproduction of the reproduction of the playlist element 126-2.

As shown in FIG. 7, the item 204 is a minimum unit to be displayed. In the item 204, "in-point information" to indicate a start address of an object and "out-point information" to indicate an end address of the object are recorded. Incidentally, each of these "in-point information" and "out-point information" may indicate the address directly or indirectly as a time period or time point on the reproduction time scale. In the figure, if a plurality of ES's (Elementary Streams) is multiplexed for the object designated by "stream object #m", designating the item 204 means designating a special ES or special combination of ES's.

As shown in FIG. 8, the title element 200-2 logically consists of the pre-command 200PR or 126PR, the playlist set 126S selected by the pointer 200PT, the post command 200PS or 126PS, and the next information 200-6N. Therefore, a processing to select the playlist 126 from among the playlist set 126S is executed, according to any condition reproducible in a system, such as video resolution.

As shown in FIG. 9, however, if the playlist set designated by the pointer 200PT consists of only one playlist, i.e. if the playlist set 126S shown in FIG. 3 is replaced by a single playlist 126, the tile element 200-2 may logically consist of the pre-command 200PR or 126PR, the playlist 126 to be reproduced during the reproduction operation, the post command 200PS or 126PS, and the next information 200-6N. In this case, once the playlist set is designated for the reproduction, the single playlist 126 is reproduced, regardless of the condition reproducible in the system.

Again in FIG. 3, in the object information file 130, the storage position (i.e. the logical address of the reproduction object) in the object data file 140 for each item constructed in each playlist 126, and/or various attribute information relating to the reproduction of the item are stored. Particularly in this embodiment, the object information file 130 stores the AU table 131 including a plurality of AU (Associate Unit) information 132I (AU #1-#q) as mentioned below, the ES (Elementary Stream) map table 134 and other information 138.

The object data file 140 stores a plurality of TS objects 142 (TS #1 object-TS #s object) for each transport stream (TS), i.e. entity data of contents to be actually reproduced.

Incidentally, four kinds of file discussed with reference to FIG. 3 can be further divided into a plurality of files respectively to be stored. All these files may be managed by the file system 105. For example, the object data file 140 can be divided into a plurality of files such as object data file #1, object data file #2 and so on.

As shown in FIG. 10, the TS object 142 shown in FIG. 3, as a logically reproducible unit, may be divided into a plurality of aligned units 143 each having 6kB of data amount. The head of the aligned units 143 is aligned with the head of the TS object 142. Each aligned unit 143 is further divided into a plurality of source packets 144 each having 192B of data amount. The source packet 144 is a physically reproducible unit, on the basis of which (i.e. packet by packet) at least the video data, the audio data and the sub-picture data from among the data on the optical disc 100 are multiplexed, and other information may be multiplexed in the same manner. Each source packet 144 includes the control information 145 having 4B of data amount to control the reproduction, such as the packet arrival time stamp or the like indicating the reproduction start time point of the TS (Transport Stream) packet on the reproduction time scale, and includes the TS packet 146 having 188B of data amount. The TS packet 146 (also referred to as "TS packet payload") has a packet header 146a at the head thereof. In the TS packet payload 146, the video data may be packetized as the "video packet", the audio data may be packetized as the "audio packet", or the sub-picture data may be packetized as the "sub-picture packet", otherwise other data may be packetized.

Figure 11:
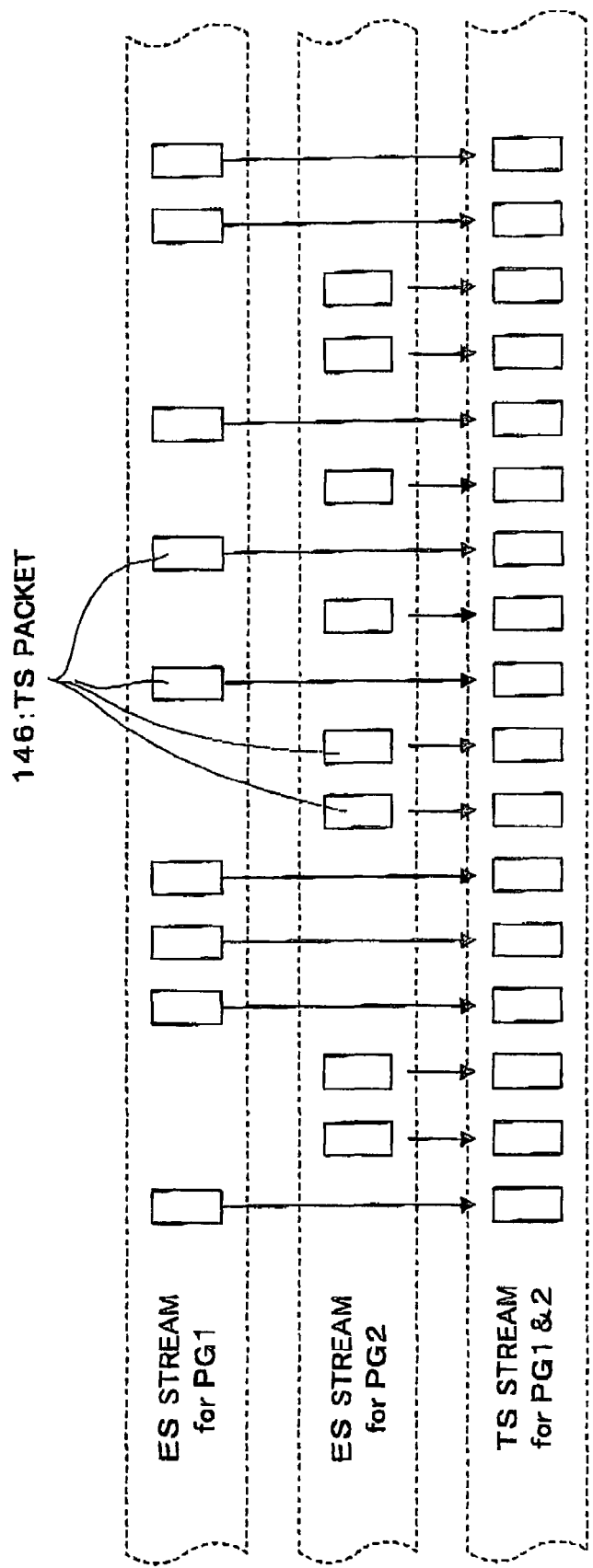
FIG. 11 is a view conceptually illustrating a situation in the embodiment that an elementary stream for a program #1, shown in the upper column, and en elementary stream for a program #2, shown in the middle column, are multiplexed to form a transport stream for these two programs, on the basis of a time scale in a horizontal direction.
Figure 12:
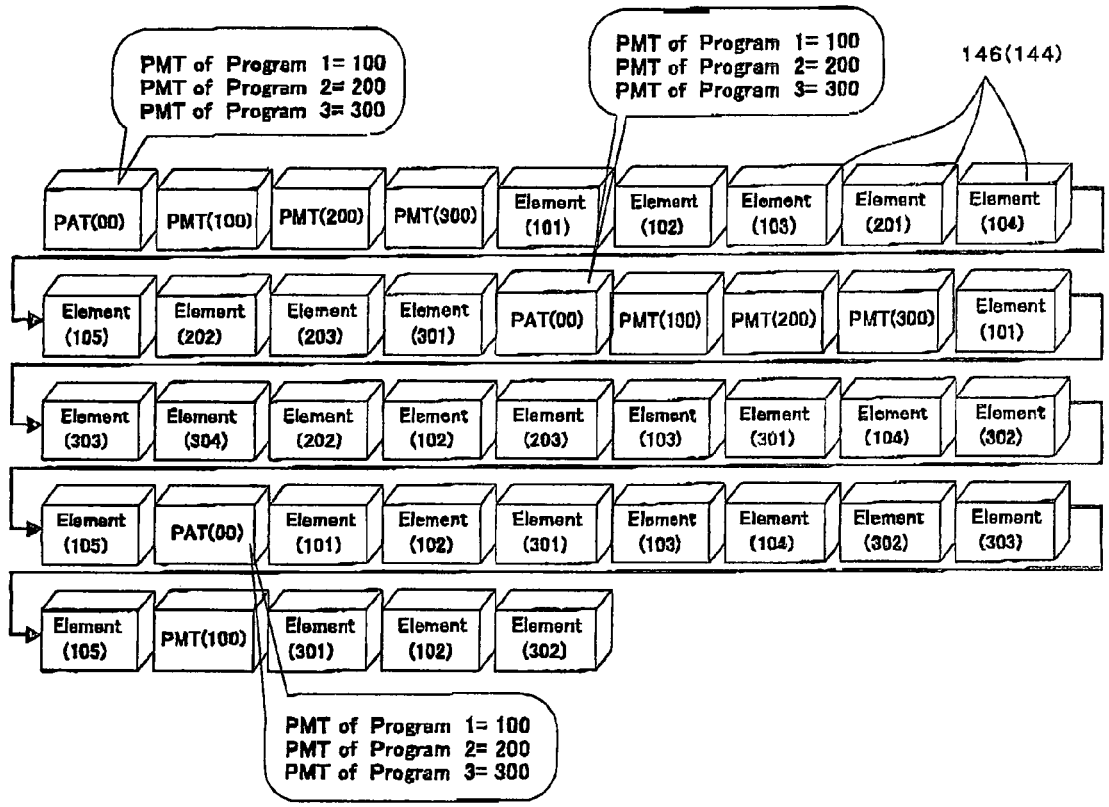
FIG. 12 is a view conceptually illustrating an image of TS packets multiplexed in one transport stream in the embodiment, as a packet arrangement based on the time scale.

Next, with reference to FIG. 11 and FIG. 12, an explanation is made on the multi-recording of the video data, the audio data, the sub-picture data and the like in the transport stream format on the optical disc 100 as shown in FIG. 2B, by the TS packet 146 shown in FIG. 4. FIG. 11 conceptually illustrates that the elementary stream (ES) for program #1 (PG1) in the upper stage and the elementary stream (ES) for program #2 (PG2) in the middle stage are multiplexed, and the transport stream (TS) for these two programs (PG1&2) is formed, under an assumption that a horizontal axis is defined as a time axis. FIG. 12 conceptually illustrates an image of the TS packets multiplexed in one transport stream (TS), as a packet array along the time.

As shown in FIG. 11, the elementary stream for program #1 (in the upper stage) may be formed by discretely arranging TS packets 146 obtained by packetizing the video data for program #1, along the time axis (horizontal axis). The elementary stream for program #2 (in the middle stage) may be formed by discretely arranging TS packets 146 obtained by packetizing the video data for program #2, along the time axis (horizontal axis). Then, these TS packets 146 are multiplexed so that the transport stream (in the lower stage) for two programs is made. Incidentally, omitted for convenience of explanation in FIG. 11, the elementary stream made of TS packets obtained by packetizing the audio data as the elementary stream for program #1, and/or the sub-picture stream made of TS packets obtained by packetizing the sub-picture data may be multiplexed similarly, as shown in FIG. 2B. In addition to this, the elementary stream made of TS packets obtained by packetizing the audio data, as the elementary stream for program #2, and the sub-picture stream made of TS packets obtained by packetizing the sub-picture data may be multiplexed similarly.

As shown in FIG. 12, in this embodiment, a plurality of TS packets 146 multiplexed as such forms one TS stream. Then, a plurality of TS packets 146 in the multiplexed form is multi-recorded onto the optical disc 100, with the information such as the packet arrival time stamp 145 and the like being added. Incidentally, in FIG. 12, the TS packet 146 consisting of the data forming program #i (i=1, 2, 3) is indicated by "element (i0j)", wherein, j (j=1, 2, . . . ) is a sequential number for each stream composing the program. This (i0j) is defined as a packet ID which is an identification number of the TS packet 146 for each elementary stream. This packet ID is fixed at an inherent value for a plurality of TS packets 146 to be multiplexed at the same time point, so that the plurality of TS packets 146 are distinguished from each other even if multiplexed at the same time point.

Furthermore, in FIG. 12, the PAT (Program Association Table) and the PMT (Program Map Table) are also packetized by the TS packet 146 unit and multiplexed. The PAT among them stores a table indicating a plurality of PMT packet ID's. Particularly, the PAT is defined by MPEG2 standard so that (000) is given as a predetermined packet ID, as shown in FIG. 12. That is, from among a plurality of packets multiplexed at the same time point, the TS packet 146 obtained by packetizing the PAT is detected, as the TS packet 146 whose packet ID is (000). The PMT stores a table indicating the packet ID for each elementary stream forming each program in one or more programs. Any packet ID can be given to the PMT, and their packet IDs are indicated by the PAT detectable with the packet ID (000) as mentioned above. Therefore, among a plurality of packets multiplexed at the same time point, the TS packets 146 obtained by packetizing the PMT (i.e. TS packets 146 to which packet IDs (100), (200) and (300) are given in FIG. 12) are detected on the basis of the PAT.

In the case that the transport stream as shown in FIG. 12 is transferred digitally, the tuner refers to the PAT and the PMT constructed as such and thereby extracts the multiplexed packets corresponding to the desired elementary stream and decodes the extracted packets.

In this embodiment, the packets of these PAT and PMT are included as the TS packets 146 to be stored in the TS object 142 shown in FIG. 10. That is, when the transport stream as shown in FIG. 12 is transferred, the transferred stream can be directly recorded onto the optical disc 100, which is a great advantage.

Furthermore in this embodiment, these PAT and PMT recorded as such are not referred to when the optical disc 100 is reproduced. Instead, referring to the AU table 131 and the ES map table 134, shown in FIG. 3 and mentioned in detail later, makes it possible to perform the reproduction effectively and apply to the complicated multi-vision reproduction or the like. For this, in this embodiment, a relationship between packets and the elementary stream obtained by referring to the PAT and the PMT on decoding or recording for example is stored in the object information file 130, in a form of AU table 131 and ES map table 134, without packetizing or multiplexing.

Figure 13:
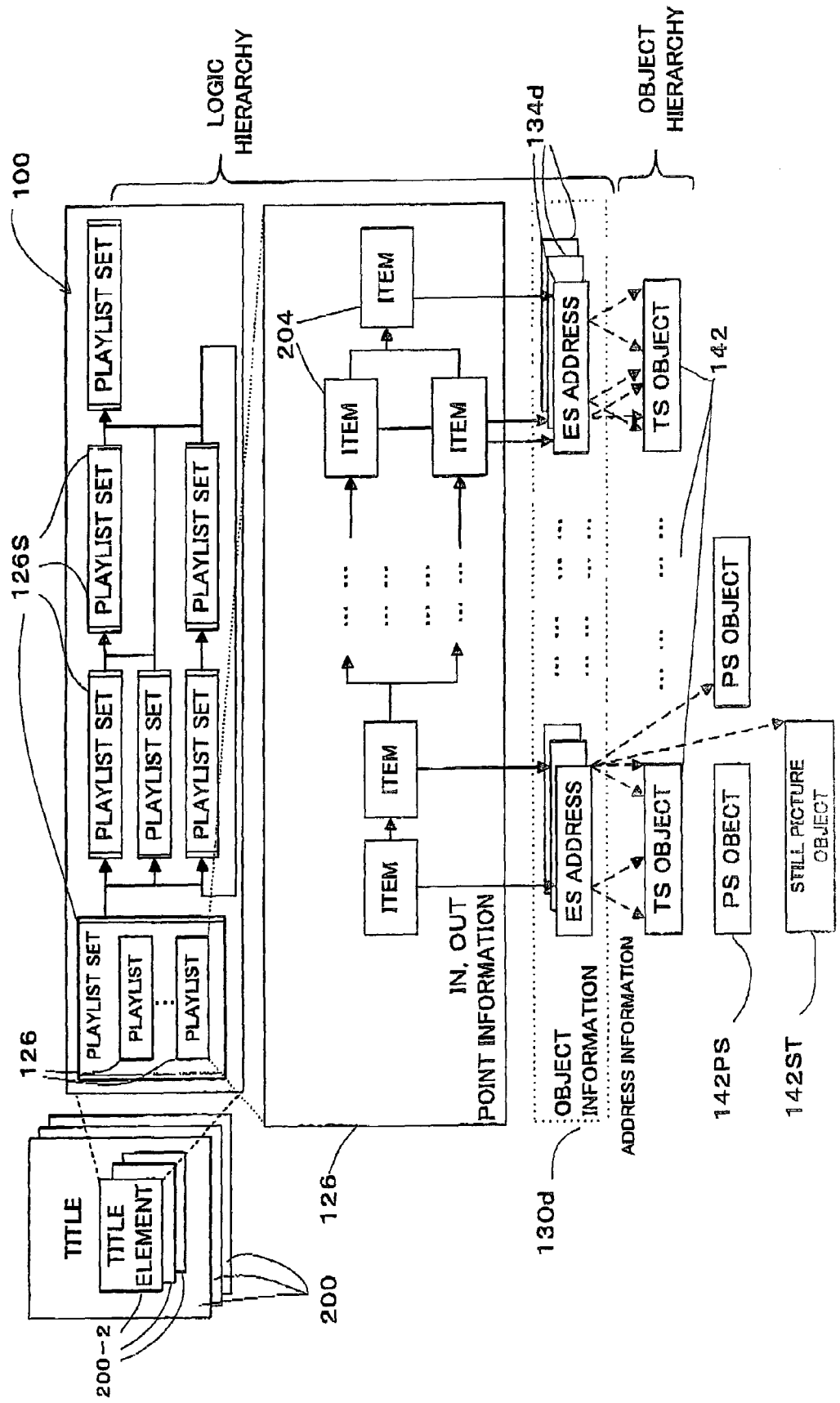
FIG. 13 is a view schematically illustrating a logical structure of data on an optical disc in the embodiment, focusing on development from a logic hierarchy to an object hierarchy or an entity hierarchy.

Next, with reference to FIG. 13, the logical structure of data on the optical disc 100 is discussed. FIG. 13 schematically illustrates the logical structure of data on the optical disc 100, focusing on the development from the logic hierarchy to the object hierarchy or the entity hierarchy.

In FIG. 13, one or more titles 200 that are a logical large unit such as one movie or one TV program are recorded onto the optical disc 100, Each title 200 includes one or more title elements 200-2. Each title element 200-2 logically consists of a plurality of playlist sets 126S. In each title element 200-2, the plurality of playlist sets 126S may have a sequential structure or may have a branch structure.

Incidentally, in the case of a simple logical structure, one title element 200-2 consists of one playlist set 126S. Furthermore, one playlist set 126S consists of one playlist 126. On the other hand, it is possible to refer to one playlist set 126S by a plurality of title elements 200-2 or a plurality of titles 200.

Each playlist 126 is logically made of a plurality of items (playitems) 204. In each playlist 126, a plurality of items 204 may have the sequential structure or may have the branch structure. On the other hand, it is possible to refer to one item 204 by a plurality of playlists 126. The aforementioned in-point information and out-point information recorded on/in the item 204 logically designates the reproduction range of the TS object 142. Then, the object information 130d of the logically designated reproduction range is referred to and thereby the reproduction range of the TS object 142 is physically designated, via the file system finally. Here, the object information 130d includes various information to reproduce the TS object 142, such as the attribute information of the TS object 142, the ES address information 134d and the like required for the data search in the TS object 142 (incidentally, the ES map table 134 shown in FIG. 3 includes a plurality of ES address information 134d).

Then, when the information record reproduction apparatus reproduces the TS object 142 as mentioned below, a physical address to be reproduced in the TS object 142 is obtained from the item 204 and the object information 130d so that a desired elementary stream is reproduced.

An EP (entry point) map shown in the object information 130d in FIG. 13 and having the plural pieces of ES address information 134d indicates an object information table putting the AU table 131 and the ES map table 134 together here.

Thus, in this embodiment, the in-point information and out-point information recorded on/in the item 204, as well as the ES address information 134d recorded in the ES map table 134 (see FIG. 3) of the object information 130d make it possible to perform the association from the logic hierarchy to the object hierarchy in the reproduction sequence so that the elementary stream is reproduced.

As discussed above, in this embodiment, units of the TS packet 146 are multiplexed and recorded on the optical disc 100. Thereby, the transport stream including a plurality of elementary streams as shown in FIG. 2B can be multiplexed and recorded onto the optical disc 100. In this embodiment, in the case that digital broadcasting is recorded onto the optical disc 100, a plurality of programs can be recorded at the same time, within the restriction of the record rate. Nevertheless, a record method is employed herein, in which a plurality of programs is multiplexed and recorded for one TS object 142. Now, an explanation is made on an embodiment of the information record reproduction apparatus capable of performing such a record processing.

(Information Record Reproduction Apparatus)

Figure 14:
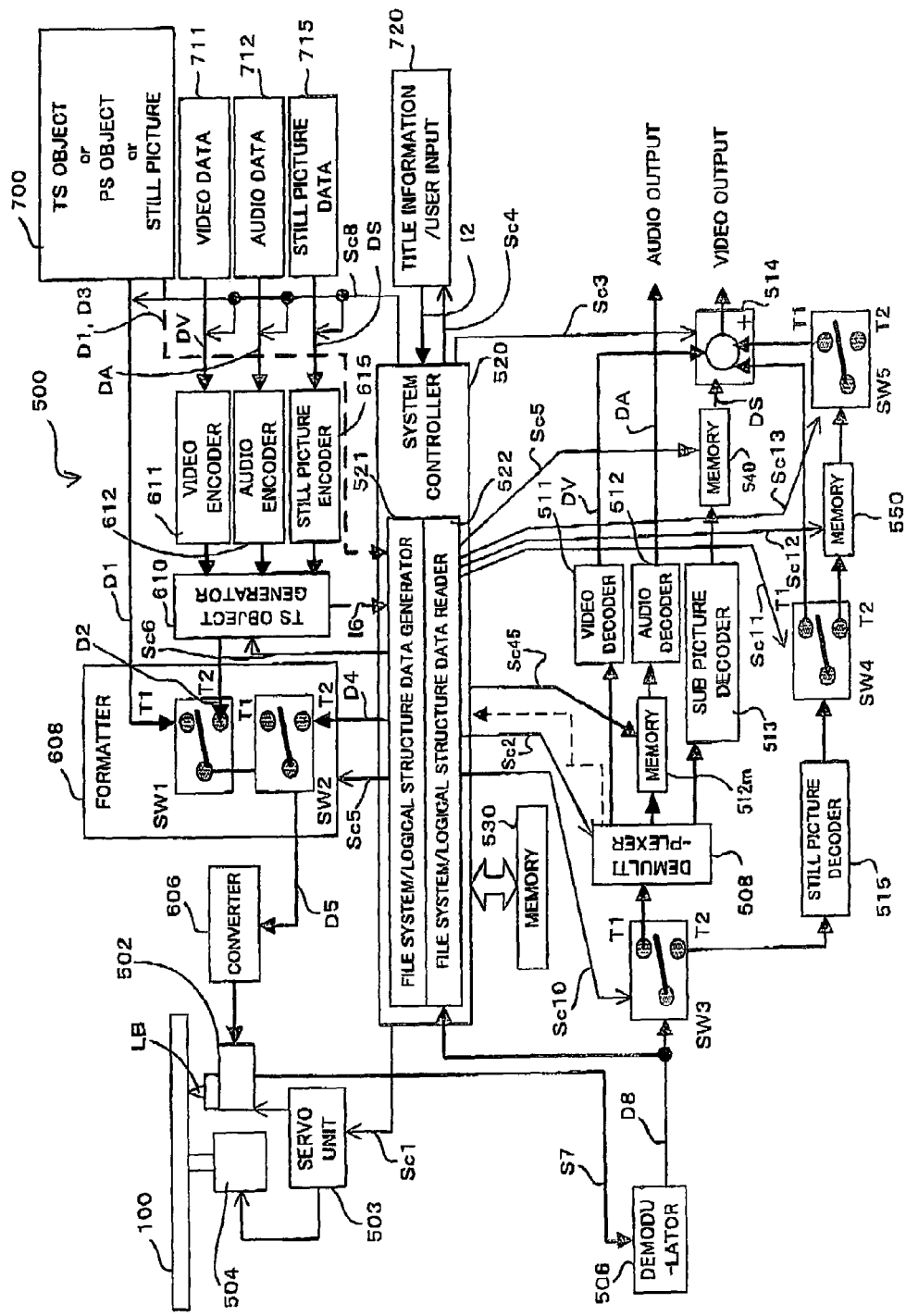
FIG. 14 is a block diagram schematically illustrating an information record reproduction apparatus according to the embodiment of the present invention.

Next, with reference to FIG. 14 to FIG. 19, an embodiment of the information record reproduction apparatus of the present invention is discussed. Here, FIG. 14 is a block diagram of the information record reproduction apparatus, and FIGS. 15 to 19 illustrate the operational flow.

In FIG. 14, an information record reproduction apparatus 500 is roughly divided into a reproduction system and a record system. The apparatus 500 is constructed to record the information onto the optical disc 100 mentioned above and reproduce the information recorded thereon/therein. In this embodiment, the information record reproduction apparatus 500 is thus for recording and reproduction. Nevertheless, an embodiment of the information record apparatus according to the present invention can be constructed basically with the record system of the apparatus 500 and an embodiment of the information reproduction apparatus according to the present invention can be constructed basically with the reproduction system of the apparatus 500.

The information record reproduction apparatus 500 is provided with: an optical pickup 502; a servo unit 503, a spindle motor 504; a decoder 506; a demultiplexer 508; a video decoder 511; an audio decoder 512; a memory 512m; a sub-picture decoder 513; an adder 514; a still picture decoder 515; a system controller 520; a memory 530; a memory 540; a memory 550; a modulator 606; a formatter 608; a TS object generator 610; a video encoder 611; an audio encoder 612; and a sub-picture encoder 613. The system controller 520 includes a file system/logical structure data generator 521 and a file system/logical structure data reader 522. Furthermore, the memory 530 and a user interface 720 to give a user input such as title information are connected to the system controller 520.

Among these constitutional elements, the decoder 506, the demultiplexer 508, the video decoder 511, the audio decoder 512, the memory 512m, the sub-picture decoder 513, the adder 514, the still picture decoder 515, the memory 540 and the memory 550 mainly construct the reproduction system. On the other hand, among these constitutional elements, the modulator 606, the formatter 608, the TS object generator 610, the video encoder 611, the audio encoder 612 and the sub-picture encoder 613 mainly constructs the record system. The optical pickup 502, the servo unit 503, the spindle motor 504, the system controller 520, the memory 530 and the user interface 720 to give the user input such as title information are generally shared for both the reproduction system and the record system. Furthermore, for the record system, a TS object data source 700 (or a PS object data source 700, or a still picture data source 700 such as bit map data and JPEG data); a video data source 711; an audio data source 712; and a sub-picture data source 713 are prepared. Furthermore, the file system/logical structure data generator 521 disposed in the system controller 520 is used mainly in the record system, and the file system/logical structure reader 522 is used mainly in the reproduction system.

The optical pickup 502 irradiates the optical disc 100 with a light beam LB such as a laser beam, at the first power as reading light for the reproduction, and at the second power with the light beam LB modified as writing light for recording. The servo unit 503 performs the focus servo, the tracking servo and the like for the optical pickup 502, as well as the spindle servo for the spindle motor 504, under control of the control signal Sc1 outputted from the system controller 520, during the reproduction and recording. The spindle motor 504 is controlled under the spindle servo by the servo unit 503, for rotating the optical disc 100 at a predetermined speed.

(i) Structure and Operation of Record System

Next, with reference to FIG. 14 to FIG. 18, a specific structure and the operation of each constitutional element constructing the record system of the information record reproduction apparatus 500 are explained in each case.

(i-1) The case that the already generated TS object is used

Figure 15:
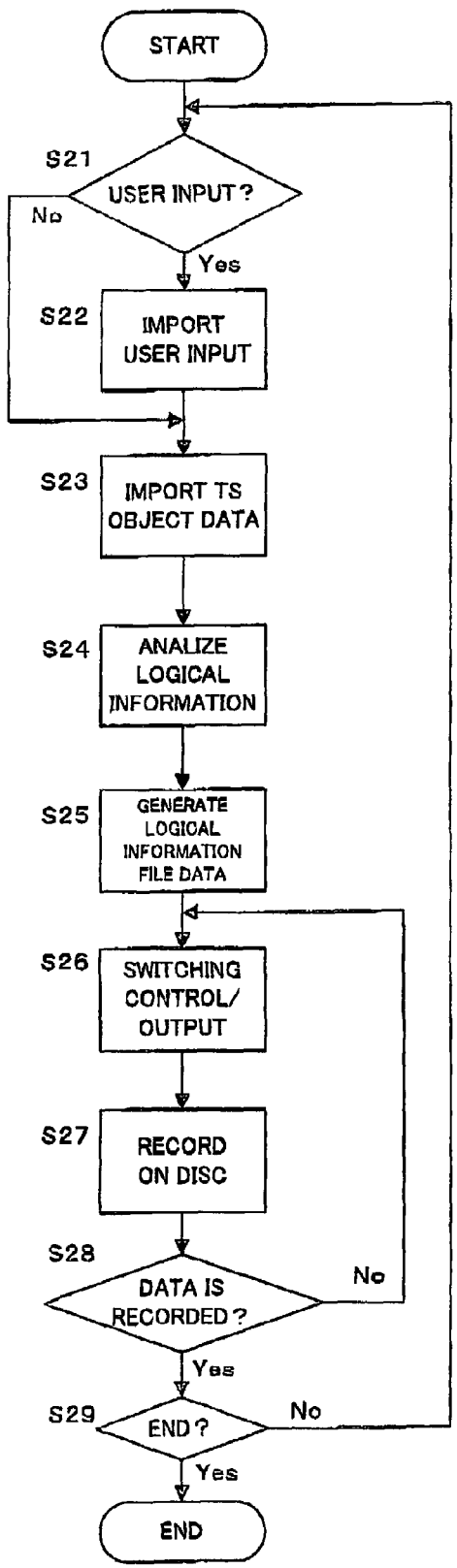
FIG. 15 is a flow chart indicating a recording operation (part 1) of the information record reproduction apparatus in the embodiment.

This case is discussed, with reference to FIG. 14 and FIG. 15.

In FIG. 14, the TS object data source 700 may be made of the memory storage such as a video tape, a memory, for storing the TS object data D1.

Firstly in FIG. 15, each title information (e.g. playlist contents etc.) to be logically constructed on the optical disc 100 using the TS object data D1 is inputted into the system controller 520, as the user input 12 such as the title information, via the user interface 720. Then, the system controller 520 imports the user input 12 such as the title information via the user interface 720 (step S21: Yes, and step S22), In this case, the user interface 720, under control of the control signal Sc4 from the system controller 520, can perform the input operation in response to the contents to be recorded, such as the selection via the title menu screen. Incidentally, if the user input is already performed (step S21: No), these processings are omitted.

Next, the TS object data source 700 outputs the TS object data D1, under control of the control signal Sc8 to indicate the data reading from the system controller 520. Then, the system controller 520 imports the TS object data D1 from the TS object data source 700 (step S23), and performs the data array analysis (e.g. a record data length and the like) of the TS object data D1, the analysis of each elementary stream structure (e.g. understanding of ES_PID (elementary stream/packet identification number)), on the basis of the PAT, the PMT and the like packetized with the video data as mentioned above, due to the TS analysis feature in the file system/logical structure data generator 521 (step S24).

Next, the system controller 520 makes the file system/logical structure data generator 521 generate the disc information file 110, the playlist information file 120, the object information file 130 and the file system 105 (see FIG. 3), as the logical information file data D4, on the basis of the analysis result of each elementary stream and the TS object data D1 data array, as well as the user input 12 such as the imported title information (step S25). The memory 530 is used to generate this logical information file data D4.

Incidentally, variations in which the data about each elementary stream structure information and the TS object data D1 data array may be prepared in advance are naturally understood or suggested, all of which are encompassed within a scope of the embodiment.

In FIG. 14, the formatter 608 is for formatting the data array to store both the TS object data D1 and the logical information file data D4 on the optical disc 100. More specifically, the formatter 608 is provided with a switch Sw1 and a switch Sw2 and is switching-controlled by a switch control signal Sc5 from the system controller 520. When formatting the TS object data D1, it connects the switch Sw1 to a T1 side and the switch Sw2 to the T1 side so as to output the TS object data D1 from the TS object data source 700. Incidentally, the transmission control of the TS object data D1 is performed by the control signal Sc8 from the system controller 520. On the other hands when formatting the logical information file data D4, the formatter 608 is switching-controlled by the switch control signal Sc5 from the system controller 520, and connects the switch Sw2 to a T2 side so as to output the logical information file data D4.

At step S26 in FIG. 15, (i) the logical information file data D4 from the file system/logical structure data generator 521 at the step S25 or (ii) the TS object data D1 from the TS object data source 700 is outputted through the formatter 608, under the switching-control by the formatter 608 as constructed above (step S26).

The selection output from the formatter 608 is transmitted to the modulator 606 as disc image data D5, and modulated by the modulator 606, and recorded onto the optical disc 100 through the optical pickup 502 (step S27). The system controller 520 also executes the disc record control in this case.

Then, if both the logical information file data D4 generated at the step S25 and the corresponding TS object data D1 have not been completely recorded yet, the operational flow returns to the step S26 to continue the recording (step S28: No). Incidentally, there is no preference in the record sequence of the logical information file data D4 and the corresponding TS object data D1.

On the other hand, if the both have been already recorded, it is judged whether or not the recording onto the optical disc 100 is to be ended, on the basis of the presence or absence of an end command (step S29). If it is not to be ended (step S29: No), the operational flow returns to the step S21 to continue the recording. On the other hand, if it is to be ended (step S29: Yes), a series of record processing ends.

As described above, the information record reproduction apparatus 500 performs the record processing in the case of using the already prepared TS object.

Incidentally, the example in FIG. 15 shows that the logical information file data D4 and the corresponding TS object data D1 are outputted at the step S26, after preparing the logical information file data D4 at the step S25. However, it is also possible to output the object data D1 and/or record the object data D1 onto the optical disc 100 before the step S25, so that the logical information file data D4 is generated and/or recorded after or in parallel with this recording.

Additionally, instead of the TS object data source 700, the PS object data source or the still picture data source may be used. In this case, the above-mentioned record processing to the TS object data D1 is executed to the still picture data such as the PS object data, the bit map data and the JPEG data, instead of the TS object data D1. Then, in the object data file 140, the PS object data or the still picture object data is stored in addition to or instead of the TS object 142 (see FIG. 3). The respective logical information related to the PS object data or the still picture object data is generated under the control of the system controller 520 to be stored in the disc information file 110, the playlist information file 120 and the object information file 130.

(i-2) The Case of Receiving and Recording the Transport Stream on Air

Figure 16:
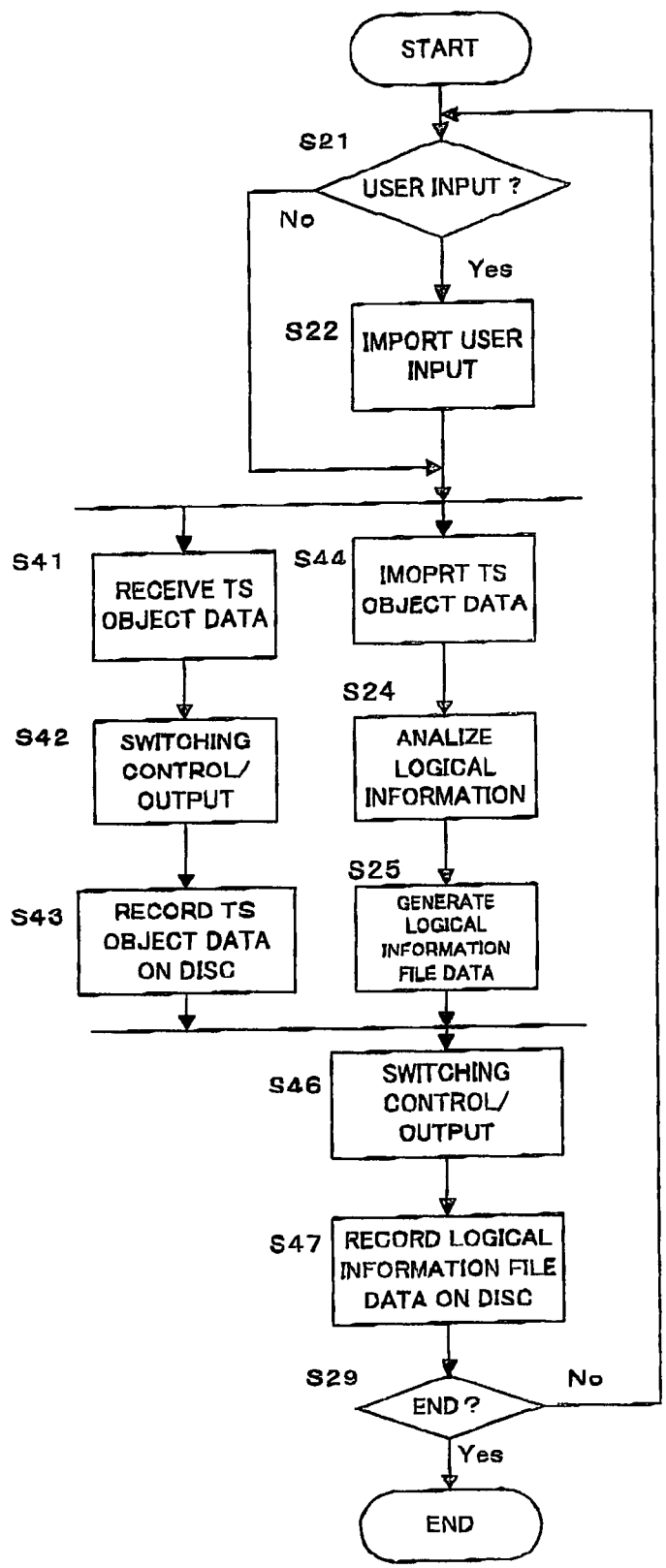
FIG. 16 is a flow chart indicating a recording operation (part 2) of the information record reproduction apparatus in the embodiment.

This case is explained with reference to FIG. 14 and FIG. 16. Incidentally, in FIG. 16, the same steps as those in FIG. 15 have the same step reference numbers, and their explanation is omitted as occasion demands.

Again, in this case, the similar processing is performed, as is "the case of using the already prepared TS object" described above. Therefore, the following explanation is focused on the differences from this case.

In the case of receiving and recording the transport stream on air, the TS object data source 700 is provided with a receiver (set top box) for receiving the digital broadcast on air, for example, receives the TS object data 01, and transmits it to the formatter 608 in real time (step S41). At the same time, reception information D3 (i.e. information corresponding to the data transmitted through the receiver and the interface of the system controller 520) including the program construction information and the belowmentioned ES_PID information, which are deciphered upon receiving, is imported into the system controller 520 and is stored into the memory 530 (step S44).

In the meantime, the TS object data D1 outputted to the formatter 608 is outputted to the modulator 606 under the switching-control by the formatter 608 (step S42), and is recorded onto the optical disc 100 (step S43).

Along with these operations, using the program construction information and the ES_PID information included in the reception information D3 imported upon receiving and stored in the memory 530, the file system/logical structure data generator 521 prepares the logical information file data D4 (step S24 and step S25). Then, after the completion of recording a series of the TS object data D1, this logical information file data D4 is additionally recorded onto the optical disc 100 (step S46 and step S47). Incidentally, these steps S24 and S25 may be performed after the step S43.

Moreover, as the occasion demands (e.g. in the case of editing one portion of the title, or the like), by adding the user input 12 of the title information and the like from the user interface 720 to the program construction information and the ES_PID information stored in the memory 530, it is possible to prepare the logical information file data D4 by the system controller 520 and additionally record this onto the optical disc 100.

As described above, the information record reproduction apparatus 500 performs the record processing in the case of receiving the transport stream on air and recording it in real time.

Incidentally, if all the reception data obtained when broadcasting is once stored into an archive apparatus, and then, if this is used as the object source 700, the same processing as that in "the case of using the already prepared TS object" will do.

Figure 17:
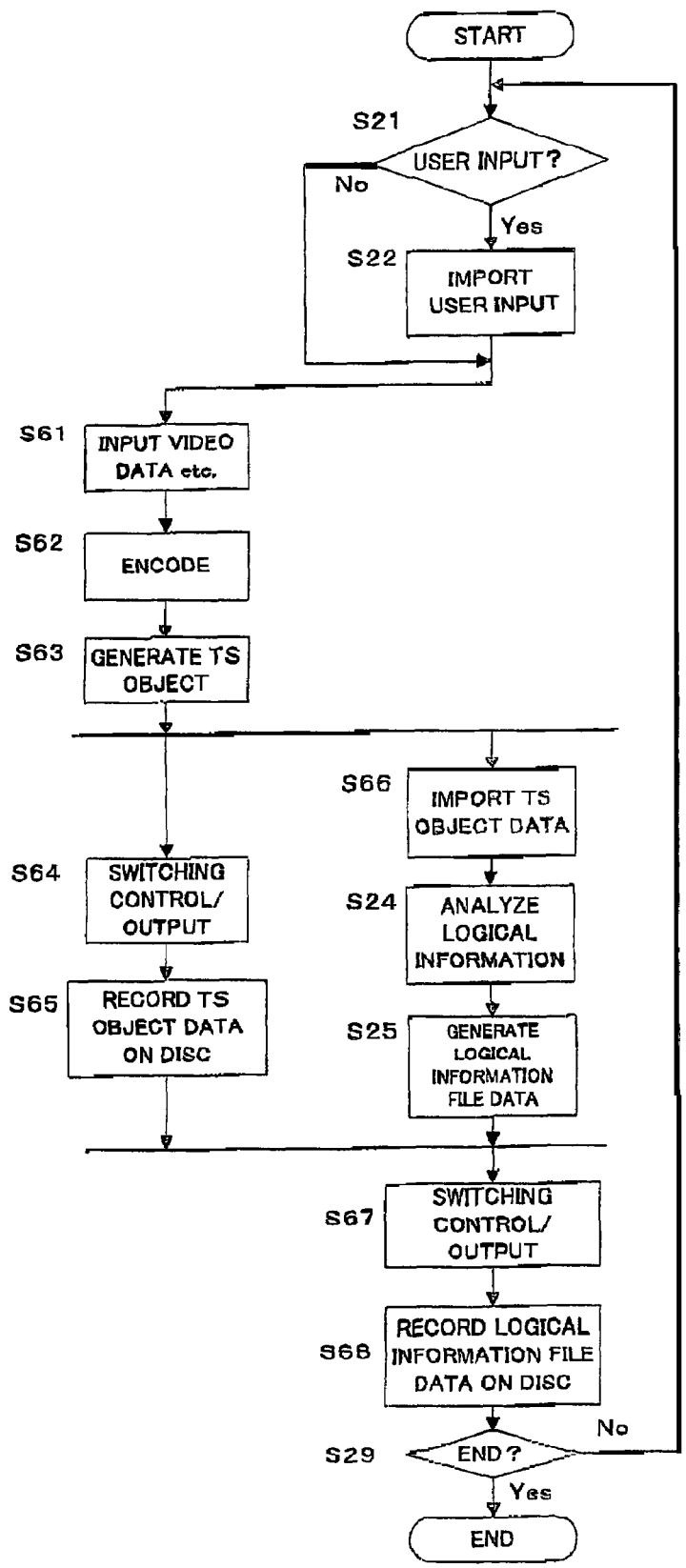
FIG. 17 is a flow chart indicating a recording operation (part 3) of the information record reproduction apparatus in the embodiment.

(i-3) The Case of Recording the Video Data, the Audio Data and the Sub-picture Data This case is explained with reference to FIG. 14 and FIG. 17. Incidentally, in FIG. 17, the same steps as those in FIG. 15 have the same step reference numbers, and their explanation is omitted as occasion demands.

In the case of recording the video data, the audio data, and the sub-picture data, which are individually prepared in advance, the video data source 711, the audio data source 712, and the sub-picture data source 713 are individually provided with the memory storage, such as a video tape and a memory, and store a video data DV, an audio data DA, and a sub-picture data DS, respectively.

These data sources are controlled by the control signal Sc8 giving an instruction for reading out the data from the system controller 520, and they transmit the video data DV, the audio data DA, and the sub-picture data DS, to the video encoder 611, the audio encoder 612, and the sub-picture encoder 613, respectively (step S61). Then, the video encoder 611, the audio encoder 612, and the sub-picture encoder 613 execute a predetermined type of encode processing (step S62).

The TS object generator 610 is controlled by a control signal Sc6 from the system controller 520 and converts the data encoded in this manner to the TS object data constituting the transport stream (step S63). In this case, the data array information of each TS object data (e.g. a record data length and the like) and the construction information of each elementary stream (e.g. the ES-PID, as described later, and the like) are transmitted as information 16 from the TS object generator 610 to the system controller 520 and are stored into the memory 530 (step S66).

On the other hand, the TS object data generated by the TS object generator 610 is transmitted to the T2 side of the switch Sw1 of the formatter 608. Namely, when formatting the TS object data from the TS object generator 610, the formatter 608 is switching-controlled by the switch control signal Sc5 from the system controller 520 to shift the switch Sw1 to the T2 side and the switch Sw2 to the T1 side, thereby outputting the TS object data (step S64). Then, this TS object data is recorded onto the optical disc 100 through the modulator 606 (step S65).

Along with these operations, using the data array information of each TS object data and the construction information of each elementary stream imported as the information 16 into the memory 530, the file system/logical structure data generator 521 prepares the logical information file data D4 (step S24 and step S25). Then, after the completion of recording a series of the TS object data D2, the logical information file data D4 is additionally recorded onto the optical disc 100 (step S67 and step S68). Incidentally, the step S24 and the step S25 may be processed after the step S65.

Moreover, as the occasion demands (e.g. in the case of editing one portion of the title), by adding the user input 12 such as the title information and the like from the user interface 720 to these information stored in the memory 530, it is possible to prepare the logical information file data D4 by the file system/logical structure generator 521 and additionally record this onto the optical disc 100.

As described above, the information record reproduction apparatus 500 performs the record processing in the case of recording the video data, the audio data, and the sub-picture data, which are individually prepared in advance.

Incidentally, this record processing is applicable even when recording an arbitrary content the user has.

(i-4) The Case of Recording the Data by Authoring

Figure 18:
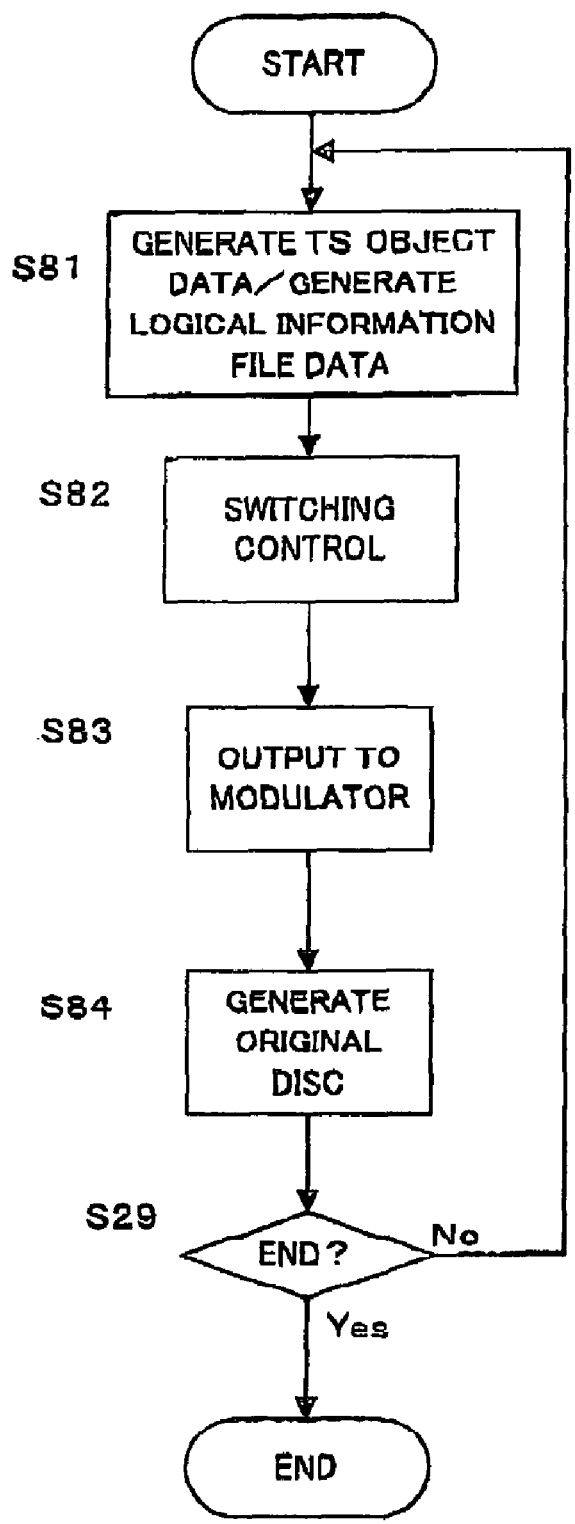
FIG. 18 is a flow chart indicating a recording operation (part 4) of the information record reproduction apparatus in the embodiment.

This case is explained with reference to FIG. 14 and FIG. 18. Incidentally, in FIG. 18, the same steps as those in FIG. 15 have the same step reference numbers, and their explanation is omitted as occasion demands.

In this case, by combining the above described three types of record processing in the three cases, an authoring system generates the TS object, the logical information file data, and the like in advance (step S81), and then completes the processing until switching-control performed at the formatter 608 (step S82). Then, the information obtained by this operation is transmitted, as the disc image data D5, to the modulator 606 equipped in front of and/or behind an original disc cutting machine (step S83), and this cutting machine prepares the original disc (step S84).

(ii) Structure and Operation in Reproduction System

Next, the specific structure and operation of each constitutional element constituting the reproduction system of the information record reproduction apparatus 500 is explained with reference to FIG. 14 and FIG. 19.

In FIG. 14, via the user interface 720, the title to be reproduced from the optical disc 100, its reproduction condition and the like are inputted to the system controller 520, as the user input 12 such as the title information and the like. In this case, under control of the control signal Sc4 from the system controller 520, the input processing suitable for the content to be reproduced, such as a selection on a title menu screen, can be achieved by the user interface 720.

Responding to this, the system controller 520 controls the disc reproduction with respect to the optical disc 100, and the optical pickup 502 transmits a reading signal S7 to the demodulator 506.

The demodulator 506 demodulates a recorded signal recorded onto the optical disc 100 from this reading signal S7, and outputs it as demodulated data DB. The logical information file data (i.e. the file system 105, the disc information file 110, the P list information file 120, and the object information file 130, shown in FIG. 3) included in this demodulated data D8 as being a not-multiplexed information part is supplied to the system controller 520. On the basis of this logical information file data, the system controller 520 executes various reproduction control, such as processing of determining a reproduction address and controlling the optical pickup 502.

Meanwhile, according to whether the modulated data D8 includes the TS object data as the multiplexed information part, the still picture data or both of them, a switch Sw3 is controlled by a control signal Sc1 outputted from the system controller 520 to be switched on the side of the demultiplexer 508, i.e., on the T1 side, or on the side of the still picture decoder 515, i.e., on the T2 side. Thereby, selectively, the TS object data is supplied to the demultiplexer 508, and the still picture data is supplied to the still picture decoder 515.

On the other hand, the demultiplexer 508 is controlled by the control signal Sc2 from the system controller 520, and demultiplexes the TS object data, included in the demodulated data D8, serving as the multiplexed information portion. The control signal Sc2 is transmitted so that the demultiplexing is started after the completion of the access to the reproduction position address under the reproduction control by the system controller 520.

The video packet, the audio packet and the sub-picture packet are transmitted respectively from the demultiplexer 508 and supplied respectively to the video decoder 511, the audio decoder 512 and the sub-picture decoder 513.

As a previous unit of the audio decoder 512, the memory 512m is provided. The memory 512m has a function of a buffer of the audio data when the audio data is reproduced in accordance with the reproduction of the still picture in a browseable slide show, which will be described later. Namely, the memory 512m always maintains predetermined amount of audio data so that the audio reproduction is never interrupted in the browseable slide show, and outputs it to the audio decoder 512. To the memory 512m, a control signal Sc45 is supplied from the system controller 520. The system controller 520 manages a writing address and a reading address of the audio data to the memory 512m by the control signal Sc45. At the same time, the system controller 520 checks and controls the amount of the audio data stored in the memory 512m so that the audio data is sufficient.

In the decoder 511, the audio decoder 512 and the sub-picture decoder 513, the video data DV, the audio data DA and the sub-picture data DS are decoded, respectively. At this time, the sub-picture data DS is supplied to the adder 514 via the memory 540. Under the control by the control signal Sc5 from the system controller 520, the sub-picture data DS is outputted from the memory 540 at the predetermined timing or selectively. Then, the sub-picture data DS is suitably superimposed on the video data DV. Namely, the timing and necessity of the superimposing can be controlled as compared with the case that the sup-picture data outputted from the sup-picture decoder 513 is directly superimposed. For example, by the output control with the control signal Sc5, it becomes possible that, on the main video, a caption with the sub-picture is or is not suitably displayed or a menu screen with the sub-picture is or is not suitably displayed.

Incidentally, although the packets obtained by packetizing the PAT or the PMT, included in the transport stream shown in FIG. 6, are included as a part of the demodulated data D8, respectively, they are discarded or abandoned at the demultiplexer 508.

The adder 514 is controlled by a control signal Sc3 giving an instruction of the mixing from the system controller 520, and mixes or superimposes in a predetermined timing the video data DV and the sub-picture data DS, which are respectively decoded at the video decoder 511 and the sub-picture decoder 513, The result is outputted as a video output from the information record reproduction apparatus 500 to a TV monitor, for example.

On the other hand, the audio data DA decoded at the audio decoder 512 is outputted as an audio output from the information record reproduction apparatus 500 to an external speaker, for example.

Instead of or in addition to the reproduction processing of the video data DV and the sub-picture data DS, when the still picture data is included in the decoded data D8, the still picture data is supplied to the still picture decoder 515 via the switch Sw3 controlled by the control signal Sc10 outputted from the system controller 520. The still picture data such as the decoded bit map data and the JPEG data is controlled by the control signal Sc11 from the system controller 520 to be directly added to the adder 514 via a switch Sw4. Or the still picture data is stored in the memory 550 once, via the switch Sw4. Under the control by the control signal Sc12 outputted from the system controller 520, the still picture data is outputted from the memory 550 at the predetermined timing or selectively. Then, the outputted still picture data is supplied to the adder 514 via the switch Sw5. Thereby, the still picture data is suitably superimposed on the video data DV and the sub-picture data DS. Namely, the timing and necessity of the superimposing can be controlled as compared with the case that the still picture data outputted from the still picture decoder 515 is directly superimposed. For example, by the output control with using the control signal Sc12, it becomes possible that the still picture such as the menu screen or the window screen or the still picture serving as the background image, in which the still picture data is used, is or is not suitably displayed on the main video and the sub-picture.

Additionally, the still picture data may be separately outputted through a passage (not shown) via the switch Sw5 switched on the T2 side, under the control by the control signal Sc13 from the system controller 520. Or, if the switch Sw5 is switched on the T2 side, no still picture data may be outputted from the switch Sw5. Here, the specific example of a reproduction processing routine by the system controller 520 is explained with reference to a flow chart of FIG. 19.

Figure 19:
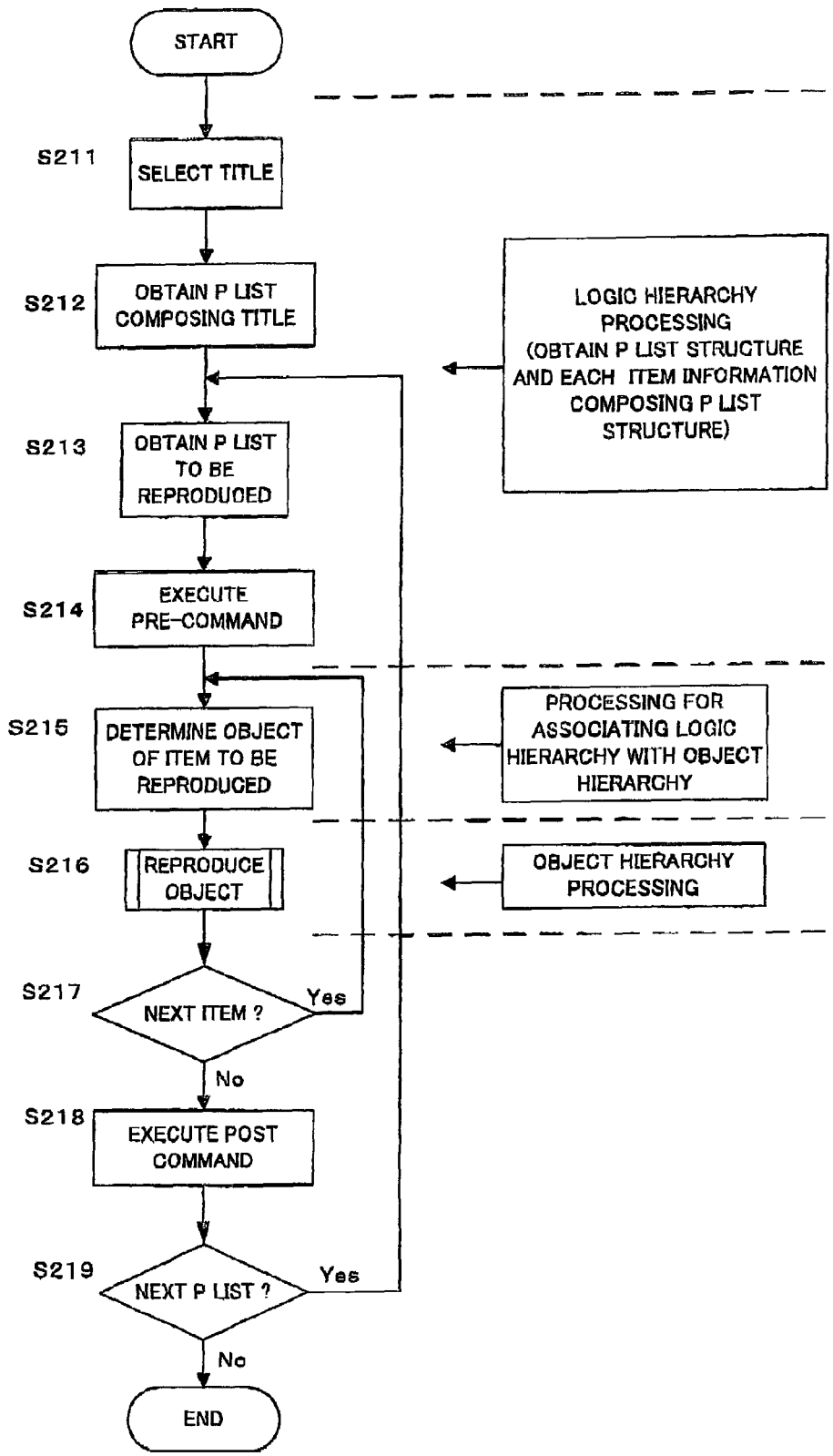
FIG. 19 is a flow chart indicating a reproduction operation of the information record reproduction apparatus in the embodiment.

In FIG. 19, it is assumed that as an initial condition, the recognition of the optical disc 100 in the reproduction system and the recognition of a volume structure and a file structure by the file system 105 (see FIG. 3) have been already completed by the system controller 520 and the file system/logical structure data reader 522 inside of the system controller 520. Here, an explanation is made on the operational flow after obtaining the total number of the total titles from the disc general information 112 in the disc information file 110 and then choosing or selecting one title 200 from among them.

Firstly, the selection of the title 200 is performed via the user interface 720 (step S211). Responding to this, the system controller 520 obtains the information about the reproduction sequence from a reading result of the file system/logical structure data reader 522. Incidentally, in the selection of the title 200, the desired title element(s) 200-2 (see FIG. 4) may be selected from among a whole title elements 200-2 composing the title 200, with the aid of an external input operation by the user with using a remote controller and the like, or one title element 200-2 may be selected automatically depending on a system parameter or the like adjusted for the information record reproduction apparatus 500.

Then, contents of a plurality of playlists 126 composing a playlist set 126S corresponding to the selected title 200 (title element 200-2) are obtained. Here, as a processing at a logic hierarchy, the information about the each playlist 126 structure and each item 204 composing each playlist (see FIG. 5, FIG. 6 and FIG. 13) is obtained (step S212).

Then, contents of the playlist 126 to be reproduced is obtained from among a plurality of playlists 126 obtained at step S212. For example, herein, the reproduction is started from a playlist #1, and the contents of the corresponding playlist 126 is obtained (step S213). The contents of the playlist 126 may be one or more playlist elements 126-2 (see FIG. 5), which are obtained by the obtaining processing at step S213.

Then, the pre-command 126PR (see FIG. 5) included in this playlist 126 is executed (step S214). Incidentally, it is possible or the pre-command 126PR to select one from among a plurality playlist 126, which composes the playlist set 126S with a certain relationship of the plurality of playlists 126. If the playlist element 126-2 composing the playlist 126 does not have the pre-command 126PR, this processing is omitted.

Then, the TS object 142 (see FIG. 3 and FIG. 10) to be reproduced is determined (step S215), on the basis of the item 204 (see FIG. 5 to FIG. 7) identified by the playlist 126 obtained at step S213. More specifically, on the basis of the item 204, the object information file 130 (see FIG. 3) relating to the TS object 142 as the reproduction target is obtained and a stream number, address and the like of the TS object 142 to be reproduced are identified.

Incidentally, in this embodiment, also the belowmentioned AU (Association Unit) information 132I and PU (Presentation Unit) information 302I are obtained as the information stored in the object information file 130. On the basis of these information, the aforementioned logic hierarchy is associated with the object hierarchy (see FIG. 13).

Then, the reproduction of the TS object 142 determined at step S21S is actually started. That is, on the basis of the processing at the logic hierarchy, the processing at the object hierarchy is started (step S216).

During the reproduction of the TS object 142, it is judged whether or not the next item 204 composing the playlist 126 to be reproduced exists (step S217). Then, insofar as the next item 204 exists (step S217: Yes), the process goes back to the step S215 to repeat the aforementioned determination and the reproduction of the TS object 142.

On the other hand, at the judgment at step S217, if it is judged that the next item 204 does not exist (step S217: No), the post command 126PS (see FIG. 5) corresponding to the presently executed playlist 126 is executed (step S218). Incidentally, if the playlist element 126-2 composing the playlist 126 does not have the post command 126PS, this processing is omitted.

Then, it is judged whether or not the next playlist 126 composing the selected title 200 exists (step S219). If exists (step S219: Yes), the process goes back to the step S213 to repeat the processings following obtaining the playlist 126 to be reproduced.

On the other hand, at the judgment at step S219, if it is judged that the next playlist 126 does not exist (step S219: No), i.e. if the all playlists 126 to be reproduced corresponding to the title 200 selected at step S211 are completely reproduced, a series of reproduction operations or processings is terminated.

As discussed above, the information record reproduction apparatus 500 in this embodiment reproduces the optical disc 100.

(Method of Selecting Playlist in Playlist Set)

In the present embodiment, the playlist 126 corresponding to the desired contents information is suitably selected from the playlist set 126S included in the reproduced playlist information file 120.

The pre-command 200PR (see FIG. 4) included in the title element 200-2 has a playlist selection command group list in which a selection condition is written for each playlist 126. The selection of the playlist may be performed in accordance with the selection condition, for example. In addition, the selection of the playlist may be performed in accordance with the attribute information (e.g., information indicating an attribute of the contents information related to the playlist, such as a video resolution for a video function, distinction of progressive/interleave, a video codec, a number of audio channels, a audio codec and the like) added to each playlist 126 stored in the playlist set 126S. Alternatively, the selection may be performed in accordance with the playlist set control information, included in the title element 200-2, in which the selection condition is stored for each playlist. By such the selection, the playlist corresponding to the desired contents information such as the desired program, the desired parental block, the desired angle block and the like can be selected, for example. Also, the playlist reproducible by the information reproduction system and preferably capable of making the best use of the video reproduction function and a sound reproduction function of the information reproduction system can be selected, for example.

(Browseable Slide Show)

Next, the description will be given of the browseable slide show according to the present invention. The browseable slide show is to reproduce still picture sets including the plural still pictures in order. In this case, along with the reproduction of the still picture, the audio such as the BGM can be reproduced, for example. In the browseable slide show according to the present invention, the still picture is mainly reproduced, and the audio can be reproduced in synchronization with the reproduction of the still picture. Namely, the display clock (time axis) of the still picture is used as reference, the still picture is regarded as main contents, and the reproduction of the audio is controlled during a display time period (time axis) of the still picture.

The reproduction time of default is logically set to each still picture. The reproduction time may be a finite value or an infinite value. That the reproduction time of the still picture is the finite value means that, if there is no user operation (display of the subsequent still picture), the reproduction of the still picture automatically ends after the reproduction time passes. For example, when the reproduction time of a certain still picture is set to 3 seconds, the still picture is displayed for 3 seconds in the browseable slide show. After that, the subsequent still picture is reproduced, or the browseable slide show ends. Meanwhile, that the reproduction time of the still picture is the infinite value means the still picture is maintained displayed until the display of the subsequent still picture is instructed by the user operation. Namely, the reproduction instruction of the subsequent still picture by the user operation includes user's pushing of "Next" button on the remote controller of the reproduction apparatus, for example.

As for the browseable slide show, "still picture repeat flag" and "audio repeat flag" are set as information defining the reproduction method of the still picture and the according reproduction method of the audio. The information is included in the playlist element 126-2 shown in FIG. 5, as will be described later.

"Still picture repeat flag" is information defining whether or not to repeatedly reproduce the plural still pictures in the browseable slide show. When the still picture repeat flag is set to the ON state, the still picture set including the plural still pictures are repeatedly reproduced. When the still picture repeat flag is set to an OFF state, the reproduction of the still picture set is performed only once and ends.

In the case that the still picture repeat flag is set to the ON state, the end timing of reproducing the still picture set is when the user inputs a reproduction cancel instruction of the still picture in the browseable slide show. In addition, in the case that the still picture repeat flag is set to the OFF state, the end timing is when the user inputs the reproduction instruction of the subsequent still picture during the reproduction of the final still picture or when the finite time of the default passes.

"Audio repeat flag" is information defining whether or not to repeatedly reproduce the audio which is reproduced simultaneously with the still picture in the browseable slide show. When the audio repeat flag is set to the ON state, the audio reproduced simultaneously with the still picture is repeatedly reproduced until the end of reproducing the still picture set. When the audio repeat flag is set to the OFF state, the audio reproduced simultaneously with the still picture is reproduced once.

In the browseable slide show of the present invention, since the audio is reproduced with using the display clock (time axis) of the still picture as reference, the reproduction time (maximum reproduction time) of the audio is the time in which the still picture exists. However, in the browseable slide show, since the reproduction time of the still picture is changeable by the user operation as described above, by providing the audio repeat flag, the reproduction time of the audio according to the reproduction of the still picture is defined.

FIG. 20 to FIG. 23 schematically show reproduction examples of the browseable slide show by setting the still picture repeat flag and the audio repeat flag. In the examples in FIG. 20 to FIG. 23, it is assumed that the still picture set includes three still pictures #1 to #3 and one audio for the browseable slide show is prepared.

Figure 20:
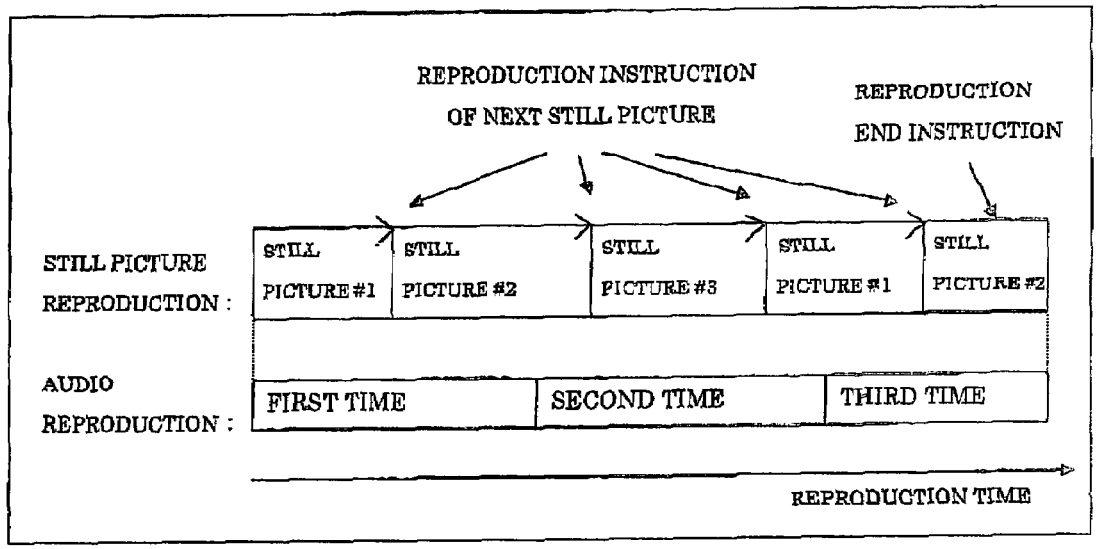
FIG. 20 is a view showing a reproduction example of a still picture and an audio in a case that a still picture repeat flag and an audio repeat flag are in an ON state in reproduction of a browseable slide show according to the embodiment.

FIG. 20 schematically shows a practical example of the browseable slide show in the case that the still picture repeat flag is set to the ON state and the audio repeat flag is set to the OFF state. Once the browseable slide show starts, the still picture #1 is first reproduced. Every time the reproduction of the next still picture is instructed, the still pictures #2, #3, #1, #2 . . . are reproduced. Namely, the still pictures #1 to #3 are repeatedly reproduced. When the reproduction end instruction is received, the reproduction of the still picture ends. In the case that the above-mentioned reproduction time of the still picture is set to the finite value (e.g., 3 seconds), the reproduction instruction of the next still picture is given when the reproduction time passes or when the reproduction instruction of the next still picture is given by the user's operation. Meanwhile, in the case that the reproduction time of the still picture is set to the infinite value, the reproduction instruction of the next still picture is given when the reproduction instruction of the next still picture is given by the user's operation. In addition, since the audio repeat flag is set to the ON state, the reproduction of the audio is continued during the reproduction of the still picture. Therefore, when the reproduction time of the audio is shorter than the total reproduction time of the still picture, the same audio is repeatedly reproduced.

Figure 21:
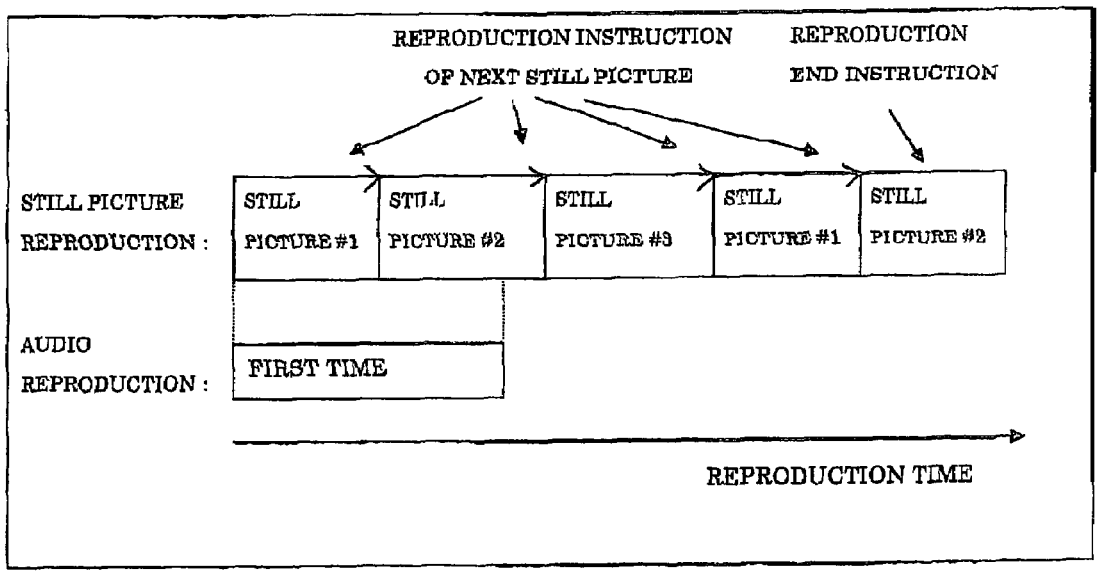
FIG. 21 is a view showing a reproduction example of the still picture and the audio in a case that the still picture repeat flag is in the ON state and the audio repeat flag is in an OFF state in the reproduction of the browseable slide show according to the embodiment.

FIG. 21 shows a practical example of the browseable slide show in the case that the still picture repeat flag is set to the ON state and the audio repeat flag is set to the OFF state. The reproduction of the still picture is similar to the example shown in FIG. 20. However, since the audio repeat flag is set to the OFF state, the reproduction of the audio is performed once and ends. In this case, after the reproduction of the audio ends, only the still picture is displayed, and no sound is outputted. But, in a case of the audio data unsuitable for the repeated reproduction due to a type and contents of the audio, the flag setting illustrated in FIG. 21 becomes effective.

Figure 22:
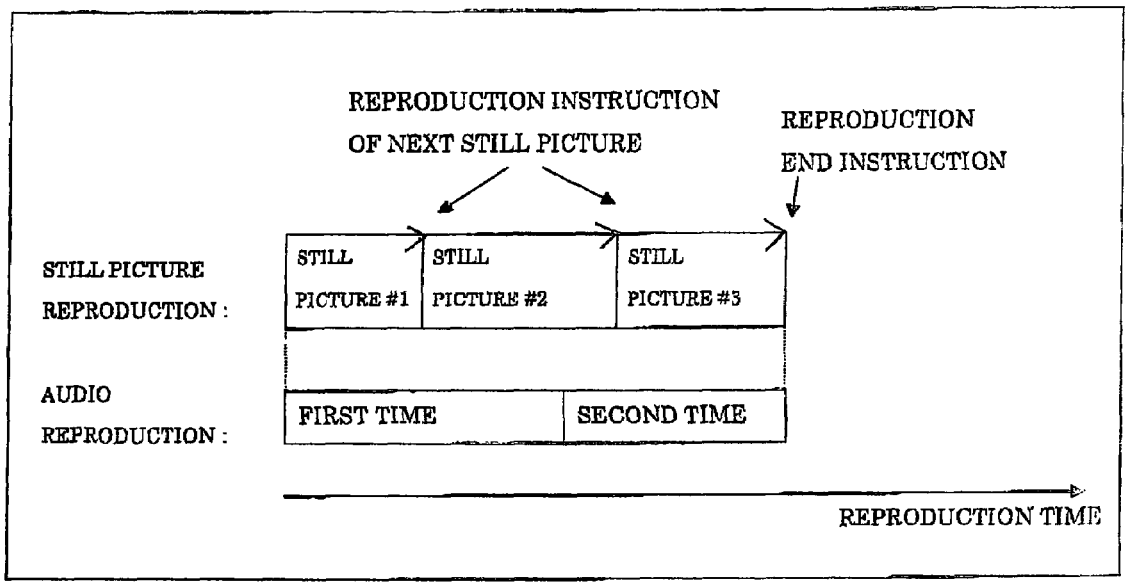
FIG. 22 is a view showing a reproduction example of the still picture and the audio in a case that the still picture repeat flag is in the OFF state and the audio repeat flag is in the ON state in the reproduction of the browseable slide show according to the embodiment.

FIG. 22 shows a practical example of the browseable slide show in the case that the still picture repeat flag is set to the OFF state and the audio repeat flag is set to the ON state, Every time the reproduction instruction of the next still picture is received, the still pictures #1, #2 and #3 are reproduced in order. When the reproduction end instruction is received during the reproduction of the still picture #3, the reproduction ends. When the reproduction instruction of the next still picture is received during the reproduction of the still picture #3, the instruction is treated as the reproduction end instruction. Additionally, since the audio repeat flag is set to the ON state, the reproduction of the audio is continued during the reproduction of the still picture, Therefore, when the reproduction time of the audio is shorter than the total reproduction time of the still picture, the same audio is repeatedly reproduced.

Figure 23:
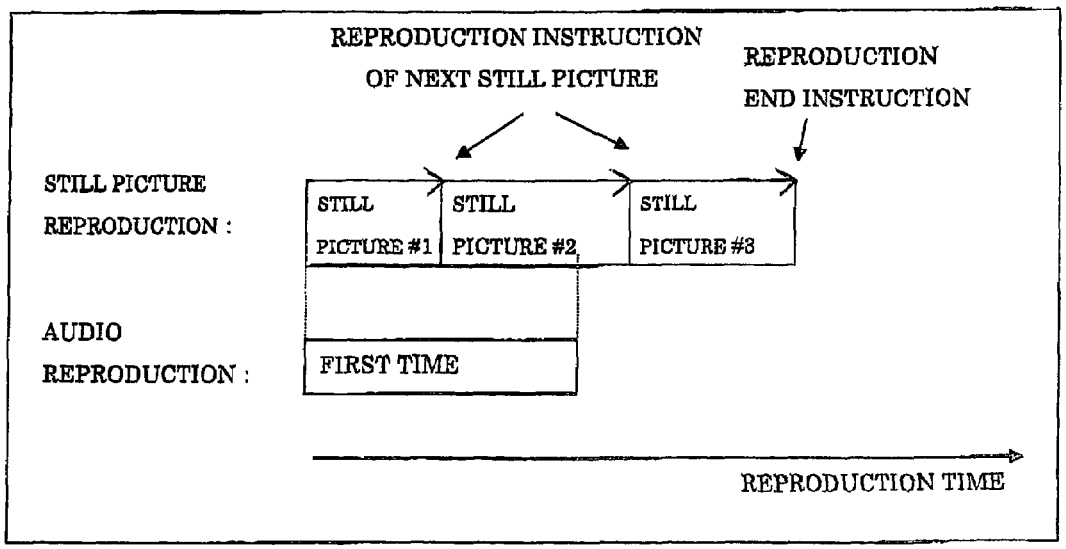
FIG. 23 is a view showing a reproduction example of the still picture and the audio in a case that the still picture repeat flag is in the OFF state and the audio repeat flag is in the ON state in the reproduction of the browseable slide show according to the embodiment.

FIG. 23 shows a practical example of the browseable slide show in a case that the still picture repeat flag and the audio repeat flag are set to the OFF state. The reproduction of the still picture is similar to the example shown in FIG. 22. In addition, since the audio repeat flag is set to the OFF state, the reproduction of the audio is performed only once and ends.

As described above, in the browseable slide show according to the present invention, by setting the still picture repeat flag, it can be defined whether to reproduce the still picture only once or to repeatedly reproduce it. In addition, by setting the audio repeat flag, it can be also defined whether to repeatedly reproduce the audio or to reproduce it only once during the reproduction of the still picture. Thus, by setting the accompanying reproduction method of the audio with reference to the reproduction of the still picture, the browseable slide show can be executed in various manners.

Next, the description will be given of the specific structure of the playlist information table used for executing the browseable slide show, with reference to FIG. 24. FIG. 24 is a conceptual view showing a concrete example of the playlist information file particularly capable of executing the browseable slide show, In FIG. 24, the playlist information table includes the playlist general information, playlist pointer table and the playlist #i (1, 2, . . . ) information table.

Among these "playlist general information" has general information related to the entire playlist information table such as the size of the playlist and the total number of the playlists.

"Playlist pointer table" has the playlist #i (i=1, 2, . . . ) pointer showing a storage address of the playlist #i (i=1, 2, . . . ) information, respectively.

"Playlist #i information table" has (i)playlist #i (i=1, 2, . . . ) general information, (ii)playlist #i (i=1, 2, . . . ) item information table and (iii)playlist #i (i=1, 2, . . . ) sub-item information table.

In this embodiment, the playlist #i information table is divided into two tables: the playlist #i (i=1, 2, . . . ) item information table including item information constructing the playlist information defining the reproduction sequence of the still picture in the browseable slide show; and the playlist #i (i=1, 2, . . . ) sub-item information table including the item information (suitably called "sub-item information" in this embodiment) constructing the playlist information defining the reproduction sequence for executing the browseable slide show. That is, in this embodiment, the playlist for reproducing the still picture in the browseable slide show includes the items, and the playlist for reproducing the audio to be reproduced simultaneously with the still picture includes the sub-items.

"Playlist #i general information" has the total number ("2" in this embodiment) of items constructing the playlist #i, the total number ("1" in this embodiment) of sub-items and other information.

"Playlist #i item information table" includes the item information #i (two pieces of item information in this embodiment). Each item information has the type (item type) of the item information, the still picture repeat flag, the object number in the object information file and the AU number in the AU table in the object information file 130.

In the playlist item information table corresponding to the still picture in the browseable slide show, the item type is defined as "browseable slide show", for example, Additionally, in the case of the ON state, the still picture repeat flag instructs to return to the display of the still picture at the top of the still picture set when the reproduction instruction of the next still picture is received during the display of the final still picture. Meanwhile, in the case of the OFF state, the still picture repeat flag instructs to finish there production of the still picture and to move to there production of the next item when there production instruction of the next still picture is received during the display of the final still picture.

The still picture repeat flag can be set to "CONTINUE". "CONTINUE" indicates one reproduction sequence including the next item (i.e., the plural items are controlled as one item). Also, the still picture repeat flag can be set to "END", which is information used in pair with "CONTINUE" and which specifically indicates the end of one reproduction sequence. In this case, in addition to "END", the still picture repeat flag structurally includes "ON" or "OFF" information. In the example of FIG. 24, when the reproduction instruction of the next still picture is received during the reproduction of the final still picture of the item #1, the top still picture of the item #2 is reproduced, and when the reproduction instruction of the next still picture is received during the reproduction of the final still picture of the item #2, the top still picture of the item #1 is reproduced. Namely, the still picture repeat flag is sometimes effective over the plural items. Even if the still picture repeat flag is not set to "CONTINUE", the same effect can be obtained by setting such a rule that "successive items having the item type of the browseable slide show are regarded as one reproduction sequence".

"Playlist #i sub-item information table" includes the sub-item information #i (one piece of sub-item information in this embodiment). Each of the sub-item information has the type (sub-item type) of the sub-item information, the audio repeat flag, the reproduction starting position information, the object number in the object information file, the information indicating the AU number in the AU table in the object information file 130 and the audio reproduction range information.

In the playlist sub-item information table corresponding to the audio in the browseable slide show, the sub-item type is defined as "audio for browseable slide show", for example. As described above, in the ON state, the audio repeat flag shows that the audio is repeatedly reproduced as long as the reproduction of the still picture continues, and in the OFF state, it shows that the reproduction of the audio is only once.

"Reproduction starting position information" designates the reproduction starting timing of the audio serving as the sub-item on the time axis of the still picture serving as the item. For example, when the reproduction of the audio starts with the first still picture, the item number and the display timing of the still picture is designated, like "Item#1,ES_Tableindex#1". When the display time information such as PTS is added to each still picture in accordance with the data format of the still picture (e.g., when I-picture of MPEG is used as the still picture), the reproduction starting position information nay designate the display timing of the still picture by the display time information of the still picture.

FIG. 25 shows an example of a case that the display time information is not added to the object itself. Since the display time information is not added to the still pictures #1 to #5 being the objects, if the PU is formed as shown in FIG. 25, the still pictures are reproduced in the order of the still pictures #2, #1, #5. If the reproduction of the audio is started simultaneously with the display start of the still picture #1, the reproduction starting position information is designated as "Item#1, index#2", for example.

FIG. 26 shows an example of a case that the display time information is added to the object itself, As shown in FIG. 26, the PTS is added to the still pictures #1 to #5 being the objects as the display time information, respectively. As for the reproduction of the still picture, the still picture to be displayed is designated in the item information by using the display time information in terms of the range such as PTS=bbb to ddd. Because of the browseable slide show, the PTS of this case is used not for showing the actual display time of each still picture, but for distinguishing each still picture being the object, Namely, by using the address information, the packet number is obtained from the PTS. In this case, the PU is constructed as shown in FIG. 26. Therefore, when the reproduction of the audio is started simultaneously with the display of the still picture #3 for example, the reproduction starting position information is designated as "item#1,PTS=ccc".

In addition, "audio reproduction range information" in the sub-item information designates the range of a part of certain audio data to be reproduced as the audio in the browseable slide show. Thereby, the entire or the only arbitrary one part of the specific audio data can be designated as the audio to be reproduced in the browseable slide show.

As described above, if the object data is reproduced based on the playlist information table dividedly having the item information corresponding to the still picture and the sub-item information corresponding to the audio, it becomes possible to execute the browseable slide show for reproducing the audio such as the BGM with using the time axis of the still picture as reference. At this time, by setting the still picture repeat flag, it can be defined whether or not to repeatedly display the still picture. Moreover, by setting the audio repeat flag, it becomes possible to define the reproduction of the audio according to the reproduction state of the still picture. Therefore, the still picture and the audio can be reproduced in various kinds of manners.

Figure 27:
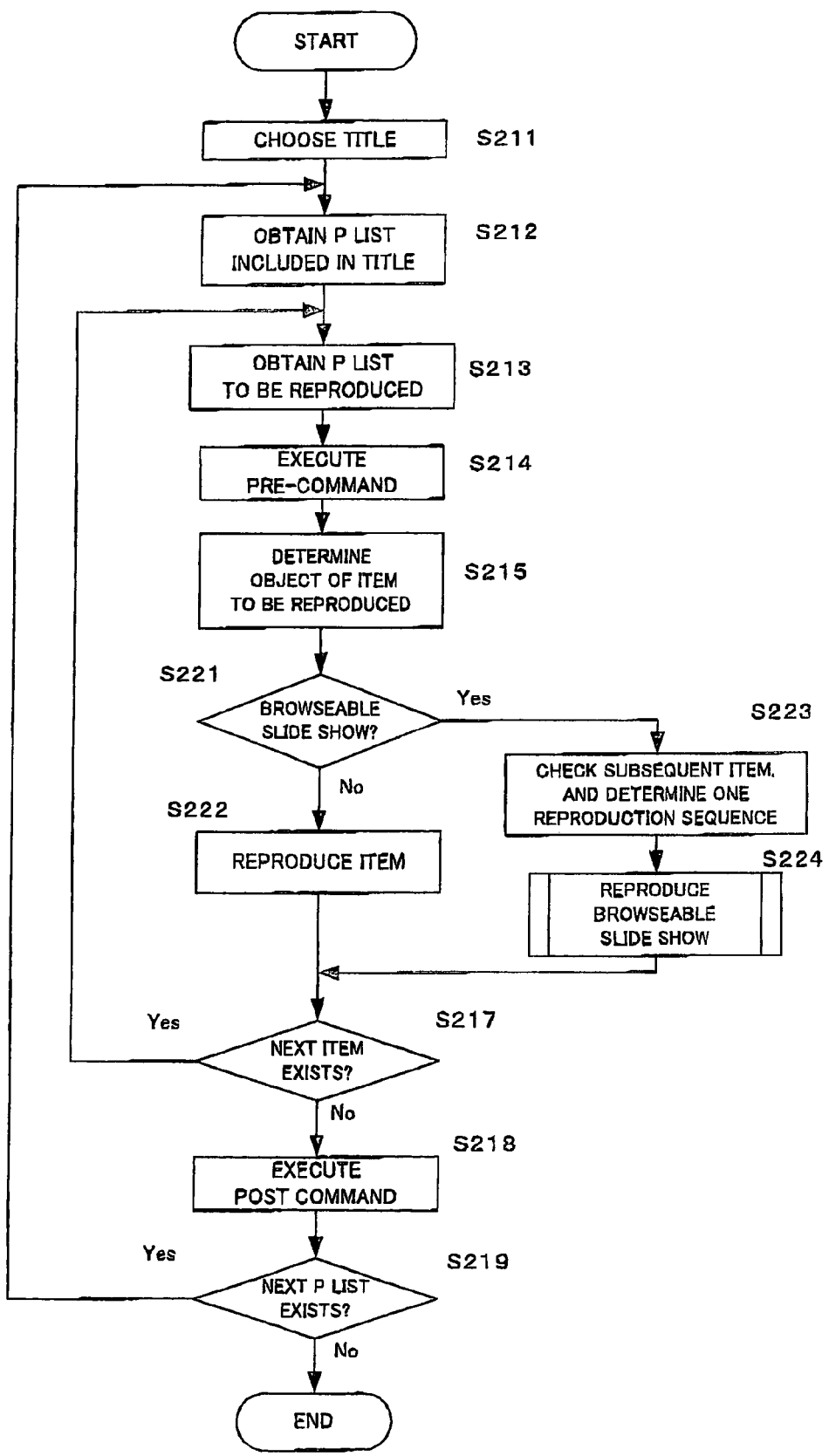
FIG. 27 is a flow chart of a reproduction process including the reproduction of the browseable slide show according to the embodiment.
Figure 28:
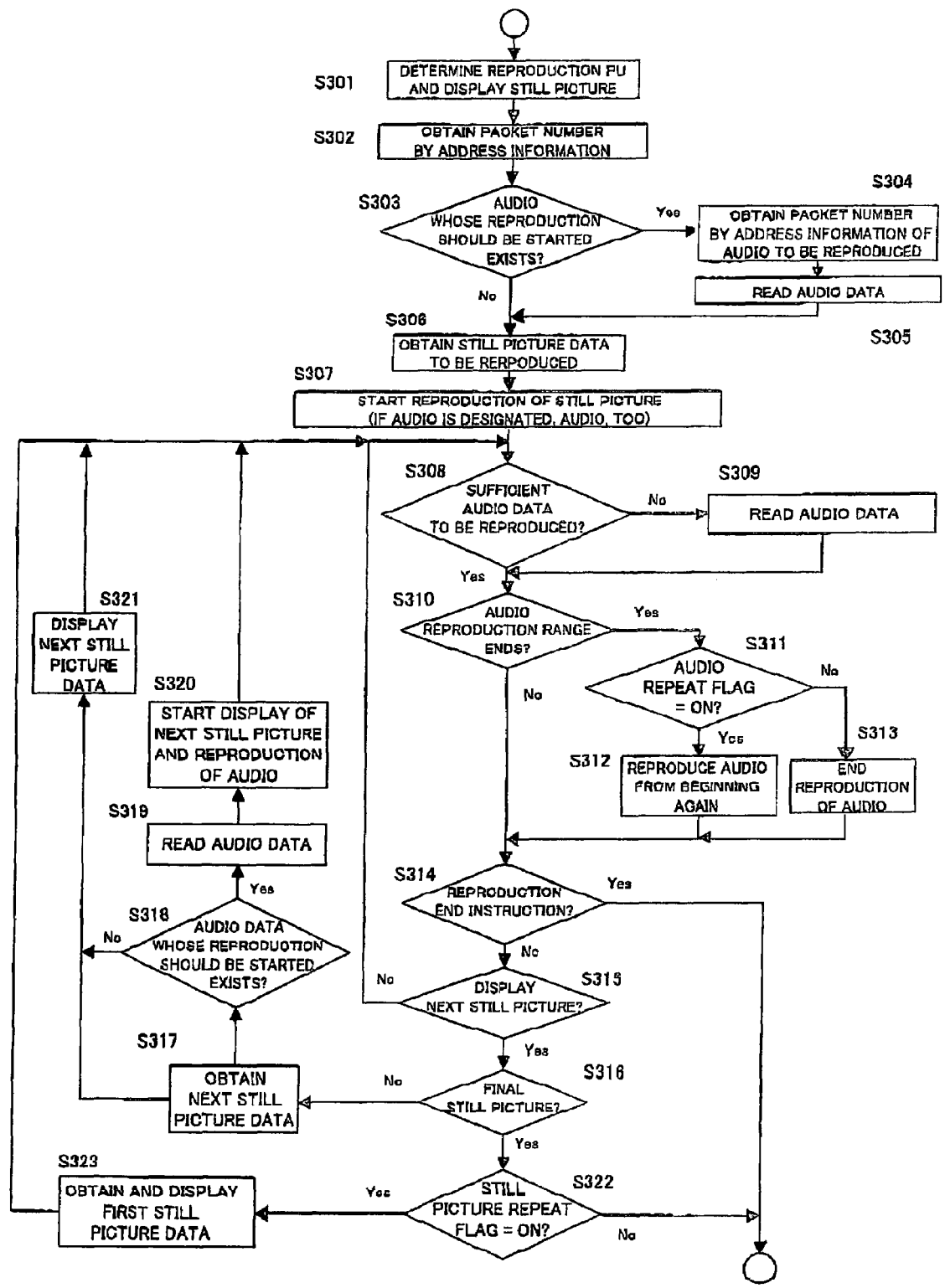
FIG. 28 is a flow chart of a sub-routine related to the reproduction of the browseable slide show shown in FIG. 27.

Next, the description will be given of a process in the information record reproduction apparatus 500 executed in the above-mentioned browseable slide show, with reference to FIG. 27 and FIG. 28. FIG. 27 is a flow chart showing the detailed process for determining the object of the item (including the item and the sub-item) to be reproduced, which is executed as a part of the process in step S215 shown in FIG. 19. FIG. 28 is a flow chart showing the process for reproducing the browseable slide show shown in FIG. 27. In FIG. 27, the same step numbers are given to the same steps as steps shown in FIG. 19, and their explanation will be omitted.

In FIG. 27, after the processes in steps S211 to S214 similar to the steps shown in FIG. 19 are executed, the object of the item to be reproduced is determined with reference to the playlist information table shown in FIG. 24 (step S221). Specifically, with reference to the item type in the item information in the playlist information table, it is determined whether or not the item type is set to the browseable slide show. When the item to be reproduced is not the browseable slide show (step S221; No), the item is reproduced by a method other than the browseable slide show (step S222).

On the other hand, when the item to be reproduced is the browseable slide show (step S221; Yes), the item information subsequent to the item is checked, and the reproduction sequence of the plural items to be reproduced as the browseable slide show is determined (step S223). Specifically, when "CONTINUE" can be set to the still picture repeat flag as described above, it is determined items up to which item construct one reproduction sequence based on the description of "CONTINUE" in the plural pieces of item information. Instead, when it is ruled that "when the plural items having the item type of the browseable slide show are successively provided, they construct one reproduction sequence" in advance, one reproduction sequence is determined with reference to the item type in each of the item information.

In addition, the information related to the audio to be reproduced in the browseable slide show is obtained with reference to the sub-item information.

In this manner, when the one reproduction sequence is determined, the reproduction of the browseable slide show is executed (step S224).

Afterward, the determination in step S217 similar to the determination shown in FIG. 19 is performed. When the next item exists (step S217; Yes), the process returns to step S213 and the following process is repeated in this embodiment. In addition, when the next item does not exist, the post command is executed (step S218), and it is determined whether or not the next playlist exists (step S219). When the next playlist exists, the process returns to step S212. Meanwhile, when the next playlist does not exist, the process ends.

Next, the detailed description will be given of the reproduction process of the browseable slide show with reference to FIG. 28. In FIG. 28, the PU (presentation unit) to be reproduced and the object of the still picture are first determined with reference to the AU table 131 and the ES map table 134 (see FIG. 3) (step S301).

Next, the packet information is obtained by the address information of the still picture to be reproduced (step S302). Subsequently, it is determined whether or not the audio whose reproduction should be started exists (step S303) Specifically, the reproduction starting position information in the sub-item information corresponding to the audio to be reproduced is referred to, and it is determined whether or not the reproduction starting timing of the audio arrives.

When it is determined that the audio to be reproduced exists, the packet number is obtained based on the address information of the audio to be reproduced (step S304), and the audio data is read into the memory 512m provided in front of the audio decoder 512 (step S305). Thereby, the reproduction preparation of the audio is completed. In addition, based on the packet information obtained in step S302, the still picture data to be reproduced is obtained (step S306). In this manner, the reproduction preparation of the still picture is completed. In this embodiment, the still picture data is obtained after the audio data is obtained. However, this order may be reversed.

Next, as the browseable slide show, the reproduction of the still picture is started (step S307). At this time, when the reproduction starting position information in the sub-item information defines that the reproduction of the audio is started with the reproduction of the still picture, the reproduction of the audio is started simultaneously.

In this manner, when the reproduction of the browseable slide show is started, the system controller 520 monitors the memory 512m to determine whether or not the audio data to be reproduced is sufficient (step S308). When the reproduction of the audio is started, the audio data stored in the memory 512m is reproduced in order. For the purpose of continuing the reproduction of the audio, the audio data has to be read into the memory 512m in order. Therefore, the system controller 520 monitors the amount of data in the memory 512m, and starts reading the audio data in accordance with the progress of the audio reproduction (step S309). Thereby, it is prevented that the audio to be reproduced is interrupted during the reproduction of the browseable slide show.

Next, the audio reproduction range information in the sub-item information is referred to, and it is determined whether or not the reproduction range of the audio ends (step S310). When the reproduction range of the audio ends (step S310; Yes), it is determined whether or not the audio repeat flag in the sub-item information is in the ON state (step 5311). In the case of the ON state, since the audio is repeatedly reproduced until the end of the reproduction of the still picture as described above, the reproduction of the same audio is started from the beginning (step S312). Meanwhile, in the case of the OFF state, the reproduction of the audio ends (step S313).

Next, it is determined whether or not the end instruction of the reproduction of the browseable slide show is inputted by the user operation (step 5314). When it is inputted, the process returns to the main routine shown in FIG. 27. Meanwhile, when it is not inputted, whether or not to display the next still picture is determined (step S315). In the case that the reproduction time of the still picture is set to the infinite value, it is determined to display the next still picture when the reproduction instruction of the next still picture is inputted by the user operation. In addition, in the case that the reproduction time of the still picture is set to the finite value (e.g., 3 seconds), it is determined to display the next still picture when the reproduction time passes. When it is not determined to display the next still picture (step S316; No), the process returns to step S308, and the reproduction of the same still picture is continued.

On the other hand, when it is determined to display the next still picture (step S316; Yes), it is determined whether or not the next still picture is the final still picture (step S316). When it is not the final still picture (step S316; No), the next still picture data is obtained, and it is determined whether or not the audio data whose reproduction should be started simultaneously with the reproduction of the still picture exists (step S318). As described above, the reproduction starting timing of the audio in the browseable slide show is defined by the reproduction starting position information in the sub-item information. Therefore, the audio is not always reproduced simultaneously with the first still picture. Namely, the audio is sometimes reproduced at the time of starting of the reproduction of the second or later still picture or in the middle of the reproduction. Thus, whether or not the audio whose reproduction should be started exists is determined in step S318.

When no audio whose reproduction should be started exists (step S318; No), the next still picture data is displayed. Then, the process returns to step S308, and the reproduction of the still picture (if any, the audio to be reproduced, too) is continued. Meanwhile, when the audio whose reproduction should be started exists (step S318; Yes), the audio data is read into the memory 512m (step S319), and the display of the next still picture and the reproduction of the audio are started (step S320). Afterward, the process returns to step S308, and the reproduction is continued.

When the next still picture is determined to be the final still picture in step S316 (step S316; Yes), it is determined whether or not the still picture repeat flag in the item information is in the ON state (step S322). When the still picture repeat flag is in the ON state, the first still picture data of the reproduction sequence previously determined is obtained, and the reproduction thereof is started (step S323). Afterward, until the end instruction of the browseable slide show is received in step S314, the reproduction of the still picture included in the same reproduction sequence is continued. Meanwhile, when the still picture repeat flag is in the OFF state, the browseable slide show ends, and the process returns to the main routine shown in FIG. 27. Since the browseable slide show according to the present invention is for reproducing the audio with using the reproduction time axis of the still picture as reference as described above, it never happens that only the audio is reproduced after the reproduction end of the still picture, (Flow of Access in Reproducing)

Figure 29:
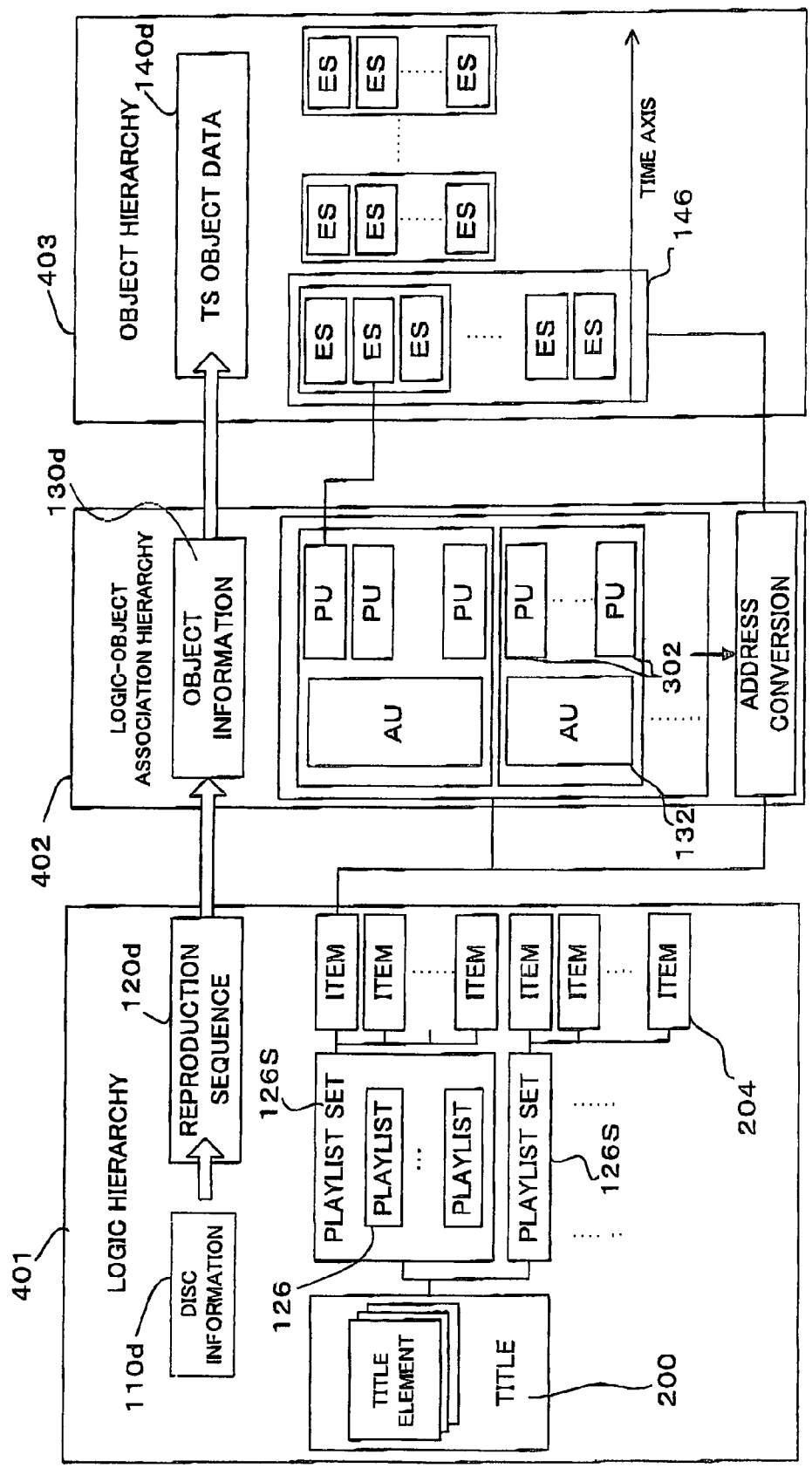
FIG. 29 is a view conceptually showing an entire flow of access at the time of the reproduction in relation to the logical structure of the optical disc in the embodiment.

Next, with reference to FIG. 29, the description will be given of a flow of an access at the time of the reproduction in the information record reproduction apparatus 500 using the AU (Associate Unit) information 132 and the PU (Presentation Unit) information 302, which are one of features in this embodiment, with the logical structure of the optical disc 100. FIG. 29 schematically shows the entire flow of the access at the time of the reproduction with relation to the logical structure of the optical disc 100.

In FIG. 29, the logical structure of the optical disc 100 is divided into three hierarchies; a logic hierarchy 401, an object hierarchy 403 and a logic-object association hierarchy 402 mutually relating the two hierarchies.

In the three hierarchies, the logic hierarchy 4011 logically specifies various kinds of logical information for reproducing the desired title at the time of the reproduction, the playlist (P list) to be reproduced and the structural contents thereof. In the logic hierarchy 401, disc information 110d showing the all tiles 200 on the optical disc 100 is written in the disc information file 110 (see FIG. 3), and reproduction sequence information 120d of the all contents on the optical disc 100 is further written in the playlist information file 120 (see FIG. 3) Specifically, the structure of one or plural playlist set(s) 126S is written to one or plural title element(s) 200-2 included in each title 200 as the reproduction sequence information 120d, respectively. Moreover, each playlist set 126S includes one or plural playlist (s) 126, which the structure of one or plural item(s) 204 (see FIG. 13) is written in. At the time of the access of the reproduction, the title 200 to be reproduced is specified by the logic hierarchy 401, and the correspondent playlist 126 is specified. Further, the correspondent item 204 is specified.

Subsequently, the logic-object association hierarchy 402 specifies the combination and structure of the TS object data 140*d* being actual data on the basis of the information thus specified in the logichierarchy 401. The logic-object association hierarchy 402 also specifies an attribute of the TS object data 140*d* to be reproduced and a physical storage address thereof in order to execute an address conversion from the logic hierarchy 401 into the object hierarchy 403. More specifically, in the logic-object association hierarchy 402, the object information data 130*d*, which classifies blocks of contents constructing each item 204 into a unit "AU 132" and which classifies each AU 132 into a unit "PU 302", is written in the object information file 130 (see FIG. 3).

"PU (Presentation Unit) 302" is a unit obtained by relating the plural elementary streams by the reproduction switch unit to put them together. If there are three audio streams in the PU 302, the user can freely switch the three audios (e.g., audio by language) during the reproduction of the vision.

On the other hand, "AU (Associate Unit) 132" is a unit obtained by putting together the plural elementary streams such as the video stream in the TS object used for one title, and it includes one or plural PU(s) 302, More specifically, "AU 132" is a unit obtained by indirectly putting together the elementary stream packet ID (ES_PID) via the PU 302 for each TS object. The AU 132 corresponds to a group such as plural TV programs or plural programs mutually having specific relation in terms of the contents, such as the plural TV programs or programs mutually switchable in multi-origination broadcast program, for example. The PU 302 belonging to the same AU 132 corresponds to the group of one or plural elementary stream(s) structuring the plural TV programs or the plural programs mutually switchable by the user operation at the time of the reproduction, respectively.

Accordingly, when the AU 132 to be reproduced is specified and the PU 302 belonging to the AU 132 is specified, the elementary stream to be reproduced is specified. Namely, without using the PAT and PMT shown in FIG. 12, the desired elementary stream can be reproduced in the multi-recorded elementary streams on the optical disc 100. The more specific data structures of the AU information 132I and the PU information 302I defining the AU 132 and the PU 302 respectively will be explained later.

The elementary stream actually reproduced is specified or designated by the ES_PID being the packet ID (see FIG. 12) of the elementary stream from the PU information 302. At the same time, by converting the information indicating the starting time and ending time of the reproduction into the address information of the elementary stream, the contents in the specific area (or specific time range) of the specific elementary stream is reproduced.

In this manner, in the logic-object association hierarchy 402, the address conversion from the logical address of each item 204 into the physical address of each PU 302 is performed.

Subsequently, the object hierarchy 403 is the physical hierarchy for reproducing the actual TS object data 140*d*. In the object hierarchy 403, the TS object data 140*d* is written in the object data file 140 (see FIG. 3). Specifically, the TS packets 146 structuring the plural elementary streams (ES) are multiplexed for each time, and the TS packets 146 are arranged along the time axis. Thereby, the plural elementary streams are constructed (see FIG. 11). The plural TS packets multiplexed for each time correspond to the PU 302 specified by the logic-object association hierarchy 402 for each elementary stream. It is also possible that the plural PUs 302 and one elementary stream are related (e.g., between the plural switchable TV programs or the plural switchable programs, the elementary stream of the same audio data is commonly used, or the elementary stream of the same sub-picture data is commonly used).

In this manner, in the object hierarchy 403, the reproduction of the actual object data is executed with using the physical address obtained by the conversion in the logic-object association hierarchy 402.

As described above, by the three hierarchies shown in FIG. 29, the access at the time of the reproduction of the optical disc 100 is executed. For convenience, FIG. 29 and an explanation thereof are indicated in such a manner that both of the sub-item and the item other than the sub-item are included in "item 204". Namely, the correspondence from the logic hierarchy 401 to the logic-object association hierarchy 402 is as shown in the item 204, even if the item is the sub-item or the item other than the sub-item.

(Structure of Each Information File)

Next, with reference to FIG. 30 to FIG. 37, the description will be given of a specific example of the data structure in various kinds of information files formed on the optical disc 100 of this embodiment, i.e., (1) the disc information file 110 and the playlist information file 120 and (2) the object information file 130, which were explained with reference to FIG. 3.

(1) Disc Information File and Playlist Information File:

The description will be given of each component in the concrete example of the files and the hierarchical structure between the components, with reference to FIG. 30 to FIG. 36. FIG. 30 to FIG. 36 are conceptual views schematically showing the hierarchical structures of the files. In FIG. 30 to FIG. 36, the same referential numerals are given to the same file, data and information as those already explained with reference to FIG. 3 to FIG. 9, and their explanation are conveniently omitted.

Figure 30:
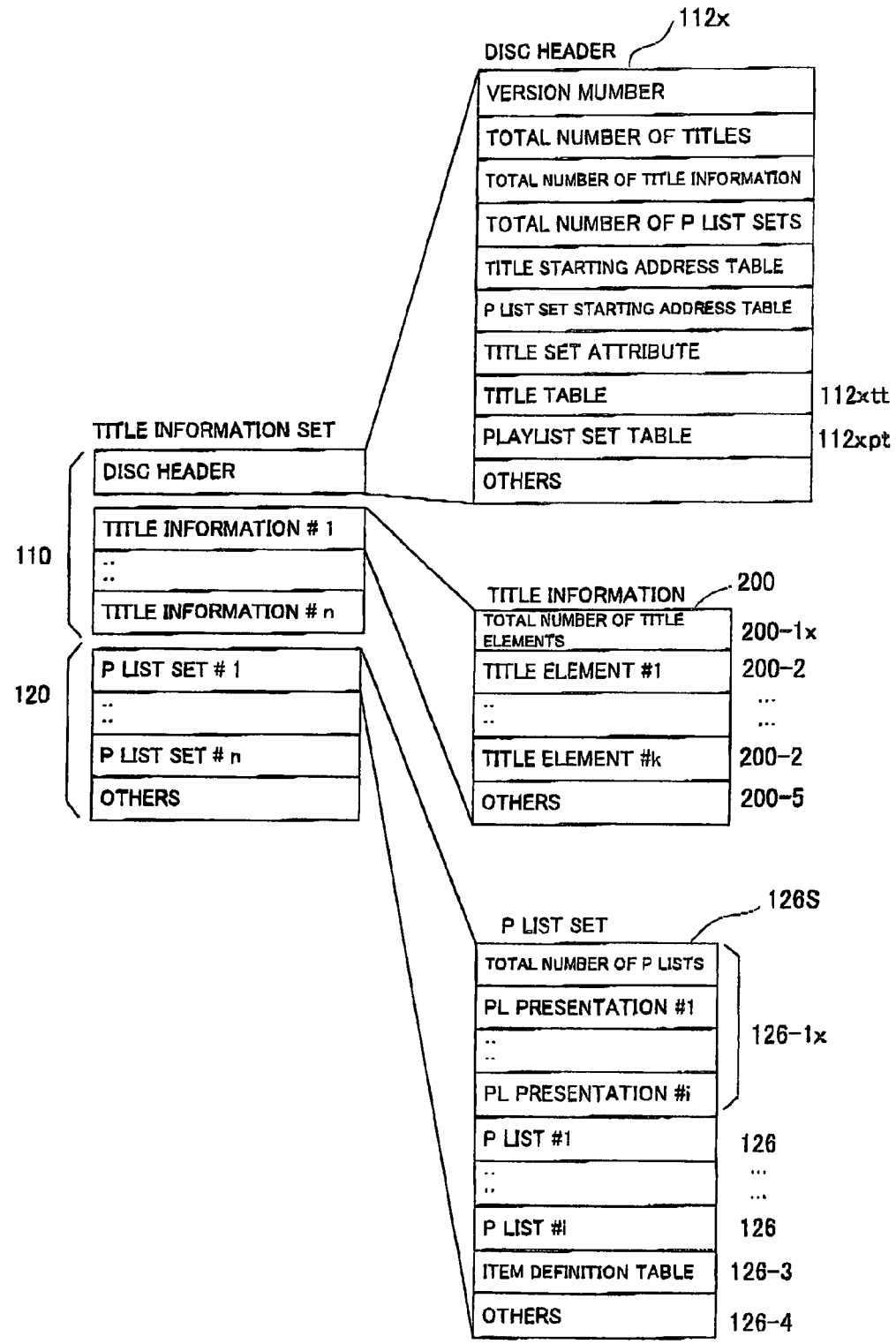
FIG. 30 is a conceptual view schematically showing a hierarchical structure in a specific example of a title information set in the embodiment.

First, as shown in FIG. 30, "title information set" according to this specific example is the information set including the disc information file 110 and the playlist information file 120 shown in FIG. 3.

The title information set includes one disc header 112*x*, the plural pieces of title information 200 (title information #1, . . . , #n) the plural play (P) list sets 126S (P list set #1, . . . , #n) and other information.

(1-1) Disc Header

First, for the title information sets shown in FIG. 30, the disc header 112*x* will be explained with reference to FIG. 30 and FIG. 31.

In FIG. 30, the disc header 112*x* is illustrated in a form branching off at a right upper portion in the drawing. The disc header 112*x* has plural fields for various kinds of information such as the version number, the total number of titles, the total number of title information and the total number of the play (P) list sets in this order in FIG. 30, as the information corresponding to the disc general information 112 shown in FIG. 3. The disc header 112*x* has the title starting address table as the table for the information corresponding to the title pointer 114-1 shown in FIG. 3. Further, the disc header 112*x* has the play (P) list set starting address table as the table for the information corresponding to the playlist set pointer 124 shown in FIG. 3, The disc header 112*x* has the field for the information indicating the attribute of each of the title sets. Moreover, the disc header 112*x* has the title table 112*xtt* and the playlist set table 112*xpt*.

The disc header 112*x* having the plural fields and the plural tables totally manages the plural titles in the entire recording area on the disc.

"Version number" is the version number in this standard. According to ISO646, the version number is prescribed as "0070", for example. "Total number of titles" is the total number of titles in the entire recording area on the disc, and "Total number of title information" is the total number of title information in the entire recording area on the disc. "Total number of playlist sets" is the total number of playlist sets in the entire recording area on the disc, and "title starting address table" shows the starting address of each title as a relative byte number from the top of the title set. The byte number is counted from 0, for example. "Playlist set starting address table" shows the starting address of each playlist set as the relative byte number from the top of the title set. The byte number is counted from 0, for example. "Title set attribute" shows the attribute of the title set such as the data length of the title set, a kind of characteristic used in the title set (e.g., Japanese and English) and the name of the title set.

Figure 31:
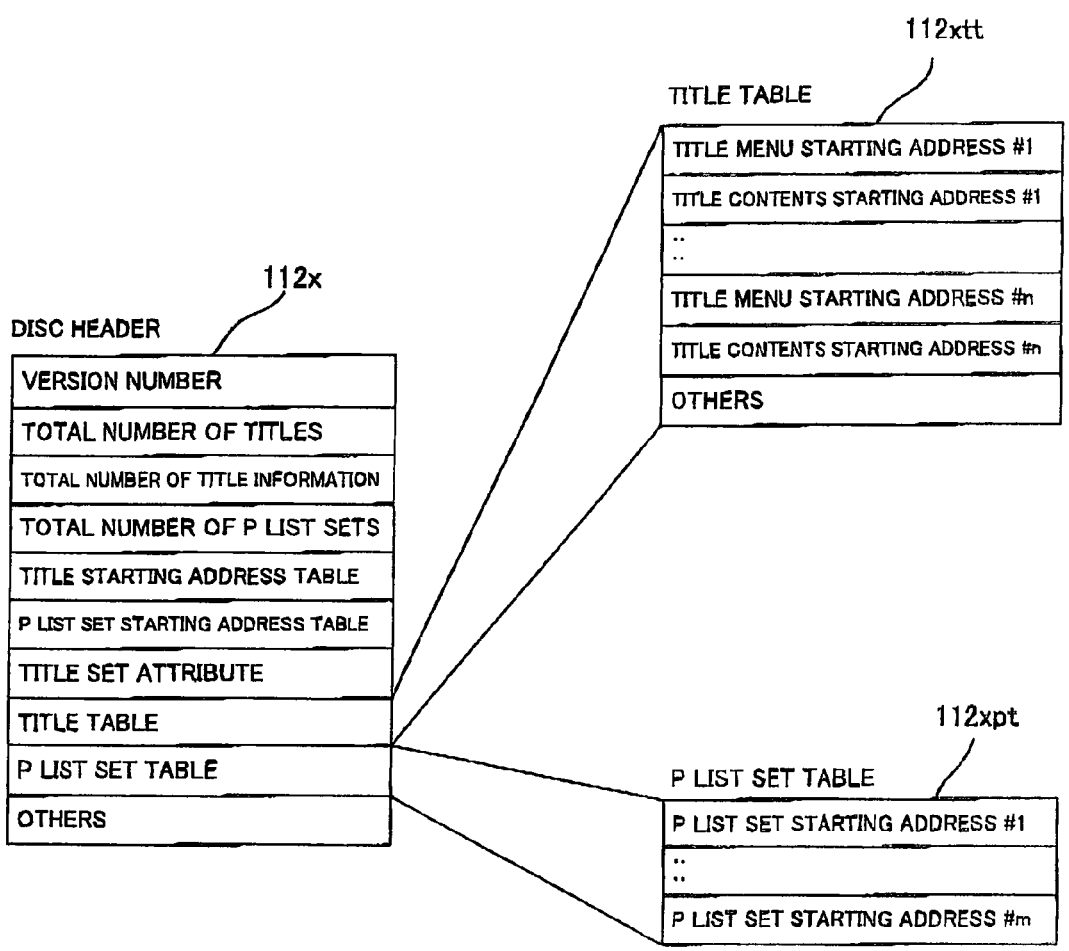
FIG. 31 is a conceptual view schematically showing a hierarchical structure in a specific example of a disc header in the embodiment.

In FIG. 31, the title table 112xtt is illustrated in a form branching off at a right upper portion in the drawing. The title table 112xtt has the plural fields for recording the plural title menu starting address information #1, ..., #n and the plural title contents starting address information #1, ..., #n, in order from top to bottom in the drawing, in a form making a pair depended on the number.

"Title menu starting address" shows the starting address of the title information starting address including each title menu as the relative byte number from the top of the title set. This byte number is counted from 0, for example. The title menu starting address "0" is assigned to a disc menu being the menu related to the entire disc. "Title contents starting address" shows the starting address of the title information including each contents title as the relative byte number from the top of the title set. "Contents title" is the title showing the contents of each title. The byte number is counted from 0, for example. The title contents starting address "0" is assigned to a first play title unconditionally reproduced at the beginning of the title reproduction, for example.

In FIG. 31, the playlist set table 112xpt is illustrated in a form branching off at a right lower portion in the drawing and has the plural fields for recording the plural play(P)list set starting address #1, ..., #n. "Playlist set starting address" shows the starting address of each playlist set as the relative byte number from the top of the title set. The byte number is counted from 0, for example.

(1-2) Title Information:

Next, for the title information sets shown in FIG. 30, the title information 200 will be explained with reference to FIG. 30 and FIG. 32.

In FIG. 30, the title information 200 is illustrated in a form branching off at a right middle portion in the drawing. In order from top to bottom in the drawing, the title information 200 has the field for recording the information 200-1×showing the total number of the title elements corresponding to the title general information 200-1 shown in FIG. 4, and further has the plural fields for recording the plural title elements 200-2 (title element #1, ..., #k) and the other information 200-5.

"Total number of title elements" shows the total number of title elements included in the title information.

Figure 32:
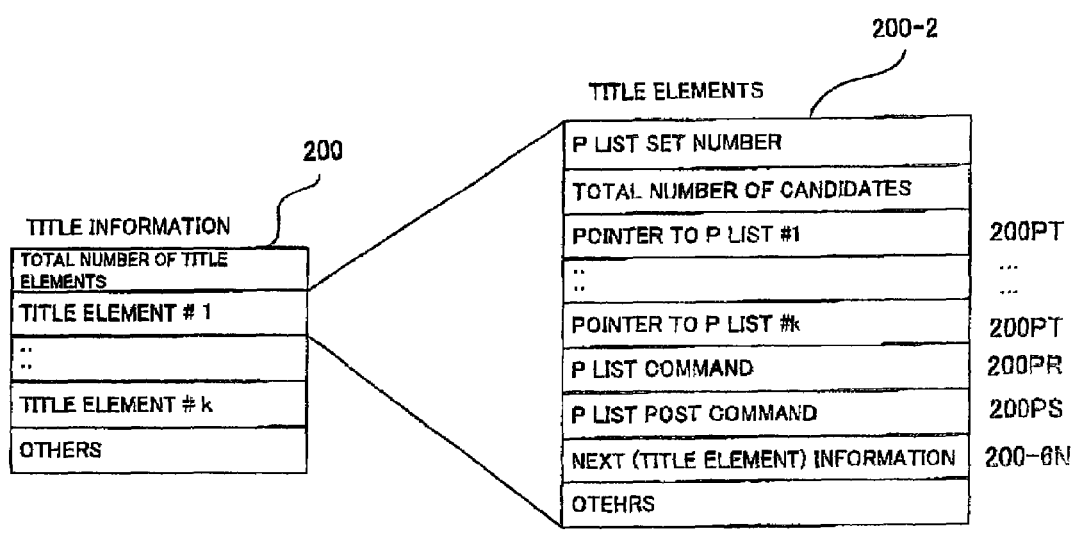
FIG. 32 is a conceptual view schematically showing a hierarchical structure in a specific example of title information in the embodiment.

In FIG. 32, each title element 200-2 is illustrated in a form branching off on the right side in the drawing. In order from top to bottom in the drawing, the title element 200-2 has the pointer 200PT in which "playlist set number" is written, the total number of candidates and the plural fields for recording the P list identification information 200PN in which one or plural applicable play (P) list number(s) (i.e., Plist#1, ..., #k) is (are) written. Moreover, each title element 200-2 has the plural fields for recording the P list pre-command 200PR and the P list post command 200PS, and the plural fields for recording the next information 200-6N indicating the title element to be reproduced next. The other information in the title element 200-2 is information related to each title element such as a kind of title, a sequential type and a branching type, for example.

"Pointer 200PT in which the playlist set number is written" is a pointer showing the ID (Identification) number of the playlist set. "Total number of candidates" shows the total number of the playlists capable of being the selective candidate of the title element in the playlist set designated by the pointer 200PT. "P list identification information 200PN" shows the ID (Identification) number of one or plural playlist(s) capable of being the selective candidate. By providing the P list identification information 200PN, the playlist being the selective candidate for the different title reproduction can be included in the one playlist set, and the one playlist set can be used in the different title elements. Meanwhile, "P list pre-command 200PR", "P list post command 200PS" and "next information 200-6N" are same as described above.

(1-3) Playlist Set:

Next, for the title information sets shown in FIG. 30, the playlist set 126S will be explained with reference to FIG. 30, FIG. 33 to FIG. 36.

In FIG. 30, the playlist set 126S is illustrated in a form branching off at a right lower portion in the drawing. In order from top to bottom in the drawing, the playlist set 126S has the field for recording the information 126-1x including the total number of play(P) lists and the plural playlist (PL) presentations (PL presentations #1, ..., #i) as the information corresponding to the playlist set general information 126-1 shown in FIG. 5. The playlist set 126S further has the plural fields for recording the plural play(P) lists 126 (i.e., P lists #1, ..., #i), the item definition table 126-3 and the other information 126-4.

"Total number of playlists" shows the total number of playlists in the playlist set. The PL presentations #1, ..., #i are the attribute information corresponding to the P lists #1, ..., # respectively, and they correspond to the attribute information shown in FIG. 23.

Figure 33:
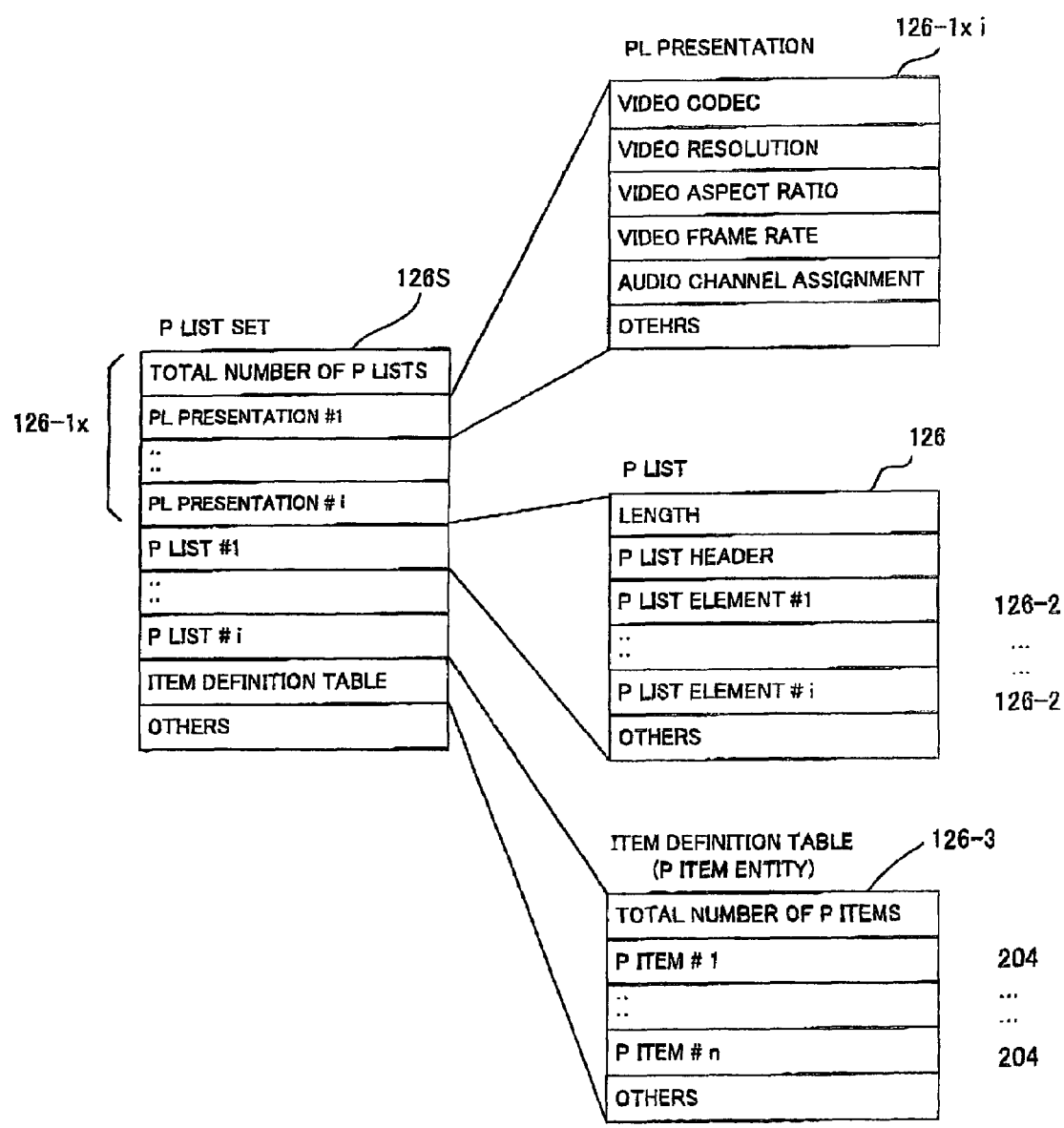
FIG. 33 is a conceptual view schematically showing a hierarchical structure in a specific example of the playlist set in the embodiment.

As shown in FIG. 33, each PL presentation 126-1xi is illustrated in a form branching off at a right upper portion in the drawing. In order from top to bottom in the drawing, it has the plural fields for recording the information indicating a video codec, a video resolution, a video aspect ratio, a video frame rate and an audio channel assignment.

"Video codec" shows the kind of the video codec which was used at the time of recording the video information for to the playlist set and is used at the time of reproduction thereof. "Video resolution" shows the video resolution used at the time of recording of the video information for the playlist corresponding to the main pass (i.e., the video stream supplying the main video) in the playlist sets. "Video aspect ratio" shows the video aspect ratio used at the time of the recording of the video information for the playlist corresponding to the main pass in the playlist sets. "Video frame rate" shows the video frame rate used at the time of the recording of the video information for the playlist corresponding to the main pass in the play list sets. "Audio channel assignment" shows the assignment of the audio channel used at the time of recording of the sound information for the playlist corresponding to the main pass in the playlist sets.

In FIG. 33, each playlist 126 is illustrated in a form branching off at a right middle portion in the drawing. In order from top to bottom in the drawing, it has the plural fields for recording the information indicating the data length of the playlist 126, the playlist header, the plural playlist elements 126-2 (i.e., P list elements #1, . . . , #i).

"Length" of the playlist shows the length of the subsequent playlist by the number of byte. This shows the length of the data including no "length" field itself. "Playlist header" shows the information such as the total number of playlist elements included in the playlist, the reproduction time of the playlist and the name of the playlist.

Figure 34:
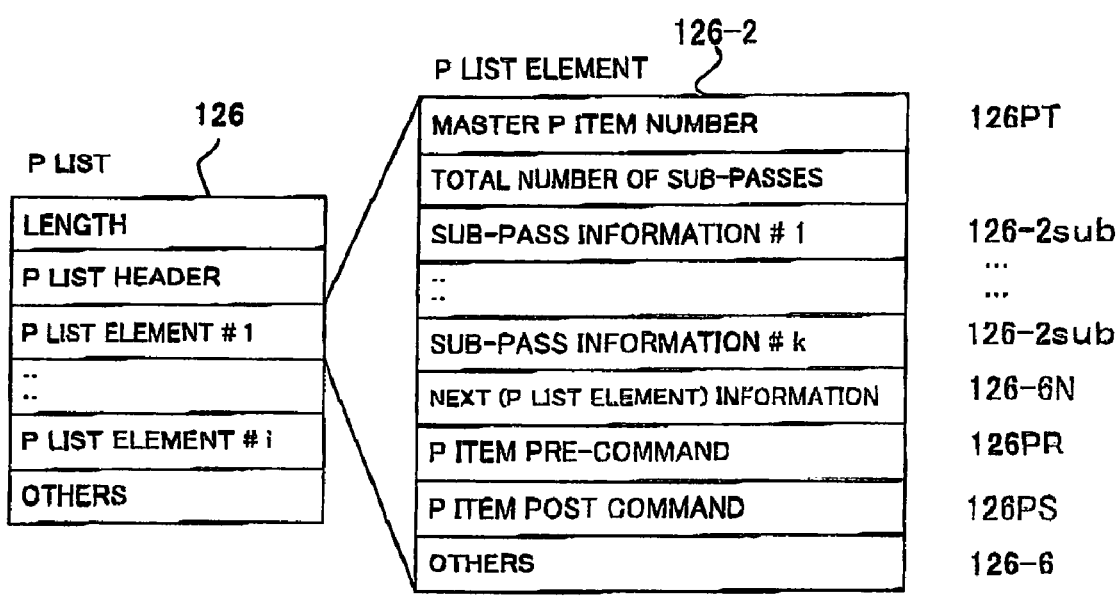
FIG. 34 is a conceptual view schematically showing a hierarchical structure in a specific example of the playlist in the embodiment.

Moreover, in FIG. 34, each playlist element 126-2 is illustrated in a form branching off on the right side in the drawing. In order from top to bottom in the drawing, it has the plural fields for recording the pointer 126PT showing the item number for the master play(P) item, the total number of sub-passes, the plural pieces of sub-pass information 126-2sub (i.e., sub-pass information #1, . . . , #k), the next information 126-6N, the pre-command 126PR for the play(P) item, the post command 126PS for the play(P) item and the other information 126-6.

"Pointer 126PT", "pre-command 126PR" and "post command 126PS" are same as described above. In addition, "total number of sub-passes" shows the total number of sub-passes existing in the playlist element. "Next information 126-6N" shows the playlist element to be reproduced next.

Figure 35:
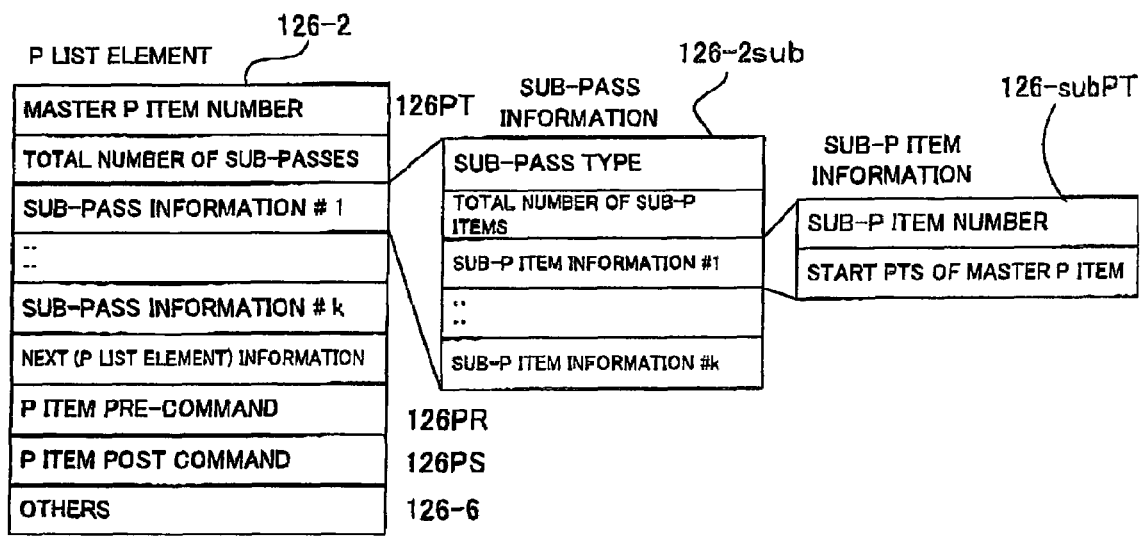
FIG. 35 is a conceptual view schematically showing a hierarchical structure in a specific example of the playlist element in the embodiment.

Moreover, in FIG. 35, each sub-pass information 126-2sub is illustrated in a form heading for the middle portion to branch off on the right side in the drawing. In order from top to bottom in the drawing, it has the plural fields for recording the sub-pass type, the total number or sub-play(P) items and the plural sub-play (P) item information 126-subPT (i.e., the sub-P item information #1, . . . , #k).

"Sub-pass type" shows what display is performed by the sub-pass, such as various kinds of menus. "Total number of sub P item" shows the total number of sub-play items in the sub-pass.

Each sub-play (P) item information 126-subPT is illustrated in a form branching off from the middle portion to the right end in the drawing. In order from top to bottom in the drawing, it has the plural fields for recording the sub-play(P) item number and the start PTS of the master play(P) item.

"Sub P item number" shows the ID (Identification) number of the play item in the sub-pass. "Start PTS (Presentation Time Stamp) of the master play item" shows the reproduction time of the sub-item on the reproduction time axis of the master play item.

On the other hand, in FIG. 33, the item definition table 126-3 is illustrated in a form branching off at a right lower portion in the drawing. In order from top to bottom in the drawing, it has the plural fields for recording the total number of play(P) items, the plural play(P) items 204 (i.e., P items #1, . . . , #n).

"Total number of playitems" shows the total number of items 204 in the item definition table.

Figure 36:
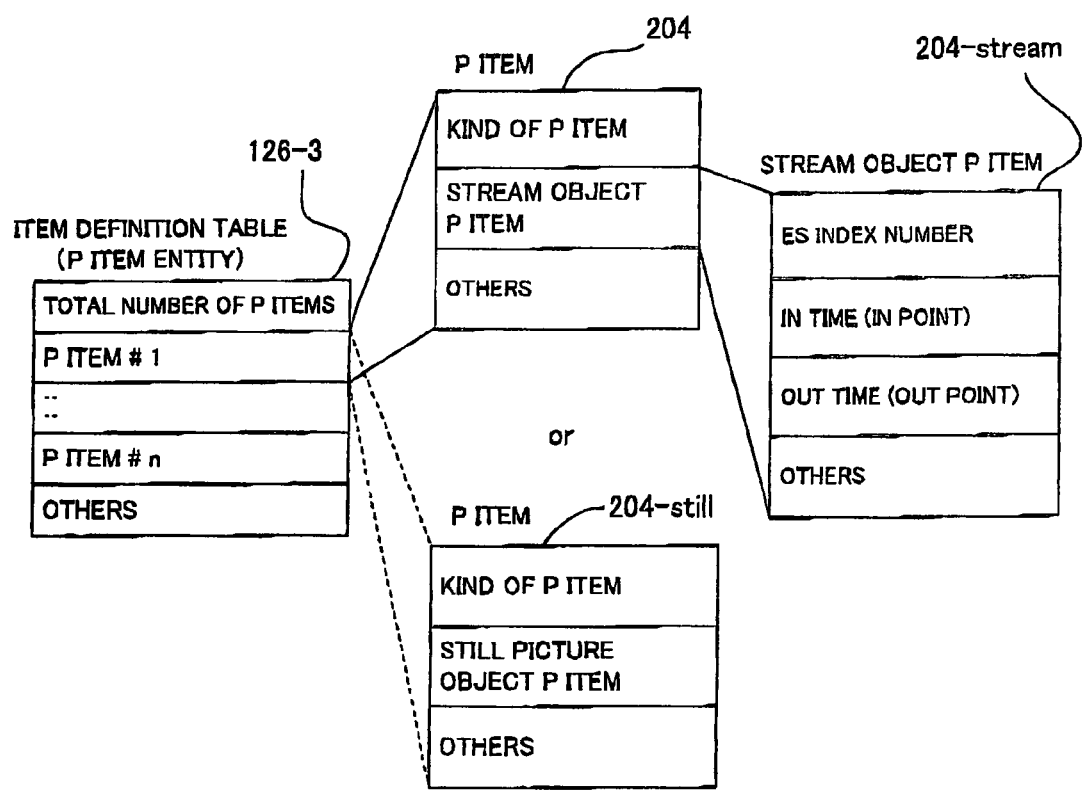
FIG. 36 is a conceptual view schematically showing the hierarchical structure in a specific example of an item definition table in the embodiment.

In FIG. 36, each item 204 is illustrated in a form heading for the middle portion to branch off on the right upper side. In order from top to bottom in the drawing, it has the plural fields for recording the play(P) item kind and the stream object play(P) item 204-stream.

"Play(P)item kind" shows a kind of the playitem. For example, the item for the stream object for the moving picture is prescribed as a code "00h", and the item for the object for the still picture is prescribed as a code "10h". Additionally, the item for the object for various kinds of menus is prescribed as a code "20h".

Further, the stream object play(P) item 204-stream is illustrated in a form branching off from the middle portion to the right end in the drawing. In order from top to bottom in the drawing, it has information indicating the ES (Elementary Stream) index number, the IN time (IN point) and the OUT time (OUT point) according to each playitem.

"ES index number" shows the ID (Identification) number and kind of the elementary stream to which the IN time and the OUT time are applied. In addition, "IN time (IN point)" and "OUT time (OUT point)" are same as described above. For example, at the time base of 90 kHz, the reproduction time and end time of the item are written thereto.

In FIG. 36, the item definition table 126-3 may include the item 204-still for the still picture object, instead of the item 204 for the stream object, i.e., the item 204 for the moving picture. In this case, the item 204-still has the information indicating the kind of the play item and the still picture object play(P) item.

Each data amount in the above-mentioned title information set may be fixed byte or variable byte. Moreover, each of the fields may have a structure capable of adding the necessary number of tables.

In this embodiment, particularly, the sub-play(P)item information 126-subPT shown in FIG. 35 designates the sub-item for reproducing "browseable slide show" explained with reference to FIG. 20 to FIG. 28. As shown in FIG. 36, the sub-item corresponds to the item 204 shown by "master P item number" in the playlist element 126-2. As a result, the reproduction of the tile based on the video stream is executed as a main pass in accordance with the stream object playitem 204-stream (see the right end of FIG. 36) designating the item 204. With this execution, the reproduction of "browseable slide show" is executed as the sub-pass in accordance with the sub-item information 126-subP™ (see the right end of FIG. 35) designating the sub-item.

(2) Object Information File

Next, with a specific example, the detailed description will be given of the object information file 130 in a case that the object data for "browseable slide show" is multiplexed with the video stream serving as the main video as the sub-picture stream to be recorded, with reference to FIG. 37. FIG. 37 schematically shows one specific example of the data structure in the AU (Associate Unit) table 131 and the associated ES (Elementary Stream) map table 134 formed in the object information file 130 (see FIG. 3).

As shown in FIG. 37, in this embodiment, in the object information file 130, the object information table is stored. The object information table is constructed by the AU table 131 and the ES map table 134 shown at the upper portion and the lower portion in the drawing, respectively.

At the upper portion in FIG. 37, the AU table 131 may have the structure capable of adding the necessary number of tables for each field. For example, if the four AUs exist, the AU table 131 may have a structure capable of increasing the number of the fields up to four.

"AU table general information" in which the number of AUs and the pointer to each AU are written and "other information" are stored in different fields in the AU table 131.

In the AU table 131, as the AU information 132I indicating the ES table index #m (ES_table Index #m) in each PU #m corresponding to each AU #n, the index number (Index number= . . . ) of the correspondent ES map table 134 is written. "AU" is the unit corresponding to "program" in the TV broadcasting as described above, for example. (Particularly, in the case of "multi vision type" broadcasting, "AU" is the unit of the set of the plural switchable "visions".) In the AU, one or more PU(s) being the reproduction unit(s) is(are) included. In addition, "PU" is a set of mutually switchable elementary streams included in each AU as described above, and the ES table index # corresponding to each PU is specified by the PU information 302I. For example, when multi-view contents is constructed by the AU, the plural PUs are stored in the AU, and the pointers to the plural elementary stream packets ID indicating the packet constructing the contents of each view are stored in each PU. This indicates the index number in the ES map table 134, which will be described later.

At the lower portion of FIG. 37, in the ES map table 134, the ES map table general information, the plural indexes #m (m=1, 2, . . . ) and the other information are stored in different fields.

In "ES map table general information", the size of the ES map table and the total number of indexes are written.

"Index #m" includes the elementary stream packet ID (ES_PID) of the entire elementary streams used for the reproduction, the correspondent index number and the address information of the elementary stream, respectively.

For example, in this embodiment, when the elementary stream is the video stream of the MPEG2 as described above, as the address information, i.e., the ES address information 134d, only the TS packet number at the top of the I picture and the correspondent display time are written in the ES map table 134, and the amount of data is cut down. Meanwhile, as for the ES address information 134d of the sub-picture stream, the index number information 134e of the elementary stream of the SP data on which the SP control information operates is written, and the amount of data is further cut down.

By this structure, the elementary stream packet ID (ES_PID) of the actual elementary stream can be obtained from the index number of the ES map 134 designated from the AU table 131. In addition, since the address information of the elementary stream corresponding to the elementary stream packet ID can be also obtained at the same time, the reproduction of the object data becomes possible based on the information.

According to the above-mentioned data structure of the optical disc 100, if a new title is added to the optical disc 100, the necessary information can be easily added, which is useful. Conversely, even if an edition is performed and certain information becomes unnecessary, the information does not have to be referred to. Namely, the information does not actually have to be deleted from the table, which is useful.

In FIG. 37, the ES_PID which is not referred from the AU table 131 at the upper portion is written by the index of the ES map table 134 at the lower portion. However, as for the ES_PID which is not referred to, the description in this manner is unnecessary. However, if the ES_PID which is not referred to is written and the wide use ES map table 134 is produced, the reconstruction of the ES map table advantageously becomes unnecessary in a case of reediting the contents, i.e., in a case of retrying authoring. The description will be given of the reproduction order of various kinds of files at the time of reproduction of the optical disc 100 having the data structure according to the specific example explained with reference to FIG. 30 to FIG. 37.

First, from the title information set shown in FIG. 30, the disc header 112x is reproduced. As a part of it, the title table 112xtt shown in FIG. 31 is reproduced, and the title menu starting address or the title contents starting address is obtained.

Next, according to the obtained address information, the reproduction of the title information 200 shown in FIG. 30 is started. More specifically, the title element 200-2 shown in FIG. 32 is reproduced and the playlist set number is obtained. Moreover, the pointer 200PT to the playlists #1 to #k is obtained. Since the playlist 126 is structurally designated by the pointer 200PT, the plural playlists in the playlist set specified before by the reproduction of the title element 200-2 can be used between the plural titles.

Next, the playlist set table 112xpt shown in FIG. 31 is reproduced, and the playlist set starting address is obtained. Based on it, the reproduction of the playlist set 126S shown in FIG. 33 is started, and the PL presentation 126-1xi is first reproduced.

Next, the PL presentation 126-1xi being an example of the demand function information and the reproduction function (i.e., the video performance and the audio performance) of the information reproduction system reproducing the optical disc 100 are compared. Thereby, an optimum playlist 126 is chosen from the playlist set 126S shown in FIG. 33.

Next, the chosen playlist 126 is reproduced. Specifically, the playlist element 126-2 shown in FIG. 34 is reproduced. At this time, the pre-command 126PR is first executed, and then the master P item number shown in FIG. 35 is obtained. Subsequently, the item definition table shown in FIG. 36 is referred to. Thereby, the item 204 is reproduced. The reproduction of the item 204 is actually performed by the reproduction of the corresponding TS object in accordance with the ES index number, the IN time and the OUT time obtained by the reproduction of the stream object P item 204-stream (see FIG. 37). Afterward, the post command 126PS shown in FIG. 34 is executed, and the designation of the playlist element to be reproduced next is further performed in accordance with the next information 126-6N. The reproduction is similarly repeatedly performed.

FIG. 38 shows a specific example of the object information table for the browseable slide show. In this example, as for the still picture, the display time information such as the MPEG is not added to the object itself. Namely, each still picture is displayed in the order of the index number in the PU. "Object type" in the AU table indicates a use of each object. In this example, the objects #1 and #3 show the still pictures used for the browseable slide show, and the object #2 shows the audio data used for the browseable slide show.

The item information and the sub-item information further include the information indicating the object number in the object information file 130. The corresponding object is specified by the corresponding object number and AU number, and it is reproduced by the above-mentioned reproduction sequence (see FIG. 27 and FIG. 28).

As explained with reference to FIG. 1 to FIG. 38, according to this embodiment, it becomes possible to efficiently perform the display of the menu screen such as a small window display and a semitransparent superimposing display with the title reproduction continuous by reproducing the menu by the correspondent sub-item and selectively executing the display output of the reproduced menu during the reproduction and display output of the title by the item, for example.

Incidentally, in the aforementioned embodiment, the explanation is made on the optical disc 100 as an example of the information record medium and the recorder or player of the optical disc 100 as an example of the information record reproduction apparatus. Nevertheless, the present invention is not limited to the optical disc and the player or recorder thereof, but is applicable to various record media and the recorders or players thereof, supporting other high density recording or high transfer rate.

Figure 39:
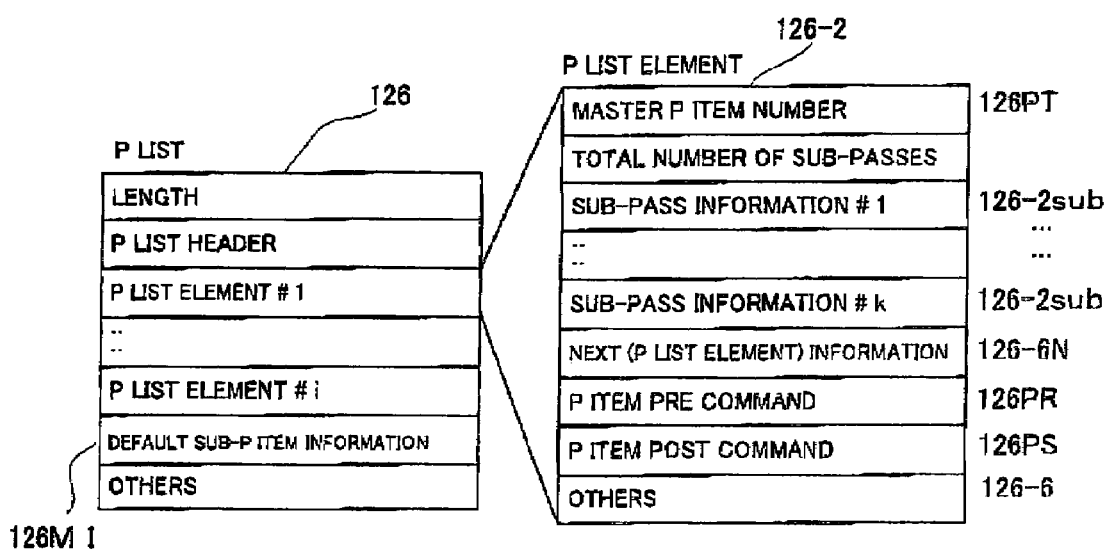
FIG. 39 is a conceptual view schematically showing a hierarchical structure in a modification of the playlist.

For example, as shown in FIG. 39, the default sub-P item information 126MI having the sub-P item number and the start PTS of the master P item may be included in the play(P) list. When no sub-pass information is in each P list element, the default sub P item information 126MI may be commonly used.

The present invention is not limited to the above-described embodiments, and various changes may be made, if desired, without departing from the essence or spirit of the invention which can be read from the claims and the entire specification. An information record medium, an apparatus for and a method of recording the information, an apparatus for and a method of reproducing the information, an apparatus for and a method of recording and reproducing the information, a computer program for controlling the record or the reproduction, and a data structure including a control signal, all of which involves such changes, are also intended to be within the technical scope of the present invention.

For example, according to the above-mentioned embodiment, the still picture information includes the plural still pictures However, the still picture information may include at least one still picture.

INDUSTRIAL APPLICABILITY

An information record medium, an apparatus for and a method of recording the information, an apparatus for and a method of reproducing the information, an apparatus for and a method of recording and reproducing the information, a computer program for controlling the record or the reproduction, and a data structure including a control signal, all of which are according to the present invention, can be applied to a high-density optical disc for consumer or industrial use, such as a DVD, on which various information, such as the video information, the audio information and the sub-picture information, can be recorded at high density and further can be applied to a DVD player, a DVD recorder, and the like. Moreover, they can be applied to an information record medium, an information record reproduction apparatus, or the like, which are mounted on or can be connected to various computer equipment for consumer or industrial use, for example.

The invention claimed is:

1. An information record medium, comprising:
recorded object data, the object data being a multiplex of a first stream including still picture information and a second stream including audio information by a unit of packet; and
recorded reproduction control information, the reproduction control information comprising:
i) first reproduction sequence information which designates a reproduction sequence of the first stream by a first unit and which includes time information indicating a reproduction start timing of the first unit;
ii) reproduction time information which indicates whether each still picture of the still picture information of the first stream is a finite value or an infinite value, and which indicates a reproduction time of the still picture whose reproduction time is the finite value;
iii) first type information which indicates a type of the first unit;
iv) first storage position information which indicates a storage position of the object data designated by the first unit;
v) second reproduction sequence information which designates a reproduction sequence of the second stream, and which includes audio repeat information indicating whether or not the audio information of the second stream is to be repeatedly reproduced;
vi) second type information which indicates a type of the second stream; and
vii) second storage position information which indicates a storage position of the object data designated by the second reproduction sequence information,
wherein the object data and the reproduction control information are recorded separately at different areas.

2. The information record medium according to claim 1,
wherein the audio information has a beginning and an end; and
wherein repeat reproduction of the audio information according to the audio repeat information is the repeated reproduction of same audio information through the end of the audio information consecutively followed by the further reproduction of the audio information from the beginning of the audio information so that the repeated reproduction of the same audio information is continued during the reproduction of the still picture information resulting in a total reproduction time of the repeat reproduction of the audio information that is equal to a total reproduction time of the still picture information.

3. An information recording apparatus comprising:
a first recording unit which records object data formed by multiplexing a first stream including still picture information and a second stream including audio information by a unit of packet; and
a second recording unit which records reproduction control information comprising:
first reproduction sequence information which designates reproduction sequence of the first stream by a first unit and which includes time information indicating a reproduction start timing of the first unit;
reproduction time information which indicates whether each still picture of the still picture information of the first stream is a finite value or an infinite value, and which indicates a reproduction time of the still picture whose reproduction time is the finite value;
first type information which indicates a type of the first unit;
first storage position information which indicates a storage position of the object data designated by the first unit;
second reproduction sequence information which designates
reproduction sequence of the second stream, and which includes audio repeat information indicating whether or not the audio information of the second stream is to be repeatedly reproduced;
second type information which indicates a type of the second stream; and
second storage position information which indicates a storage position of the object data designated by the second reproduction sequence information,
wherein the first recording unit and the second recording unit record the object data and the reproduction control information separately at different areas.

4. An information recording method comprising:
a first recording process which records object data formed by multiplexing a first stream including still picture information and a second stream including audio information by a unit of packet; and
a second recording process which records reproduction control information comprising:
first reproduction sequence information which designates a reproduction sequence of the first stream by a first unit and which includes time information indicating a reproduction start timing of the first unit;

reproduction time information which indicates whether each still picture of the still picture information of the first stream is a finite value or an infinite value, and which indicates a reproduction time of the still picture whose reproduction time is the finite value;

first type information which indicates a type of the first unit;

first storage position information which indicates a storage position of the object data designated by the first unit;

second reproduction sequence information which designates reproduction sequence of the second stream, and which includes audio repeat information indicating whether or not the audio information of the second stream is to be repeatedly reproduced;

second type information which indicates a type of the second stream; and second storage position information which indicates a storage position of the object data designated by the second reproduction sequence information, wherein the first recording process and the second recording process record the object data and the reproduction control information separately at different areas.

5. An information reproduction apparatus for reproducing an information record medium recording object data and reproduction control information, the object data being formed by multiplexing a first stream including still picture information and a second stream including audio information by a unit of packet, the object data and the reproduction control information being recorded separately at different areas, the reproduction control information comprising:

first reproduction sequence information which designates a reproduction sequence of the first stream by a first unit and which includes time information indicating a reproduction start timing of the first unit;

reproduction time information which indicates whether each still picture of the still picture information of the first stream is a finite value or an infinite value, and which indicates a reproduction time of the still picture whose reproduction time is the finite value;

first type information which indicates a type of the first unit;

first storage position information which indicates a storage position of the object data designated by the first unit;

second reproduction sequence information which designates reproduction sequence of the second stream, and which includes audio repeat information indicating whether or not the audio information of the second stream is to be repeatedly reproduced;

second type information which indicates a type of the second stream; and second storage position information which indicates a storage position of the object data designated by the second reproduction sequence information, the information reproduction apparatus comprising:

a reading unit which reads the still picture information, the audio information and the reproduction control information from the information record medium;

a still picture reproduction unit which reproduces the still picture information; and an audio reproduction unit which reproduces the audio information simultaneously with reproduction of the still picture information in accordance with the audio repeat information in the reproduction control information.

6. An information reproduction method for reproducing an information record medium recording object data and reproduction control information, the object data being formed by multiplexing a first stream including still picture information and a second stream including audio information by a unit of packet, the object data and the reproduction control information being recorded separately at different areas, the reproduction control information comprising:

first reproduction sequence information which designates a reproduction sequence of the first stream by a first unit and which includes time information indicating a reproduction start timing of the first unit;

reproduction time information which indicates whether each still picture of the still picture information of the first stream is a finite value or an infinite value, and which indicates a reproduction time of the still picture whose reproduction time is the finite value;

first type information which indicates a type of the first unit;

first storage position information which indicates a storage position of the object data designated by the first unit;

second reproduction sequence information which designates reproduction sequence of the second stream, and which includes audio repeat information indicating whether or not the audio information of the second stream is to be repeatedly reproduced;

second type information which indicates a type of the second stream; and second storage position information which indicates a storage position of the object data designated by the second reproduction sequence information, the information reproduction method comprising:

a reading process which reads the still picture information, the audio information and the reproduction control information from the information record medium;

a still picture reproduction process which reproduces the still picture information; and an audio reproduction process which reproduces the audio information simultaneously with reproduction of the still picture information in accordance with the audio repeat information in the reproduction control information.

* * * * *